(12) United States Patent
Kobayashi et al.

(10) Patent No.: US 7,037,196 B2
(45) Date of Patent: May 2, 2006

(54) PORTABLE TOY, PORTABLE INFORMATION TERMINAL, ENTERTAINMENT SYSTEM, AND RECORDING MEDIUM

(75) Inventors: Yasuhide Kobayashi, Tokyo (JP); Hisashi Murata, Tokyo (JP); Takayuki Wakimura, Tokyo (JP); Kazuya Koshimo, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/414,678

(22) Filed: Oct. 7, 1999

(65) Prior Publication Data
US 2003/0157983 A1   Aug. 21, 2003

(30) Foreign Application Priority Data

Oct. 8, 1998 (JP) .......................................... 10-287109
Oct. 8, 1998 (JP) .......................................... 10-287111
Oct. 8, 1998 (JP) .......................................... 10-287125

(51) Int. Cl.
*A63F 9/24* (2006.01)
*H04L 9/00* (2006.01)

(52) U.S. Cl. ......................... 463/29; 463/42; 713/155; 717/178

(58) Field of Classification Search ............... 463/43, 463/29, 40–42, 11–13, 16–22; 380/200–204, 380/215; 713/1–2, 150, 155–159; 709/201, 709/203; 707/1, 9–10; 717/168, 171–178
See application file for complete search history.

(56) References Cited

U.S. PATENT DOCUMENTS

| 4,642,710 A | 2/1987 | Murtha et al. |
| 4,799,635 A | 1/1989 | Nakagawa |
| 5,113,518 A * | 5/1992 | Durst, Jr. et al. ........... 713/200 |
| 5,377,269 A | 12/1994 | Heptig et al. |
| 5,491,777 A | 2/1996 | Mase et al. |
| 5,530,235 A | 6/1996 | Stefik et al. |
| 5,623,587 A | 4/1997 | Bulman |
| 5,643,086 A * | 7/1997 | Alcorn et al. ................. 463/29 |

FOREIGN PATENT DOCUMENTS

CA    2 231 699    9/1998

(Continued)

OTHER PUBLICATIONS

ASCII, DOS/V, Issue, "New Release!! Dreamcast: A New-generation Game Machine from SEGA" pp. 348 through 350 vol. 4 No. 8 issued by ASCII Corporation on Aug. 1, 1998.
English translation of Office Action mailed from Japanese Patent Office on Apr. 26, 2005.

(Continued)

*Primary Examiner*—Mark Sager
(74) *Attorney, Agent, or Firm*—Frommer Lawrence & Haug LLP; William S. Frommer

(57) ABSTRACT

A portable information terminal inserted in an entertainment apparatus operates as if it had a life therein and functions as company that the user can talk to. The portable information terminal comprises a display unit and a casing surrounding said display unit. The display unit and said casing representing a form comprising a head and a body. The display unit functions to present facial expressions of the form. The display unit has a display screen for displaying an image based on image data generated by an image processor. The image processor has a facial expression display controller for reading facial expression information selected by a facial expression selector from a plurality of items of facial expression information, and displaying a moving image representing a deformation from a present facial expression to a facial expression based on the read facial expression information according to a morphing technique.

18 Claims, 56 Drawing Sheets

FOREIGN PATENT DOCUMENTS

| | | |
|---|---|---|
| EP | 0 860 811 | 8/1998 |
| JP | 7-037113 | 2/1995 |
| JP | 07-087559 | 3/1995 |
| JP | 07-162956 | 6/1995 |
| JP | 08-006784 | 1/1996 |
| JP | 08-243253 | 9/1996 |
| JP | 08-317441 | 11/1996 |
| JP | 09-122353 | 5/1997 |
| JP | 09-138767 | 5/1997 |
| JP | 09-164271 | 6/1997 |
| JP | 9-231397 | 9/1997 |
| JP | 10-083363 | 3/1998 |
| JP | 10-133635 | 5/1998 |
| JP | 10-201955 | 8/1998 |
| JP | 63-192423 | 8/1998 |
| JP | 10-232658 | 9/1998 |
| JP | 10-235019 | 9/1998 |
| JP | 10-254342 | 9/1998 |
| JP | 10254343 | 9/1998 |
| WO | WO 95/12168 | 5/1995 |
| WO | WO 96 17323 | 6/1996 |
| WO | WO 97 36288 | 10/1997 |
| WO | WO 98 13782 | 4/1998 |

OTHER PUBLICATIONS

"Sony Computer Entertainment America Expands the World of Its Playstation Game Console Through Introduction of Personal Digital Assistance (PDA)", retrieved from the Internet at: http://www.playstation.com/press_releases/show_asp?spec=61, publication date May 27, 1998.

Rejection of Corresponding Japanese Application with Translation.

"Tamagotchi Advertisement".

"Talking E–Mail".

* cited by examiner

F I G. 7
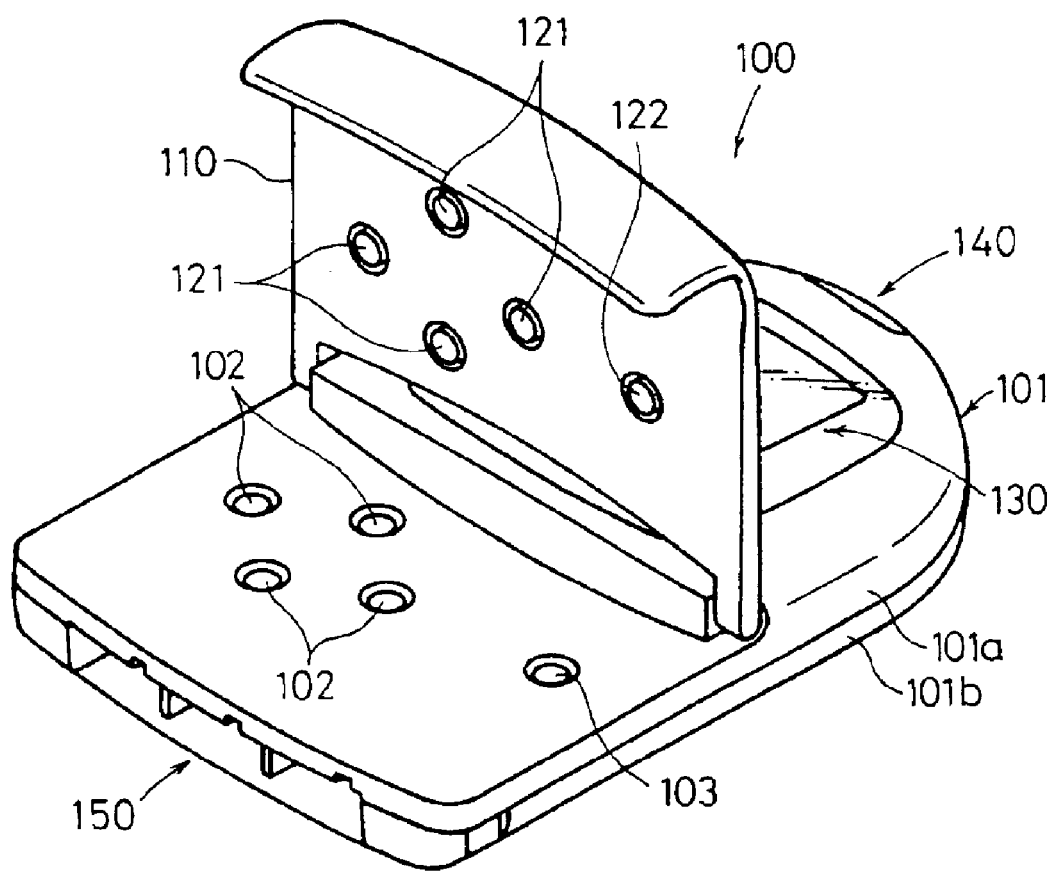

FIG. 19

MESSAGE TABLE (310)

| RECORD 0 | MESSAGE DATA |
| RECORD 1 | MESSAGE DATA |
| RECORD 2 | MESSAGE DATA |
| ⋮ | |

FIG. 20

FACIAL EXPRESSION TABLE (308)

| RECORD 0 | FACIAL EXPRESSION DATA |
| RECORD 1 | FACIAL EXPRESSION DATA |
| RECORD 2 | FACIAL EXPRESSION DATA |
| ⋮ | |

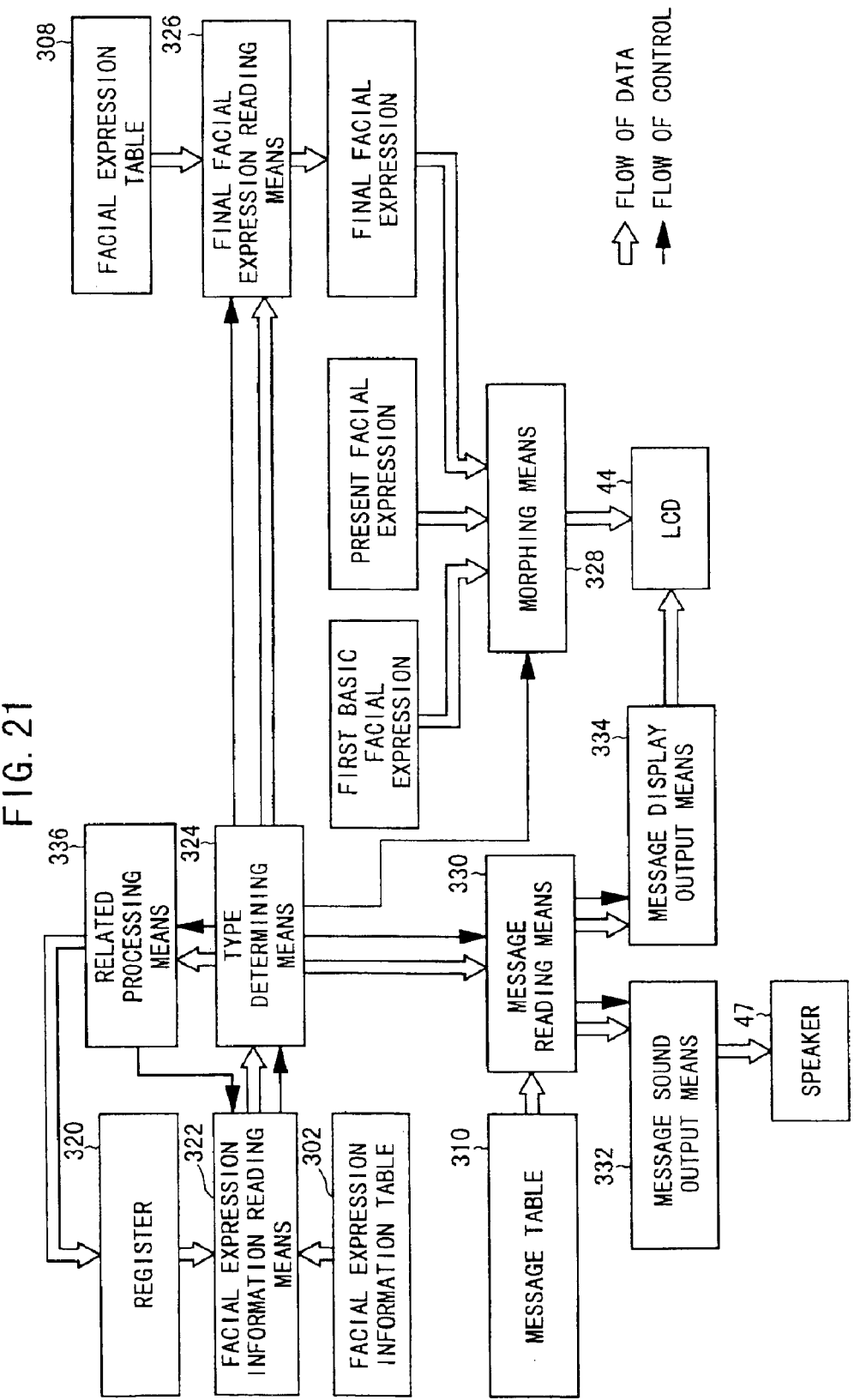

TODAY'S GENERAL FORTUNE

┌─────────────────────────┐
    │ TODAY'S FORTUNE FOR LOVE │
    └─────────────────────────┘

TODAY'S FORTUNE FOR FOOD

TODAY'S FORTUNE FOR CLOTHING

TODAY'S MEDICAL CHECK

CONGENIALITY CHECK
```

FIG. 37

FORTUNE MESSAGE TABLE

|  | MESSAGE | INDICATOR VALUE |
|---|---|---|
| RECORD 0 | BEST CONDITION |  |
| RECORD 1 | MODERATE CONDITION |  |
| RECORD 2 | WORST CONDITION |  |
| • |  |  |
| • |  |  |
| • |  |  |
| • |  |  |
| • |  |  |
| • |  |  |

FIG. 52
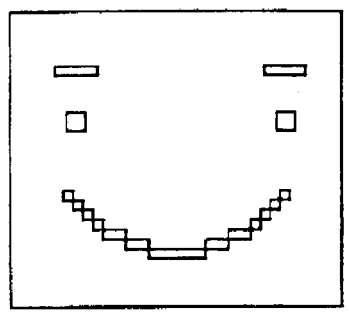
BASIC FACE
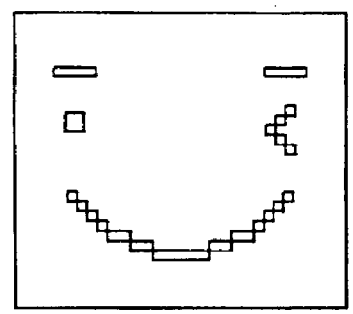
WINKING
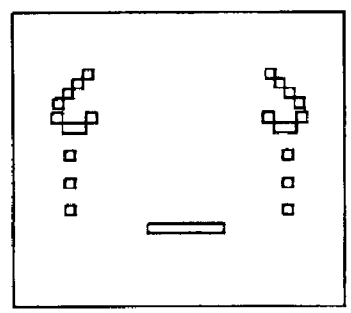
WEEPING
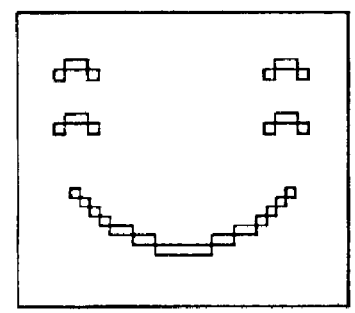
SMILING
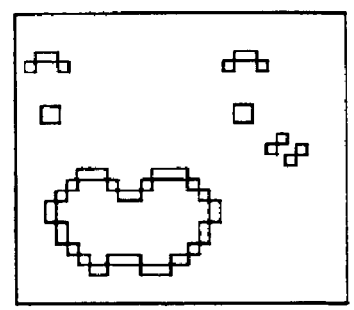
STARTLED TO SEE LEFT
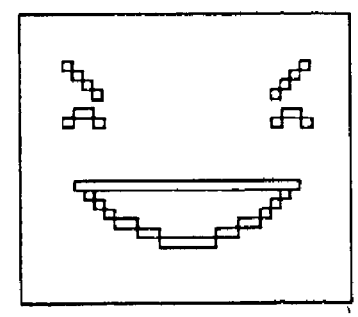
LAUGHING FIG. 53
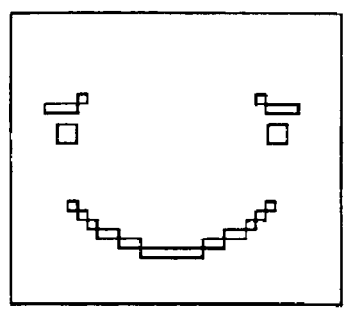
SLIGHTLY
DEPRESSED AND
SMILING
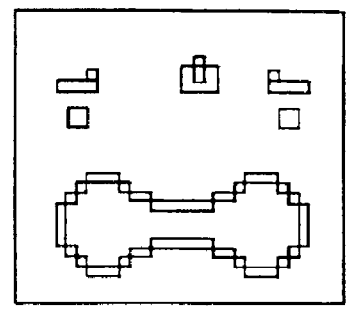
CONFUSED
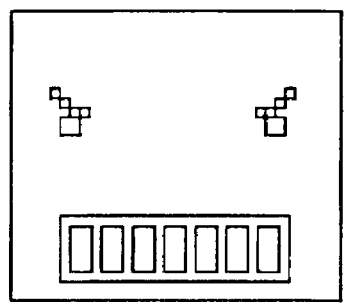
GLARING AND
ANGRY
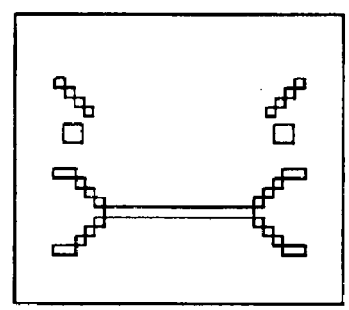
FURIOUS
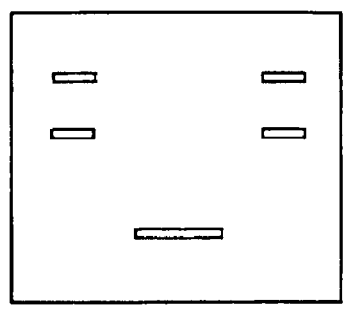
SILENT
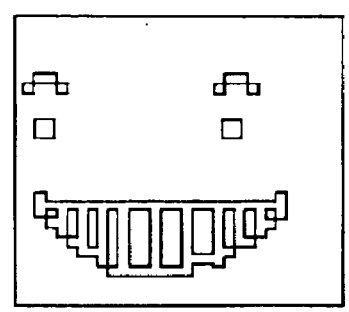
SEEING LEFT AND
GRINNING FIG. 54
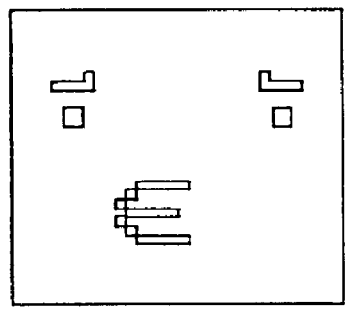
GROUCHY
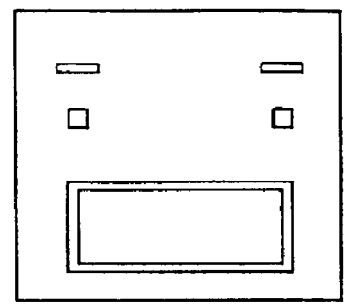
SPEAKING
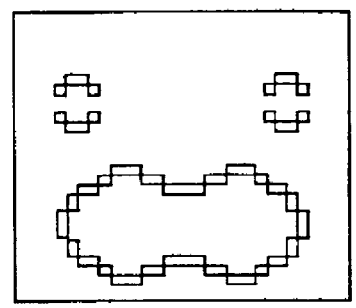
YAWNING
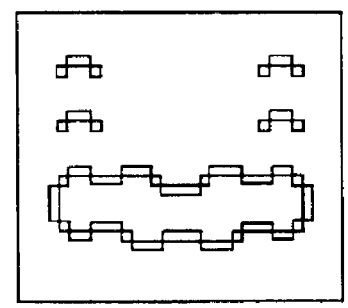
GARGLING
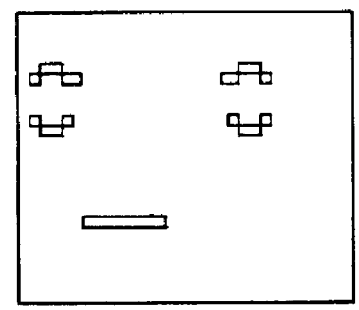
IN BAD TEMPER
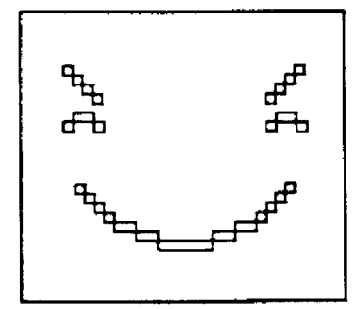
JOYFUL
(TRIUMPHANT)

FIG. 55
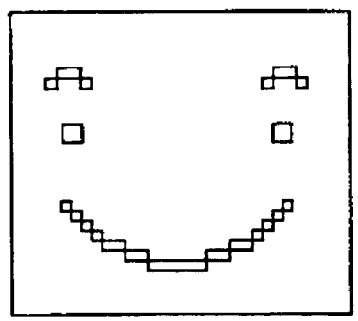
VERY JOYFUL
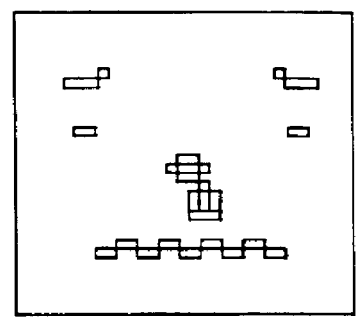
GETTING COLD
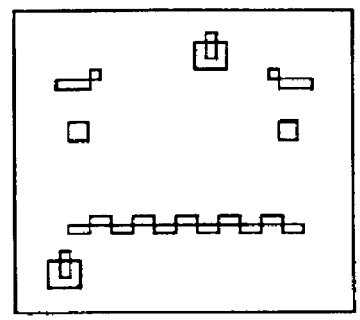
SCARED WITH SWEAT
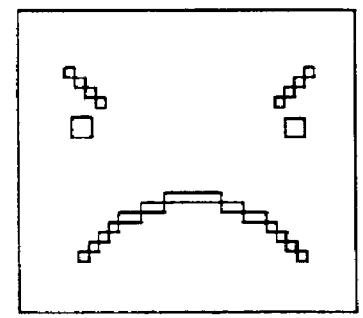
ANGRY
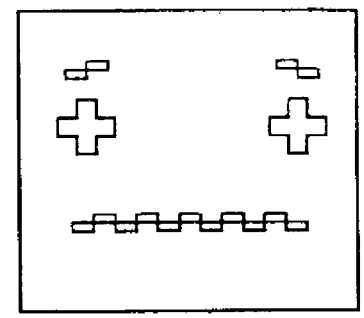
BEWILDERED AND TROUBLED
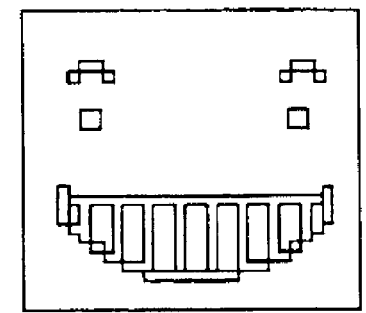
GRINNING

PORTABLE TOY, PORTABLE INFORMATION TERMINAL, ENTERTAINMENT SYSTEM, AND RECORDING MEDIUM

BACKGROUND OF THE INVENTION

1. Field of the Invention

The present invention relates to a portable toy that can be held by hand and played by the user, a portable information terminal for use as an auxiliary storage unit for an information-handling apparatus, an entertainment system equipped with-such a portable information terminal, and a recording medium which stores a program to be downloaded into the portable information terminal.

2. Description of the Related Art

Information-handling apparatus such as entertainment apparatus including video game machines have a master unit and a slave unit such as a memory card device to be inserted into the master unit. The slave unit comprises an interface for connection to the main assembly of the information-handling apparatus, i.e., the master unit, and a nonvolatile memory for storing data.

FIG. 56 of the accompanying drawings shows an arrangement of major components of a conventional memory card device. The conventional memory card device, generally denoted by 1000, comprises a control means 1002 for controlling operation of the memory card device, a connector 1004 for connection to terminals disposed in a slot of the information-handling apparatus or the like, and a nonvolatile memory 1006 for storing data. The connector 1004 and the nonvolatile memory 1006 are connected to the control means 1002.

The control means 1002 comprises a microcomputer, for example. The nonvolatile memory 1006 comprises a flash memory or an EEPROM, for example. The interface for connection to the main assembly of the information-handling device may comprise a microcomputer as a control means for interpreting protocols.

FIG. 57 of the accompanying drawings shows control items carried out by the control means 1002 of the conventional memory card device 1000.

The conventional memory card device 1000 has had only an apparatus connection interface for connection to the main assembly of the information-handling apparatus and a memory interface for entering data into and retrieving data from the nonvolatile memory.

Conventional entertainment apparatus which are also capable of playing home TV games have a function to store programs and data in an auxiliary memory. The above memory card device can also be used as an auxiliary memory for entertainment apparatus.

FIG. 58 of the accompanying drawings shows a conventional entertainment apparatus 1010 which employs a memory card as an auxiliary memory. The conventional entertainment apparatus 1010 has a rectangular casing 1012 which houses a disk loading unit 1014 substantially centrally therein for loading an optical disk as a recording medium with an application program recorded therein. The casing 1012 supports a reset switch 1016 for resetting a program which is being presently executed, a power supply switch 1018, a disk control switch 1020 for controlling the loading of the optical disk, and two slots 1022A, 1022B.

The memory card 1000 for use as an auxiliary memory is inserted into one of the slots 1022A, 1022B, and result data of the program executed by the entertainment apparatus 1010 are transmitted from a control means (CPU) 1024 and written in the nonvolatile memory 1006. A plurality of manual controllers (not shown) may be connected respectively to the slots 1022A, 1022B to allow a plurality of users or game players to share the entertainment system to play a competition game, for example.

It has been attempted to provide a slave unit that can be connected to a memory card slot in an entertainment apparatus as a master unit, with a function to execute a program such as a game program. Such a slave unit can also be used as a portable information terminal. If the slave unit can communicate easily with other devices, then the slave unit will find a wider range of applications, which will lead to the creation of new demands.

Furthermore, if a portable information terminal is designed for use as a toy with a head and a body, then the portable information terminal will gain greater popularity in the market.

Moreover, a portable information terminal with a communication capability for receiving information from an external source and an output capability for outputting received information as an audio message will find wide use among users.

In addition, a portable information terminal will also be used widely if it has an illegal copying prevention function to prevent programs and data from being copied illegally through the portable information terminal.

SUMMARY OF THE INVENTION

It is therefore an object of the present invention to provide a portable toy which has a head and a body and which allows the user to enjoy various facial expressions at all times, for thereby increasing attractive forces with which to attract customers to the portable toy.

Another object of the present invention is to provide a portable information terminal which acts as if it had a life therein and functions as company that the user can talk to.

Still another object of the present invention is to provide an entertainment system for performing various functions with a portable information terminal that can also be used as a portable toy.

Yet another object of the present invention is to provide a recording medium with a recorded program for operating a portable information terminal that functions as company that the user can talk to.

Yet still another object of the present invention is to provide a portable information terminal which is capable of outputting received information as an audio message, so that the portable information terminal will have many functions.

A further object of the present invention is to provide an entertainment system for performing various functions with a portable information terminal that has a communication function.

A still further object of the present invention is to provide a recording medium with a recorded program for operating a portable information terminal that is capable of outputting received information as an audio message.

A yet further object of the present invention is to provide a portable information terminal and an entertainment system which are capable of effectively preventing programs, etc. from being illegally copied via a communication means of the portable information terminal, for thereby protecting copyrights with respect to the programs.

A yet still further object of the present invention is to provide a recording medium with a recorded program for executing a process to effectively prevent programs, etc. from being illegally copied via a communication means of a portable information terminal.

A portable toy according to the present invention comprises a display unit and a casing surrounding the display unit, the display unit and the casing representing a form comprising a head and a body, the display unit functioning as at least means for presenting facial expressions of the form.

The user of the portable toy can enjoy changing facial expressions of the form, as the portable toy looks as if it had a life therein and functions as company that the user can talk to.

A portable information terminal according to the present invention comprises a display unit and a casing surrounding the display unit, the display unit and the casing representing a form comprising a head and a body, the display unit functioning as at least means for presenting facial expressions of the form.

Inasmuch as the user can always enjoy changes in facial expressions displayed on the display unit, the user can use the portable information terminal as a portable toy. The portable information terminal looks as if it had a life therein and functions as company that the user can talk to.

The portable information terminal may further comprise image processing means for generating image data, and the display unit may comprise a display screen for displaying an image based on image data generated by the image processing means.

The portable information terminal may further comprise facial expression selecting means for selecting one of a plurality of items of facial expression information, and the image processing means may comprise facial expression display means for reading the facial expression information selected by the facial expression selecting means and displaying a moving image representing a deformation from a present facial expression to a facial expression based on the read facial expression information according to a morphing technique.

The displayed facial expression changes naturally without appreciable awkward transitions. The smooth facial expression changes allow the portable information terminal as viewed as a toy to attract customers highly effectively.

The facial expression selecting means may comprise means for randomly selecting one of the items of facial expression information at the timing of a predetermined time duration. Therefore, even if the portable information terminal is left, it operates humorously by speaking something and changing facial expressions by itself, thereby making the user feel intimate with the terminal.

The facial expression selecting means may comprise means for selecting one of the items of facial expression information at the timing of a manual control input entered while the present facial expression is being displayed.

Simply when the user makes key entries, various messages and facial expression changes are produced depending on the timing of the key entries, the time durations of the key entries, and the period of time in which the key entries continue. Accordingly, the user can experience a sensation as if playing with the portable information terminal with a life kept therein.

The facial expression display means may comprise means for, if facial expression information related to the read facial expression information is added, displaying a moving image representing a deformation from a facial expression based on the read facial expression information to a facial expression based on the related facial expression information according to a morphing technique. Therefore, complex facial expression changes and a combination of plural facial expressions related to one facial expression can easily be achieved.

The portable information terminal may further comprise message sound output means for, if message information is added to the facial expression information, reading a message represented by the message information, and outputting a voice sound of the message in substantial synchronism with the displaying of the facial expression by the facial expression display means.

Consequently, it is possible to develop an organic atmosphere in which the portable information terminal speaks naturally as if it had a life therein, rather than an inorganic atmosphere in which a computer outputs voice sounds based on data.

The facial expression display means may comprise means for, if message information is added to the facial expression information and information indicative of displaying of a message is added, reading a message represented by the message information and displaying the message on the display screen.

Therefore, if a long message is to be outputted, only basic message segments thereof may be displayed as an image and insignificant message segments such as prefixes and suffixes may be outputted as voice sounds. Consequently, even when a piezoelectric buzzer is used as a speaker, the problem of an insufficient capacity thereof for outputting long messages can be solved.

According to the present invention, an entertainment system comprises an entertainment apparatus having a function to execute a program, and a portable information terminal detachably connected to the entertainment apparatus and having an interface for being electrically connected to the entertainment apparatus, the portable information terminal comprising a display unit and a casing surrounding the display unit, the display unit and the casing representing a form comprising a head and a body, the display unit functioning as at least means for presenting facial expressions of the form.

The portable information terminal and the entertainment apparatus may have respective information transfer means for transferring information to each other. The portable information terminal may comprise image processing means for generating image data, and the display unit may comprise a display screen for displaying an image based on image data generated by the image processing means.

The portable information terminal may comprises facial expression selecting means for selecting one of a plurality of items of facial expression information, and the image processing means may comprise facial expression display means for reading the facial expression information selected by the facial expression selecting means and displaying a moving image representing a deformation from a present facial expression to a facial expression based on the read facial expression information according to a morphing technique.

The facial expression selecting means may comprise means for randomly selecting one of the items of facial expression information at the timing of a predetermined time duration or means for selecting one of the items of facial expression information at the timing of a manual control input entered while the present facial expression is being displayed.

The facial expression display means may comprise means for, if facial expression information related to the read facial expression information is added, displaying a moving image representing a deformation from a facial expression based on the read facial expression information to a facial expression based on the related facial expression information according to a morphing technique.

The portable information terminal may comprises message sound output means for, if message information is added to the facial expression information, reading a message represented by the message information, and outputting a voice sound of the message in substantial synchronism with the displaying of the facial expression by the facial expression display means.

The facial expression display means may comprise means for, if message information is added to the facial expression information and information indicative of displaying of a message is added, reading a message represented by the message information and displaying the message on the display screen.

A recording medium according to the present invention stores a program comprising the steps of randomly selecting one of a plurality of items of facial expression information at the timing of a predetermined time duration, reading the selected facial expression information, and displaying a moving image representing a deformation from the present facial expression to a facial expression based on the read facial expression information according to a morphing technique.

With the recording medium used, the displayed facial expression changes naturally without appreciable awkward transitions, so that various facial expressions can conveniently be displayed. Since facial expressions change at the timing of a predetermined time duration, it is possible to provide humorous operations by speaking something and changing facial expressions by itself.

A recording medium according to the present invention stores a program comprising the steps of selecting one of a plurality of items of facial expression information at the timing of a manual control input entered while a present facial expression is being displayed, reading the selected facial expression information, and displaying a moving image representing a deformation from the present facial expression to a facial expression based on the read facial expression information according to a morphing technique.

With the above recording medium used, simply when the user makes key entries, various messages and facial expression changes are produced depending on the timing of the key entries, the time durations of the key entries, and the period of time in which the key entries continue. Accordingly, the user can experience a sensation as if playing with the portable information terminal with a life kept therein.

The step of displaying a moving image may comprise the step of, if facial expression information related to the read facial expression information is added, displaying a moving image representing a deformation from a facial expression based on the read facial expression information to a facial expression based on the related facial expression information according to a morphing technique.

The program may further comprise the steps of, if message information is added to the facial expression information, reading a message represented by the message information, and outputting a voice sound of the message in substantial synchronism with the displaying of the facial expression.

The step of displaying a moving image may comprise the steps of, if message information is added to the facial expression information and information indicative of displaying of a message is added, reading a message represented by the message information and displaying the message.

A portable information terminal according to the present invention comprises display means for displaying information depending on a program which is executed, sound output means for outputting a sound of information depending on the program which is executed, communication means for sending and receiving information, and message information output means for outputting a sound of message information, of information received by the communication means, via the sound output means.

With the above arrangement, information received via the communication means is sent to the message information output means, which outputs a sound of the message information of the received information via the sound output means.

Thus, the portable information terminal can perform a function to output latest news transmitted from a broadcasting station as voice sounds via the portable information terminal. Therefore, the portable information terminal can be designed for a multiplicity of functions.

The message information output means may comprise reception data detecting means for determining whether information has been received via the communication means, data reading means for, if information has been received via the communication means, reading the received information, and extracting and registering message information of the received information, and message sound output means for outputting a sound of the registered message information via the sound output means.

The display means may comprise facial expression display means for reading facial expression information depending on the message information, from a plurality of items of facial expression information, and displaying a moving image representing a deformation from a present facial expression to a facial expression based on the read facial expression information according to a morphing technique, in substantial synchronism with the outputting of the sound of message information.

The display means can display a facial expression with the mouth being alternately opened and closed in synchronism with the outputting of the sound of message information, so that the portable information terminal can look as if it had a life therein.

According to the present invention, an entertainment system comprises an entertainment apparatus having a function to execute a program, and a portable information terminal detachably connected to the entertainment apparatus and having an interface for being electrically connected to the entertainment apparatus, the portable information terminal comprising display means for displaying information depending on a program which is executed, sound output means for outputting a sound of information depending on the program which is executed, communication means for sending and receiving information, and message information output means for outputting a sound of message information, of information received by the communication means, via the sound output means.

The message information output means may comprise reception data detecting means for determining whether information has been received via the communication means, data reading means for, if information has been received via the communication means, reading the received information, and extracting and registering message information of the received information, and message sound output means for outputting a sound of the registered message information via the sound output means.

The display means may comprise facial expression display means for reading facial expression information depending on the message information, from a plurality of items of facial expression information, and displaying a moving image representing a deformation from a present facial expression to a facial expression based on the read facial expression information according to a morphing technique, in substantial synchronism with the outputting of the sound of message information.

A recording medium according to the present invention stores a program which can be executed by a portable information terminal having display means for displaying information depending on the program which is executed, sound output means for outputting a sound of information depending on the program which is executed, and communication means for sending and receiving information, the program comprising the step of outputting a sound of message information, of information received by the communication means, via the sound output means.

With the above recording medium being used, the portable information terminal can perform a function to output latest news transmitted from a broadcasting station as voice sounds via the portable information terminal. Therefore, the portable information terminal can be designed for a multiplicity of functions.

The step of outputting a sound of message information may comprises the steps of determining whether information has been received via the communication means, if information has been received via the communication means, reading the received information, and extracting and registering message information of the received information, and outputting a sound of the registered message information via the sound output means.

The program may further comprise the steps of reading facial expression information depending on the message information, from a plurality of items of facial expression information, and displaying a moving image representing a deformation from a present facial expression to a facial expression based on the read facial expression information according to a morphing technique, in substantial synchronism with the outputting of the sound of message information.

A portable information terminal according to the present invention has an interface for connection to a master unit having a function to execute a program, and comprises illegal copying prevention means for periodically determining whether legitimate information has been downloaded from the master unit or not, and if legitimate information has not been downloaded, making ineffective at least control inputs entered into the terminal.

With the above arrangement, the user has to necessarily download legitimate information from the master unit to the portable information terminal. If the user illegally copies a program via the communication means of the portable information terminal to another portable information terminal and takes the other portable information terminal to another place, at least control inputs to the other portable information terminal are made ineffective upon elapse of a predetermined time, and hence the other portable information terminal cannot be used.

Therefore, the above illegal copying can effectively be prevented, and hence the copyright of the program used by the portable information terminal can effectively be protected. This effective copyright protection leads to an increased number of legally sold and distributed programs.

Even a legitimate user can possibly forget the time of downloading legitimate information. Therefore, it is preferable to make effective again control inputs entered into the portable information terminal if legitimate information has been downloaded from the master unit after control inputs entered into the portable information terminal have been made ineffective.

The illegal copying prevention means may comprise download monitoring means for registering the year, month, and date of an instance of downloading of data, and periodic download determining means for periodically determining whether data has been downloaded or not.

The download monitoring means may comprise preprocessing means for storing the present year, month, and date in a first memory area, download detecting means for detecting whether data has been downloaded or not, ID determining means for determining whether an ID which has been downloaded is a predetermined ID or not, and registering means for setting a flag indicative of the download if the downloaded ID is the predetermined ID and registering the present year, month, and date in a second memory area.

The periodic download determining means may comprise effective/ineffective determining means for determining whether the present year, month, and date stored in the first and second memory areas are effective or ineffective, and making at least control inputs ineffective if the stored present year, month, and date are ineffective, elapsed time determining means for determining whether a predetermined period has elapsed or not on the basis of the present year, month, and date stored in the first and second memory areas, and flag determining means for determining whether the flag has been set or not if the predetermined period has elapsed, making at least control inputs ineffective if the flag has not been set, and resetting the flag if the flag has been set.

According to the present invention, an entertainment system comprises an entertainment apparatus having a function to execute a program, and a portable information terminal detachably connected to the entertainment apparatus and having an interface for being electrically connected to the entertainment apparatus, the portable information terminal comprising illegal copying prevention means for periodically determining whether legitimate information has been downloaded from the entertainment apparatus or not, and if legitimate information has not been downloaded, making ineffective at least control inputs entered into the portable information terminal.

Since the user has to necessarily download legitimate information from the master unit to the portable information terminal, it is effective to prevent illegal copying, and hence the copyright of the program used by the portable information terminal can effectively be protected.

The illegal copying prevention means may comprise means for making effective again control inputs entered into the portable information terminal if legitimate information has been downloaded from the entertainment apparatus after control inputs entered into the portable information terminal have been made ineffective.

The illegal copying prevention means may comprise download monitoring means for registering the year, month, and date of an instance of downloading of data, and periodic download determining means for periodically determining whether data has been downloaded or not.

The download monitoring means may comprise preprocessing means for storing the present year, month, and date in a first memory area, download detecting means for detecting whether data has been downloaded or not, ID determining means for determining whether an ID which has been downloaded is a predetermined ID or not, and registering means for setting a flag indicative of the download if the downloaded ID is the predetermined ID and registering the present year, month, and date in a second memory area.

The periodic download determining means may comprise effective/ineffective determining means for determining whether the present year, month, and date stored in the first and second memory areas are effective or ineffective, and making at least control inputs ineffective if the stored present year, month, and date are ineffective, elapsed time determining means for determining whether a predetermined period has elapsed or not on the basis of the present year, month, and date stored in the first and second memory areas, and flag determining means for determining whether the flag has been set or not if the predetermined period has elapsed, making at least control inputs ineffective if the flag has not been set, and resetting the flag if the flag has been set.

A recording medium according to the present invention stores a program which can be executed by a portable information terminal having an interface for connection to a master unit which has a function to execute the program, the program comprising the steps of periodically determining whether legitimate information has been downloaded from the master unit or not, and, if legitimate information has not been downloaded, making ineffective at least control inputs entered into the portable information terminal.

With the above recording medium being used, the user has to necessarily download legitimate information from the master unit to the portable information terminal, it is effective to prevent illegal copying, and hence the copyright of the program used by the portable information terminal can effectively be protected.

The program may further comprise the step of making effective again control inputs entered into the portable information terminal if legitimate information has been downloaded from the master unit after control inputs entered into the portable information terminal have been made ineffective.

The program may further comprise the steps of registering the year, month, and date of an instance of downloading of data, and periodically determining whether data has been downloaded or not.

The program may further comprise the steps of storing the present year, month, and date in a first memory area, detecting whether data has been downloaded or not, determining whether an ID which has been downloaded is a predetermined ID or not, and setting a flag indicative of the download if the downloaded ID is the predetermined ID and registering the present year, month, and date in a second memory area.

The program may further comprise the steps of determining whether the present year, month, and date stored in the first and second memory areas are effective or ineffective, and making at least control inputs ineffective if the stored present year, month, and date are ineffective, determining whether a predetermined period has elapsed or not on the basis of the present year, month, and date stored in the first and second memory areas, and determining whether the flag has been set or not if the predetermined period has elapsed, making at least control inputs ineffective if the flag has not been set, and resetting the flag if the flag has been set.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a perspective view of the terminal with a lid being open;

FIG. 19 is a diagram showing details of a message table used by the facial expression display means;

FIG. 20 is a diagram showing details of a facial expression table used by the facial expression display means;

FIG. 21 is a functional block diagram of the facial expression display means;

FIG. 34 is a view showing, by way of example, advice items displayed by the display unit according to an adviser function;

FIG. 37 is a diagram showing details of a fortune message table used by the adviser function program;

FIG. 52 is a view showing a pattern of facial expressions (part 1) displayed by the display unit of the terminal;

FIG. 53 is a view showing a pattern of facial expressions (part 2) displayed by the display unit of the terminal;

FIG. 54 is a view showing a pattern of facial expressions (part 3) displayed by the display unit of the terminal;

FIG. 55 is a view showing a pattern of facial expressions (part 4) displayed by the display unit of the terminal;

DESCRIPTION OF THE PREFERRED EMBODIMENT

A portable information terminal according to an embodiment of the present invention, which can also be used as a portable toy, and an entertainment system according to an embodiment of the present invention, which has an entertainment apparatus, will hereinafter be described with reference to FIGS. 1 through 55.

Figure 1:
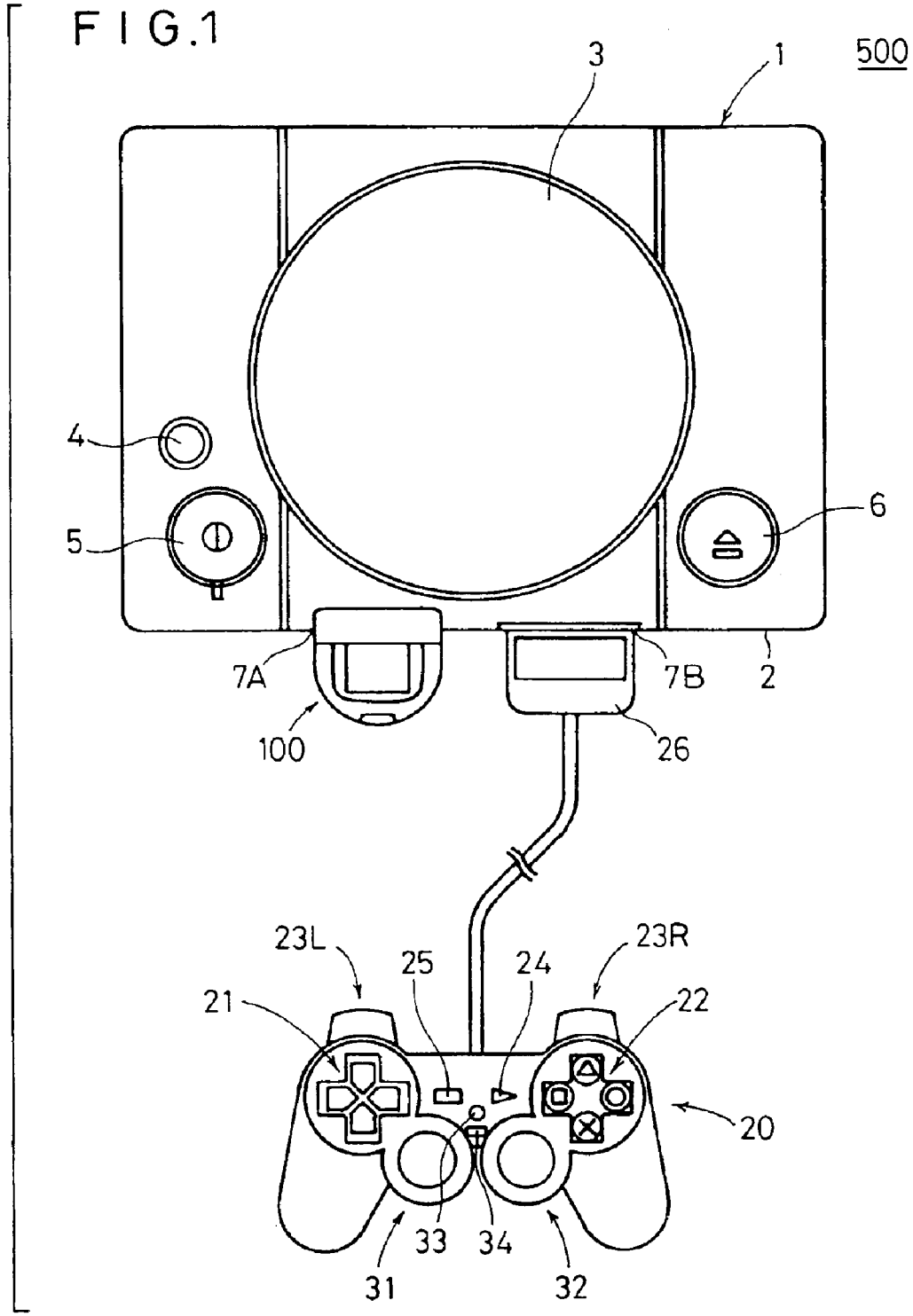
FIG. 1 is a plan view of an entertainment system according to the present invention.

As shown in FIG. 1, an entertainment system, generally denoted by 500, according to the embodiment of the present invention has an entertainment apparatus 1 to which a terminal 100 according to the embodiment of the present invention is detachably connected.

The entertainment apparatus 1 reads a program recorded in an optical disk or the like, for example, and executes a game, for example, based on the program depending on commands from the user, e.g., the game player. The execution of the game mainly represents controlling the progress of the game and the display of images and the generation of sounds.

The entertainment apparatus 1 has a rectangular casing 2 which houses a disk loading unit 3 substantially centrally therein for loading an optical disk such as a CD-ROM or the like as a recording medium for supplying an application program recorded therein. The casing 2 supports a reset switch 4 for resetting a program which is being presently executed, a power supply switch 5, a disk control switch 6 for controlling the loading of the optical disk, and two slots 7A, 7B.

The entertainment apparatus 1 may be supplied with the application program via a communication link, rather than being supplied from the optical disk as the recording medium.

The entertainment system 500 also includes a manual controller 20 for supplying user's commands to the entertainment apparatus 1.

Two manual controllers 20 may be connected respectively to the slots 7A, 7B for allowing two users or game players to play a competition game, for example. A memory card which has conventionally been used or a terminal according to the embodiment of the present invention may also be inserted into the slots 7A, 7B. While the two slots 7A, 7B are shown in FIG. 1, the entertainment apparatus 1 may have more or less than two slots.

The manual controller 20 has first and second control pads 21, 22, a left button 23L, a right button 23R, a start button 24, a selector button 25, analog control pads 31, 32, a mode selector switch 33 for selecting control modes for the analog control pads 31, 32, and an indicator 34 for indicating a selected control mode. The manual controller 20 also has a vibration imparting mechanism (not shown) disposed therein for imparting vibrations to the manual controller 20 depending on how the video game proceeds. The manual controller 20 is electrically connected to the slot 7B in the casing 2 by a connector 26.

Figure 2:
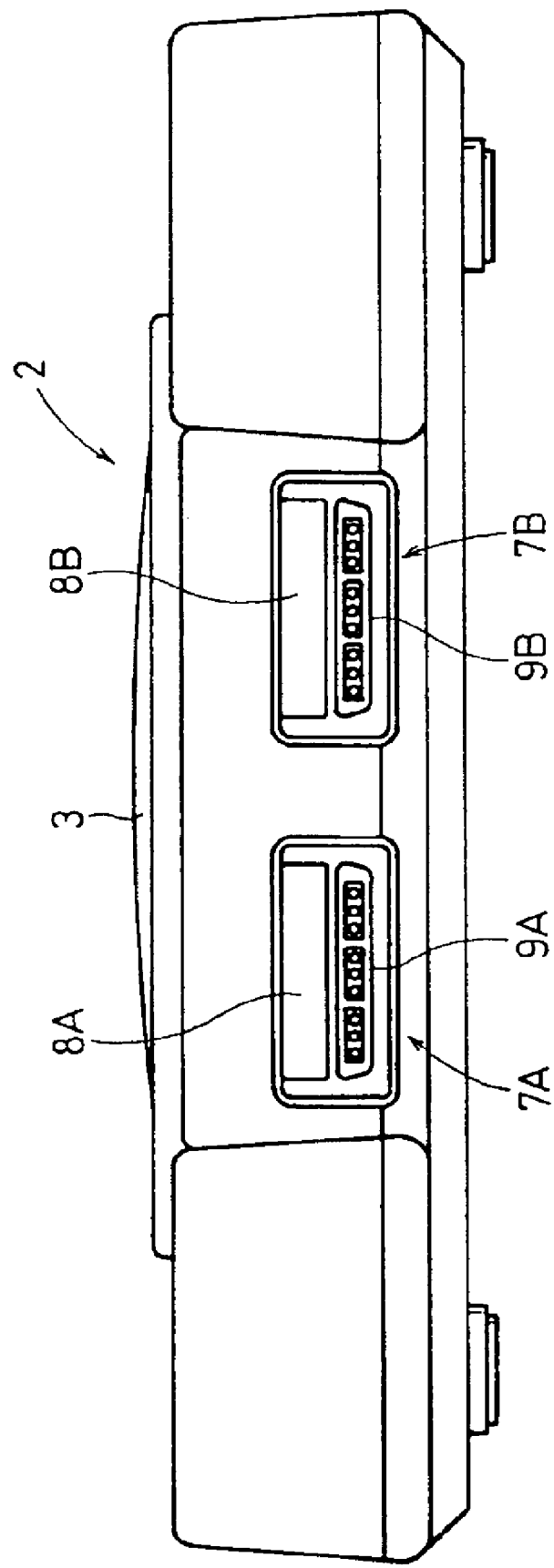
FIG. 2 is a front view of an entertainment apparatus, showing slots thereof.

FIG. 2 shows the slots 7A, 7B which are defined in a front panel of the casing 2 of the entertainment apparatus 1.

Each of the slots 7A, 7B has upper and lower units. Specifically, the slots 7A, 7B have respective memory card insertion units 8A, 8B as their upper units for inserting a memory card or the terminal 100 therein and respective controller connectors (jacks) 9A, 9B as their lower units for connection to a connection terminal (connector) 26 of the manual controller 20.

The memory card insertion units 8A, 8B have respective insertion holes (slots) that are of a horizontally elongate rectangular shape. These insertion slots have lower opposite corners round in contrast to upper opposite corners thereof so that the memory card will not be inserted into the memory card insertion units 8A, 8B in the wrong orientation. The memory card insertion units 8A, 8B also have shutters for protecting connection terminals disposed therein for electric connection.

The controller connectors 9A, 9B also have respective insertion holes (slots) that are of a horizontally elongate rectangular shape. These insertion slots have lower opposite corners round in contrast to upper opposite corners thereof so that the connector terminal 26 of the manual controller 20 will not be connected to the controller connectors 9A, 9B in the wrong orientation. The insertion holes of the controller connectors 9A, 9B are different in shape from the insertion holes of the memory card insertion units 8A, 8B so that the memory card will not be inserted into the insertion holes of the controller connectors 9A, 9B.

Figure 3:
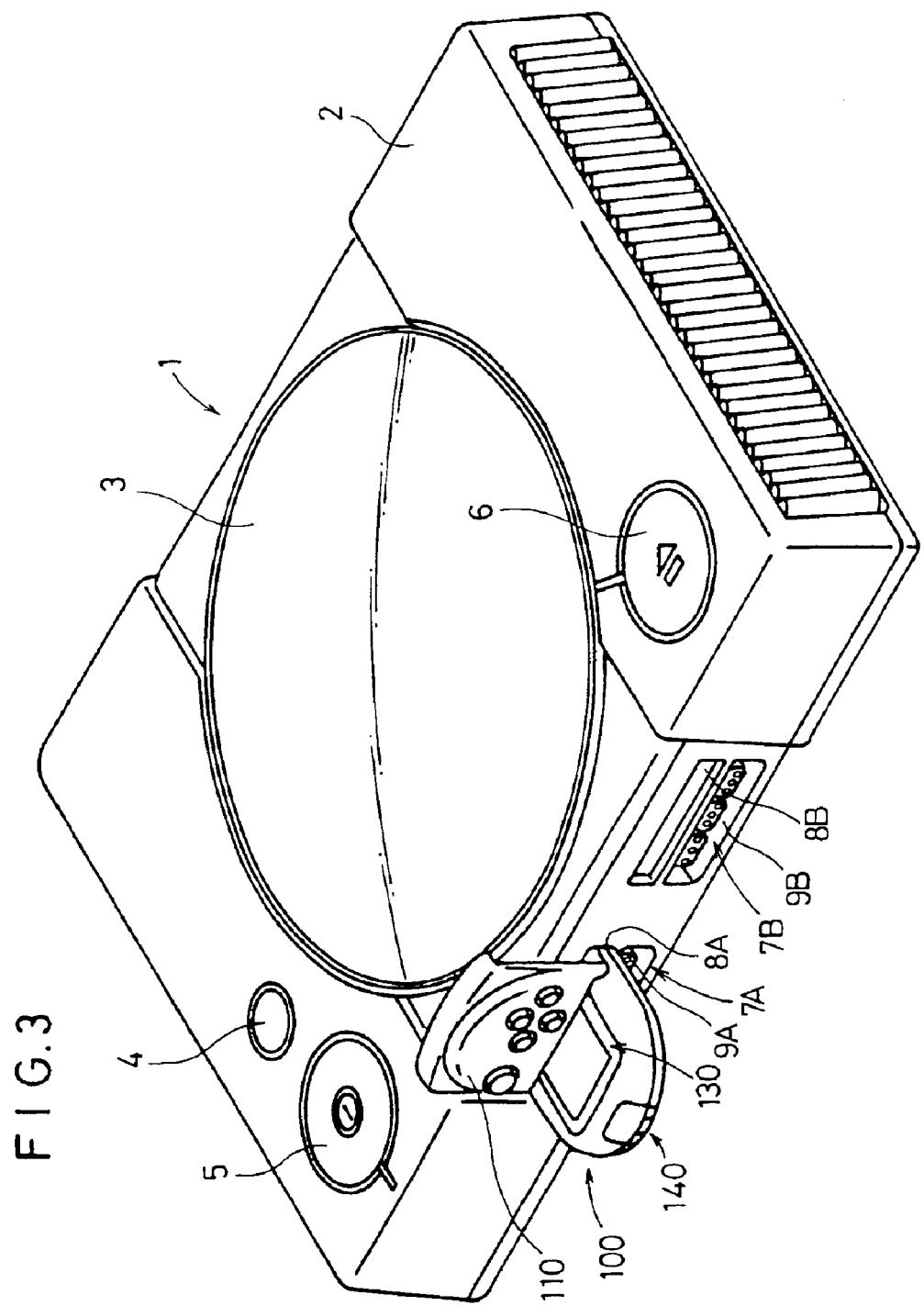
FIG. 3 is a perspective view of the entertainment apparatus.

In FIG. 3, the terminal 100 is inserted in the memory card insertion unit 8A in the slot 7A which is defined in the front panel of the entertainment apparatus 1.

Figure 4:
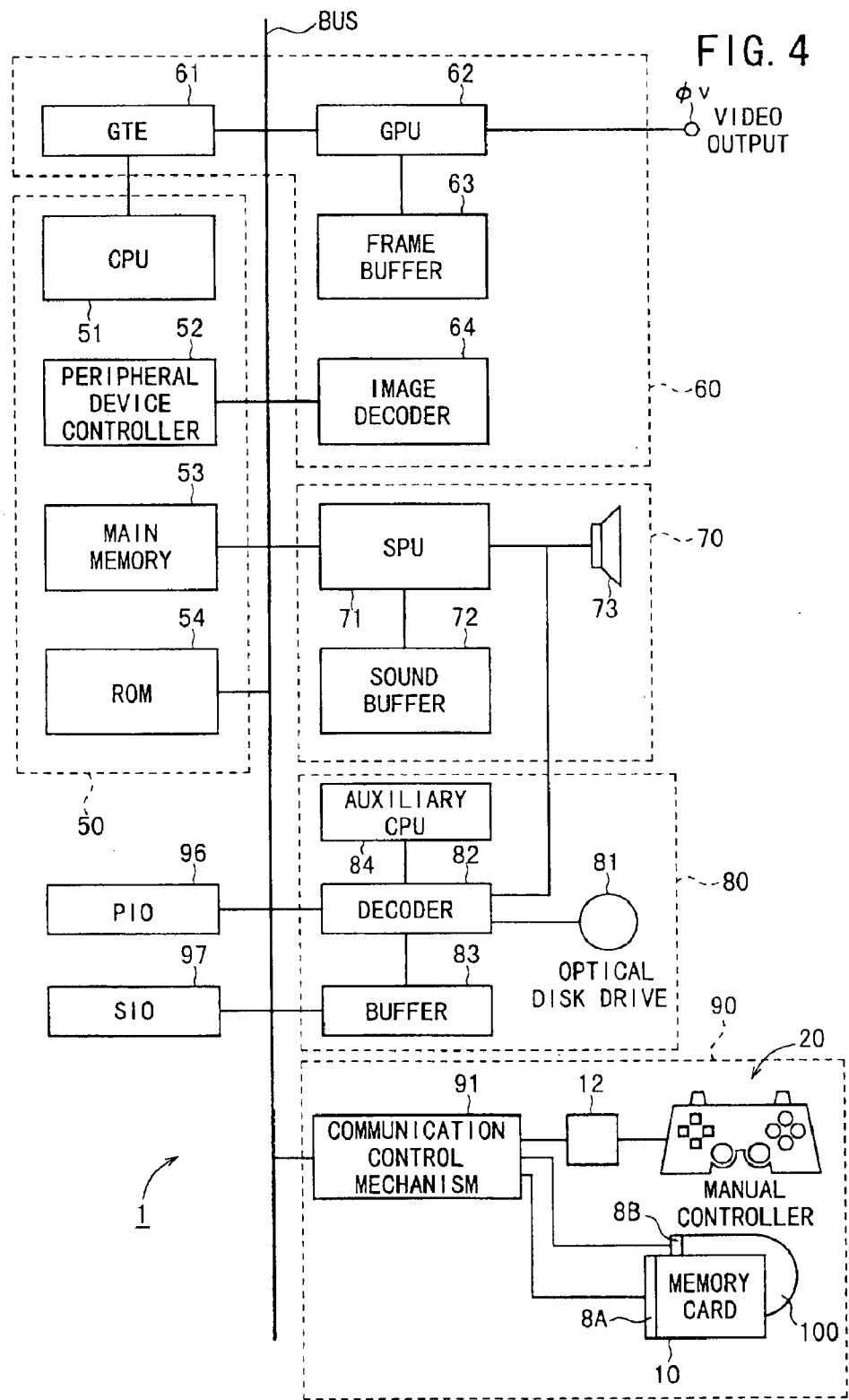
FIG. 4 is a block diagram of a specific arrangement of major components of the entertainment apparatus.

A specific arrangement of the entertainment apparatus 1 will be described below with reference to FIG. 4. As shown in FIG. 4, the entertainment apparatus 1 comprises a control system 50 including a central processing unit (CPU) 51 and its peripheral devices, a graphic system 60 including a graphic processing unit (GPU) 62 for generating and storing image data in a frame buffer 63, a sound system 70 including a sound processing unit (SPU) 71 for generating music sounds and sound effects, an optical disk controller 80 for controlling an optical disk in which application programs are recorded, a communication controller 90 for controlling signals from the manual controller 20 which enter instructions, from the user, and data supplied to and from a memory card 10 which stores game settings, and a bus BUS to which the control system 50, the graphic system 60, the sound system 70, the optical disk controller 80, and the communication controller 90 are connected.

The control system 50 comprises a CPU 51, a peripheral device controller 52 for controlling interrupts and direct memory access (DMA) data transfer, a main memory 53 comprising a random-access memory (RAM), and a read-only memory (ROM) 54 which stores various programs such as an operating system for managing the main memory 53, the graphic system 60, the sound system 70, etc. The main memory 53 is a memory capable of storing a program which is being executed.

The CPU 51 controls the entertainment apparatus 1 in its entirety by executing the operating system stored in the ROM 54. The CPU 51 comprises a 32-bit RISC-CPU, for example.

When the entertainment apparatus 1 is turned on, the CPU 51 executes the operating system stored in the ROM 54 to start controlling the graphic system 60, the sound system 70, etc. For example, when the operating system is executed, the CPU 51 initializes the entertainment apparatus 1 in its entirety for checking its operation, and thereafter controls the optical disc controller 80 to execute an application program recorded in the optical disk.

As the application program is executed, the CPU 51 controls the graphic system 60, the sound system 70, etc. depending on commands entered from the user for thereby controlling the display of images and the generation of music sounds and sound effects.

The graphic system 60 comprises a geometry transfer engine (GTE) 61 for performing coordinate transformations and other processing, a GPU 62 for generating image data according to instructions from the CPU 51, a frame buffer 63 for storing image data generated by the GPU 62, and an image decoder 64 for decoding image data compressed and encoded by an orthogonal transform such as a discrete cosine transform.

The GTE 61 has a parallel arithmetic mechanism for performing a plurality of arithmetic operations parallel to each other, and can perform coordinate transformations, light source calculations, matrixes, or vectors at a high speed in response to a request from the CPU 51. Specifically, the GTE 61 can calculate the coordinates of a maximum of 1.5 million polygons per second for a flat shading process to plot one triangular polygon with one color, for example. With the GTE 61, the entertainment apparatus 1 is able to reduce the burden on the CPU 51 and perform high-speed coordinate calculations.

According to an image generating instruction from the CPU 51, the GPU 62 generates and stores the data of a polygon or the like in the frame buffer 63. The GPU 62 is capable of generating and storing a maximum of 360 thousand polygons per second.

The frame buffer 63 comprises a dual-port RAM, and is capable of simultaneously storing image data generated by the GPU 62 or image data transferred from the main memory 53, and reading image data for display.

The frame buffer 63 has a storage capacity of 1 Mbytes, for example, and is handled as a 16-bit matrix made up of a horizontal row of 1024 pixels and a vertical column of 512 pixels. The frame buffer 63 has a display area for storing image data to be outputted as video output data, a CLUT (color look-up table) area for storing a color look-up table which will be referred to by the GPU 62 when it generates a polygon or the like, and a texture area for storing texture data to be subjected to coordinate transformations when a polygon is generated by the GPU 62 and to be mapped onto the generated polygon. The CLUT area and the texture area are dynamically varied as the display area is varied.

The GPU 62 can perform, in addition to the flat shading process, a Gouraud shading process for determining colors in polygons by interpolating intensities from the vertices of the polygons, and a texture mapping process for mapping textures stored in the texture areas onto polygons. For performing the Gouraud shading process or texture mapping process, the GTE 61 can perform coordinate calculations for a maximum of about 500,000 polygons per second.

The image decoder 64 is controlled by the CPU 51 to decode image data of a still or moving image stored in the main memory 53, and store the decoded image into the main memory 53.

Image data reproduced by the image decoder 64 is transferred to the frame buffer 63 by the GPU 62, and can be used as a background for an image plotted by the GPU 62.

The sound system 70 comprises an SPU 71 for generating music sounds, sound effects, etc. based on instructions from the CPU 51, a sound buffer 72 for storing waveform data from the SPU 71, and a speaker 73 for outputting music sounds, sound effects, etc. generated by the SPU 71.

The SPU 71 has an ADPCM (adaptive differential PCM) function for reproducing 16-bit sound data which has been encoded as 4-bit differential sound data by ADPCM, a reproducing function for reproducing the waveform data stored in the sound buffer 72 to generate sound effects, etc., and a modulating function for modulating and reproducing the waveform data stored in the sound buffer 72.

The sound system 70 can be used as a sampling sound source which generates music sounds, sound effects, etc. based on the waveform data stored in the sound buffer 72 according to commands from the CPU 51.

The optical disk controller 80 comprises an optical disk drive 81 for reproducing application programs and data recorded on an optical disk such as a CD-ROM or the like, a decoder 82 for decoding programs and data that are recorded with an error correcting code added thereto, and a buffer 33 for temporarily storing data read from the optical disk drive 81 so as to allow the data from the optical disk to be read at a high speed. An auxiliary CPU 84 is connected to the decoder 82.

Sound data recorded on the optical disk which is read by the optical disk drive 81 includes PCM data converted from analog sound signals, in addition to the ADPCM data. The ADPCM data, which is recorded as 4-bit differential data of 16-bit digital data, is decoded by the decoder 82, supplied to the SPU 71, converted thereby into analog data, and applied to drive the speaker 73. The PCM data, which is recorded as 16-bit digital data, is decoded by the decoder 82 and then applied to drive the speaker 73.

The communication controller 90 comprises a communication control mechanism 91 for controlling communication with the CPU 51 via the bus BUS. The communication control mechanism 91 has the controller connectors 9A, 9B to which the manual controller 20 for entering commands from the user is connected, and the memory card insertion units 8A, 8B for receiving a memory card 10 as an auxiliary memory device for storing game settings, etc. and the terminal 100. The manual controller 20 connected to one of the controller connectors 9A, 9B has 16 command keys, for example, for entering commands from the user, and transmits statuses of the command keys about 60 times per second to the communication control mechanism 91 by way of synchronous communication according to an instruction from the communication control mechanism 91. The communication control mechanism 91 transmits the statuses of the command keys to the CPU 51.

In this manner, commands from the user are applied to the CPU 51, which carries out a process according to the commands based on the game program being executed.

A large amount of image data needs to be transferred at high speed between the main memory 53, the GPU 62, the image decoder 64, and the decoder 82 for reading a program, displaying an image, or generating and storing image data.

In the entertainment apparatus 1, data are transferred directly between the main memory 53, the GPU 62, the image decoder 64, and the decoder 82 according to the DMA data transfer under the control of the peripheral device controller 52, rather than the CPU 51. Therefore, the burden on the CPU 51 can be reduced for data transfer, and high-speed data transfer can be achieved between the main memory 53, the GPU 62, the image decoder 64, and the decoder 82.

When setting data of a game being executed need to be stored, the CPU 51 transmits the setting data to the communication control mechanism 91, which writes the transmitted setting data into the memory card 10 or the terminal 100 which is inserted in the memory card insertion unit 8A or 8B.

The communication control mechanism 91 has a built-in protection circuit for protection against electric breakdown. The memory card 10 and the terminal 100 are separate from the bus BUS, and can be connected and disconnected while the entertainment apparatus 1 is being energized. Therefore, when the memory card 10 and the terminal 100 suffer a storage capacity shortage, a new memory card or terminal can be connected without having to turning off the entertainment apparatus 1. Consequently, any game data that need to be backed up can be stored in a new memory card connected to the entertainment apparatus 1, without the danger of being lost.

As shown in FIG. 4, the entertainment apparatus 1 further includes a parallel I/O interface (PIO) 96 and a serial I/O interface (SIO) 97 which serve to connect the memory card 10 and the terminal 100 to the entertainment apparatus 1.

The terminal 100 according to the embodiment of the present invention will be described below. It is assumed that the terminal 100 will be used as a slave unit connected to the entertainment apparatus 1 which serves as a master unit.

The terminal 100 is inserted into one of the memory card insertion units 8A, 8B in the slots 7A, 7B of the entertainment apparatus 1, and can be used as a memory card inherent in the connected manual controller 20. For example, if two users or game players play a game on the entertainment apparatus 1, then two terminals 100 are connected to store game results of the respective users.

In order to electrically connect power supply terminals and ground terminals earlier than the other terminals when the memory card 10 and the terminal 100 are inserted into the memory card insertion units 8A, 8B, those power supply terminals and ground terminals of connectors of the memory card 10 and the terminal 100 are made longer than the other terminals for the purpose of achieving safety and stability of electric operation. Corresponding connector conductors of the memory card insertion units 8A, 8B may be made longer than the other connector conductors, or both power supply terminals and ground terminals of connectors of the memory card 10 and the terminal 100 and the connector conductors of the memory card insertion units 8A, 8B may be made longer than the other terminals and connector conductors. Furthermore, the connectors of the memory card 10 and the terminal 100 may be asymmetrically shaped in their longitudinal direction for preventing themselves from being inserted in the wrong direction.

As shown in FIGS. 5 through 8, the terminal 10 has a housing 101 which supports a manual control pad 120 having one or more direction buttons 121 and a decision button 122 for entering events and making various selections, a display unit 130 such as a liquid crystal display (LCD) unit or the like, and a window 140 for wireless communication such as infrared communication with a wireless communication command unit.

The housing 101 comprises an upper shell 110a and a lower shell 101b, and houses a board 151 which supports memory devices, etc. thereon. The housing 101 is shaped so as to be insertable into either one of the slots 7A, 7B in the casing 2 of the entertainment apparatus 1. The housing 101 has a connector 150 on the side of one end thereof which includes a rectangular window.

The window 140 is mounted on a substantially semicircular end of the housing 101 remote from the connector 150. The display unit 130 occupies a substantially half area of the upper shell 110a of the housing 101, and is positioned near the window 140.

The manual control pad 120 occupies the other substantially half area of the upper shell 111a, and is positioned remotely from the window 140. The manual control pad 120 comprises a substantially square lid 110 that is angularly movably supported on the housing 101 and supports thereon the direction buttons 121 and the decision button 122, and switch pressers 102, 103 positioned in an area of the housing 101 which can be opened and closed by the lid 110.

The direction buttons 121 and the decision button 122 extend through the lid 110 from its upper surface to its lower surface. The direction buttons 121 and the decision button 122 are supported on the lid 110 for movement into and out of the upper surface of the lid 110.

The switch pressers 102, 103 have respective pressing elements supported on the housing 101 for movement into and out of the upper surface of the housing 101. When one of the pressing elements is pressed from above, it presses a corresponding a pressure switch such as a diaphragm switch, for example, mounted on the board 151 in the housing 101.

With the lid 110 closed, the switch pressers 102, 103 are held in vertical alignment with the direction buttons 121 and the decision button 122, respectively. Therefore, while the lid 110 is being closed over the housing 101, when the direction buttons 121 and the decision button 122 are pressed from above into the upper surface of the lid 110, the direction buttons 121 and the decision button 122 cause the pressing elements of the corresponding switch pressers 102, 103 to press corresponding pressure switches in the housing 101.

Figure 8:
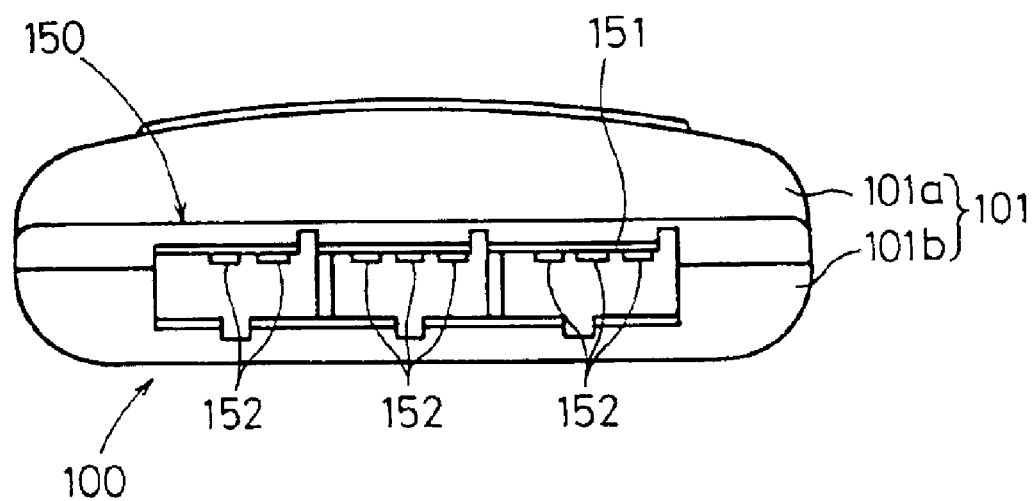
FIG. 8 is a front elevational view of the terminal.

As shown in FIG. 8, power and signal terminals 152 are mounted on the board 151 and disposed in the window of the connector 150.

The connector 150 has a shape and dimensions that are identical to those of the memory card 10 used in the entertainment apparatus 1.

An arrangement of major components of the terminal 100 will be described below with reference to FIGS. 9 and 10.

Figure 9:
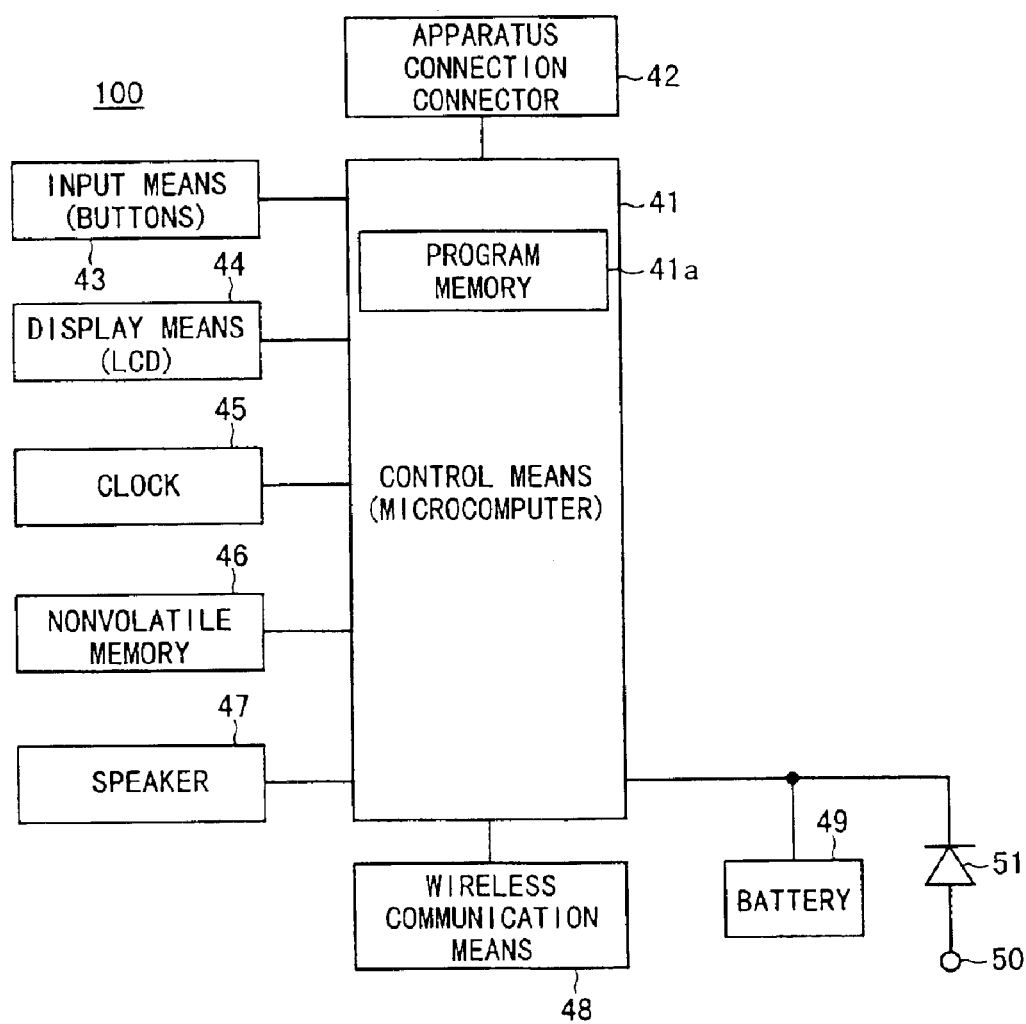
FIG. 9 is a block diagram of an arrangement of major components of the terminal.

As shown in FIG. 9, the terminal 100 comprises a control means 41 for controlling operation of the terminal 100, an apparatus connection connector 42 for connection to a slot of an information-handling apparatus, and a nonvolatile memory 46 for storing data, as with the normal memory card 10 described above.

The control means 41 comprises a microcomputer, for example. The control means 41 has a program memory 41a disposed therein as a program storage means.

The nonvolatile memory 46 comprises a semiconductor memory such as a flash memory which is capable of retaining stored data even when the terminal 100 is turned off. The terminal 100 has a battery 49 as described later on, it can use a static random-access memory (SRAM) for inputting and outputting data at high speed, rather than the nonvolatile memory 46.

The terminal 100 additionally has an event input means 43 such as control buttons for controlling a stored program, a display means 44 such as a liquid crystal display (LCD) unit or the like for displaying various items of information depending on the program, a wireless communication means 4B for sending data to and receiving data from another memory card or the like through an infrared radiation or the like, and a battery 49 for supplying electric energy to various components of the terminal 100.

The battery 49, which serves as a small-size power supply means, allows the terminal 100 to operate independently even when it is removed from the slots 7A, 7B of the entertainment apparatus 1.

The battery 49 may comprise a chargeable secondary battery. When the terminal 100 is inserted in one of the slots 7A, 7B of the entertainment apparatus 1, the terminal 100 is supplied with electric energy from the entertainment apparatus 1.

The battery 49 has a connection terminal which is connected to a power supply terminal 50 via a reverse-current prevention diode 51. When the terminal 100 is inserted in one of the slots 7A, 7B of the entertainment apparatus 1, electric energy is supplied from the entertainment apparatus 1 to the terminal 100, and if the secondary battery is used as the battery 49, the secondary battery is charged by part of the supplied electric energy.

The terminal 100 also has a clock 45 and a speaker 47 such as a piezoelectric buzzer, for example, as a sound generating means for generating sounds according to the program. The above components of the terminal 100 are connected to the control means 41, and operate under the control of the control means 41.

Figure 10:
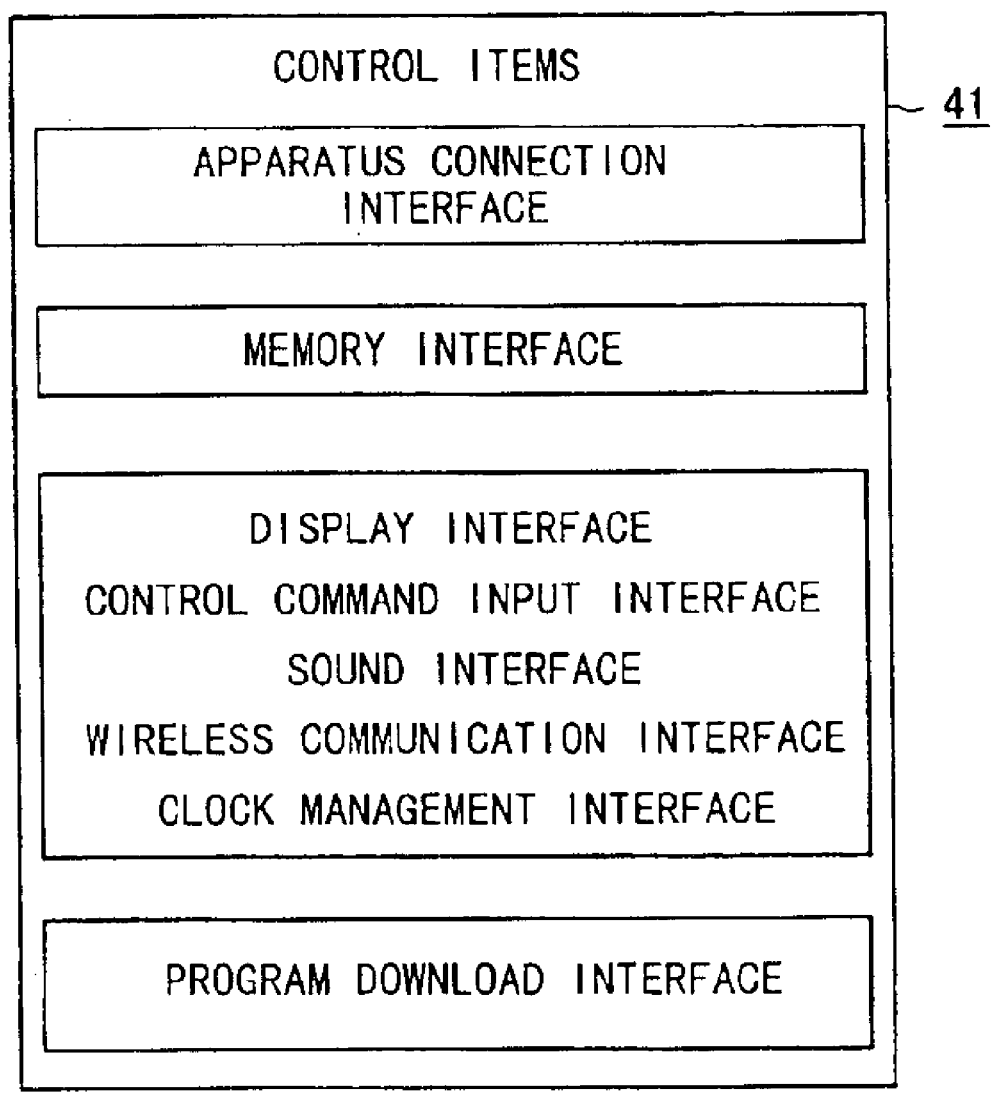
FIG. 10 is a diagram showing control items that are carried out by a control means of the terminal.

FIG. 10 shows control items that are carried out by the control means 41. Whereas the ordinary memory card 10 has only an apparatus connection interface for connection to the information-handling apparatus and a memory interface for entering data into and retrieving data from the memory, the terminal 100 has, in addition to those interfaces, a display interface, a control command input interface, a sound interface, a wireless communication interface, a clock management interface, and a program download interface.

Since the control means 41 of the terminal 100 has interfaces (drivers) for managing functions added according to the embodiment of the present invention, independently of the management for the apparatus connection interface and the memory interface, which are conventional functions, the terminal 100 is compatible with the conventional functions.

The terminal 100 can be used as a portable game device when a game application is executed, because it has the event input means 43 such as control buttons for controlling a program being executed, and the display means 44 in the form of a liquid crystal display (LCD) unit or the like.

The terminal 100 has a function to store a program downloaded from the entertainment apparatus 1 into the program memory 41a of the microcomputer 41. Therefore, an application program and various driver software that operate in the terminal 100 can easily be changed.

As described above, the terminal 100 can be controlled in operation independently of the entertainment apparatus 1. Therefore, the terminal 100 can generate data according to an application stored in the program memory 41a as the program storage means, independently of the application software in the entertainment apparatus 1. If the data thus generated is exchanged between the terminal 100 and the entertainment apparatus 1, then the terminal 100 and the entertainment apparatus 1 is capable of cooperative operation, i.e., can be linked to each other.

The clock 45 allows the terminal 100 to share time data with the entertainment apparatus 1. Specifically, not only the terminal 100 and the entertainment apparatus 1 can have time data equalized to each other, but they can share data for controlling the progress of games which they execute independently of each other, according to real time.

A specific example of cooperative operation between the terminal 100 and the entertainment apparatus 1 will be described later on.

Figure 11:
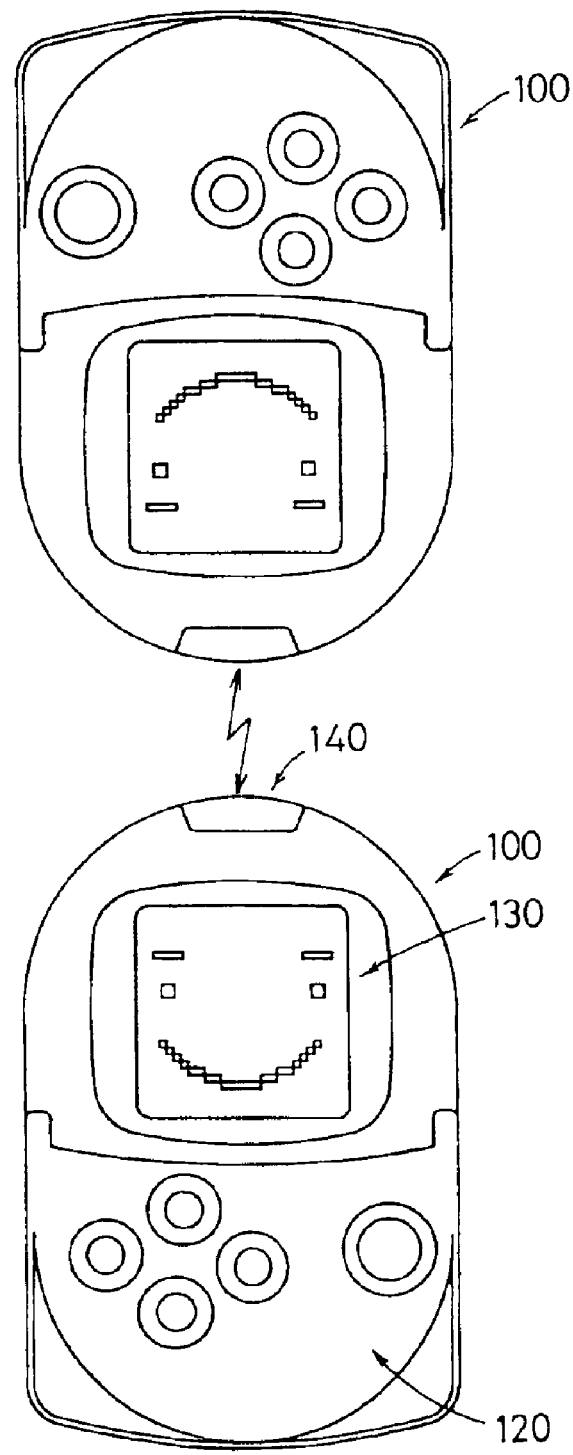
FIG. 11 is a view illustrative of a wireless communication function performed by the terminal.

FIG. 11 schematically illustrates the manner in which wireless communications are carried out between two terminals 100. The wireless communication means 48 of the terminals 100 can send data to and receive data from each other via the windows 140 which serve as wireless communication windows for effecting wireless communications with infrared rays or the like. Therefore, a plurality of memory cards are allowed to exchange internal data with each other. The internal data include data transferred from the information-handling apparatus such as the entertainment apparatus 1 and stored in the memories in the memory cards.

The terminal 100 has been described as an auxiliary storage unit for the entertainment apparatus 1. However, the terminal 100 can be used in various applications. For example, the terminal 100 is applicable to the retrieval of various items of information.

A specific example of cooperative operation between the terminal 100 and the entertainment apparatus 1 will be described below.

As described above, the terminal 100 can share game data generated by the control means or microcomputer 41, time data produced by the clock 45 in the memory card, and data generated by another memory card and transmitted via the wireless communication means 48, with the entertainment apparatus 1.

Figure 12:
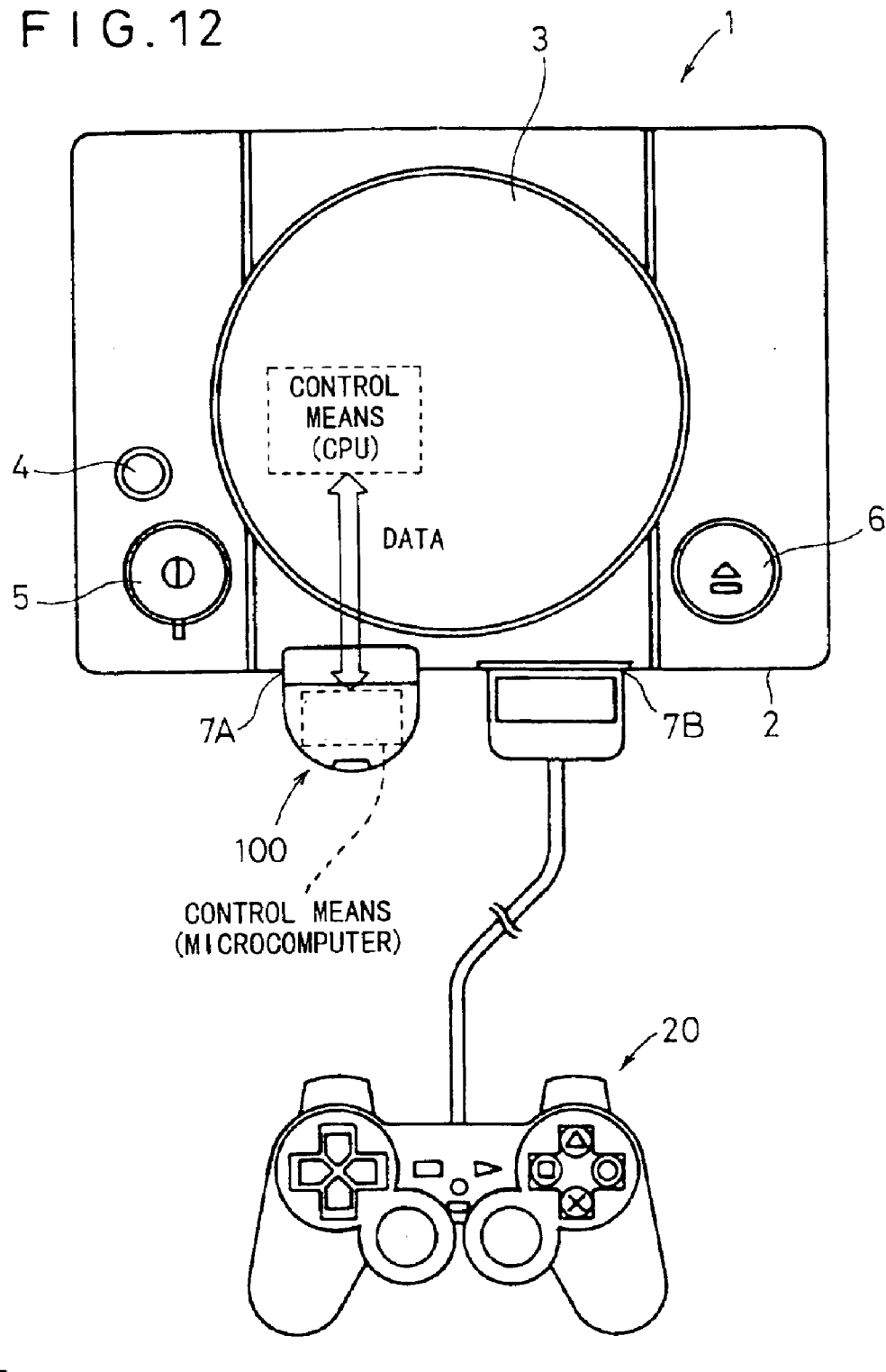
FIG. 12 is a view illustrative of cooperative operation of the entertainment apparatus (master unit) and the terminal (slave unit)

FIG. 12 is illustrative of cooperative operation of the entertainment apparatus 1 as the master unit and the terminal 100 as the slave unit.

In the specific example of cooperative operation, an optical disk (CD-ROM) as a recording medium with an application software program recorded therein is loaded in the entertainment apparatus 1, and the program read from the optical disk is downloaded to the terminal 100 inserted in the slot 7A of the entertainment apparatus 1.

Prior to describing the specific example of cooperative operation, a process of downloading the program as a basis for such cooperative operation will first be described below with reference to FIGS. 13 and 14.

Figure 13:
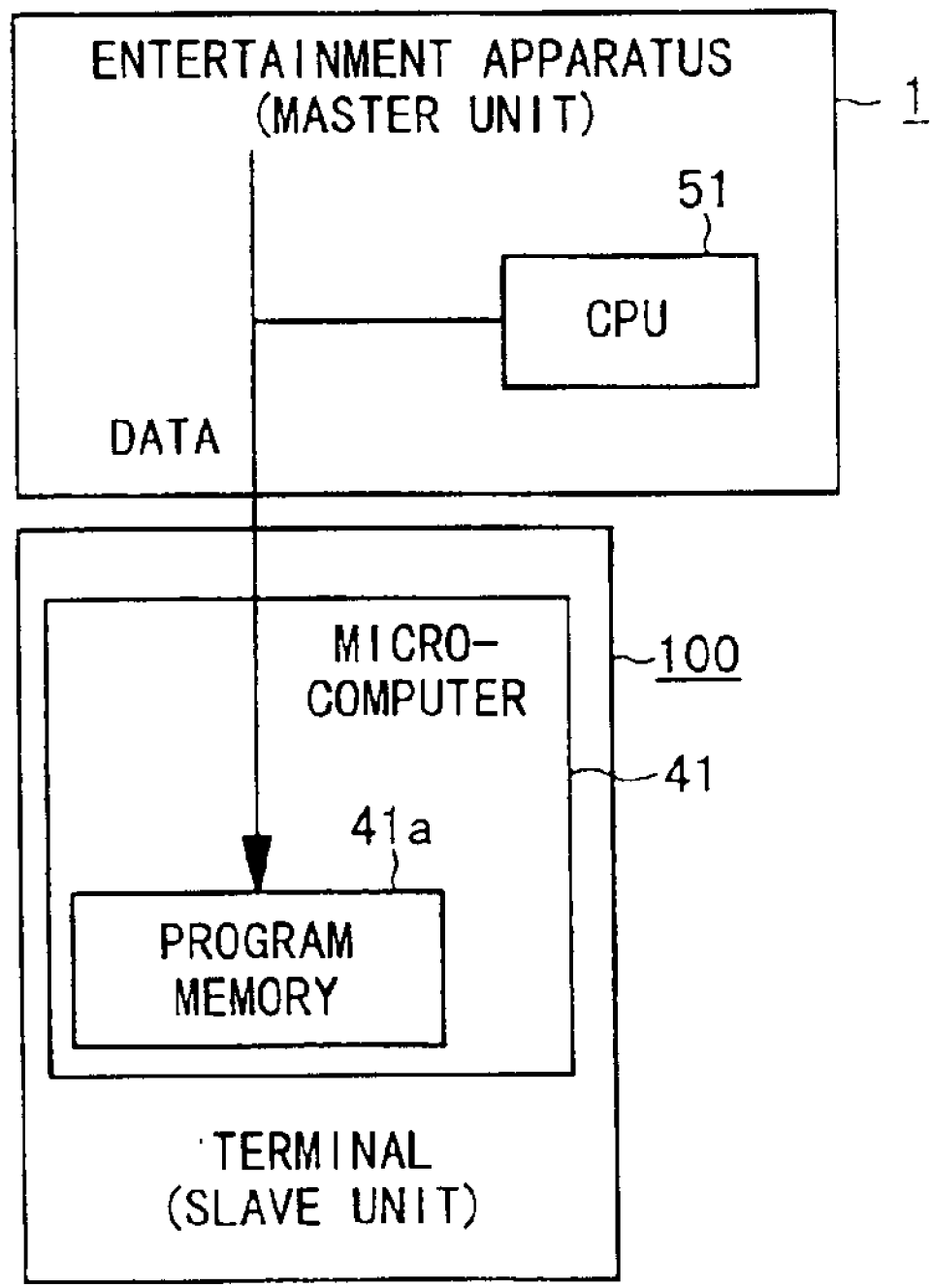
FIG. 13 is a block diagram showing a flow of program data downloaded from the entertainment apparatus (master unit) to the terminal (slave unit)
Figure 14:
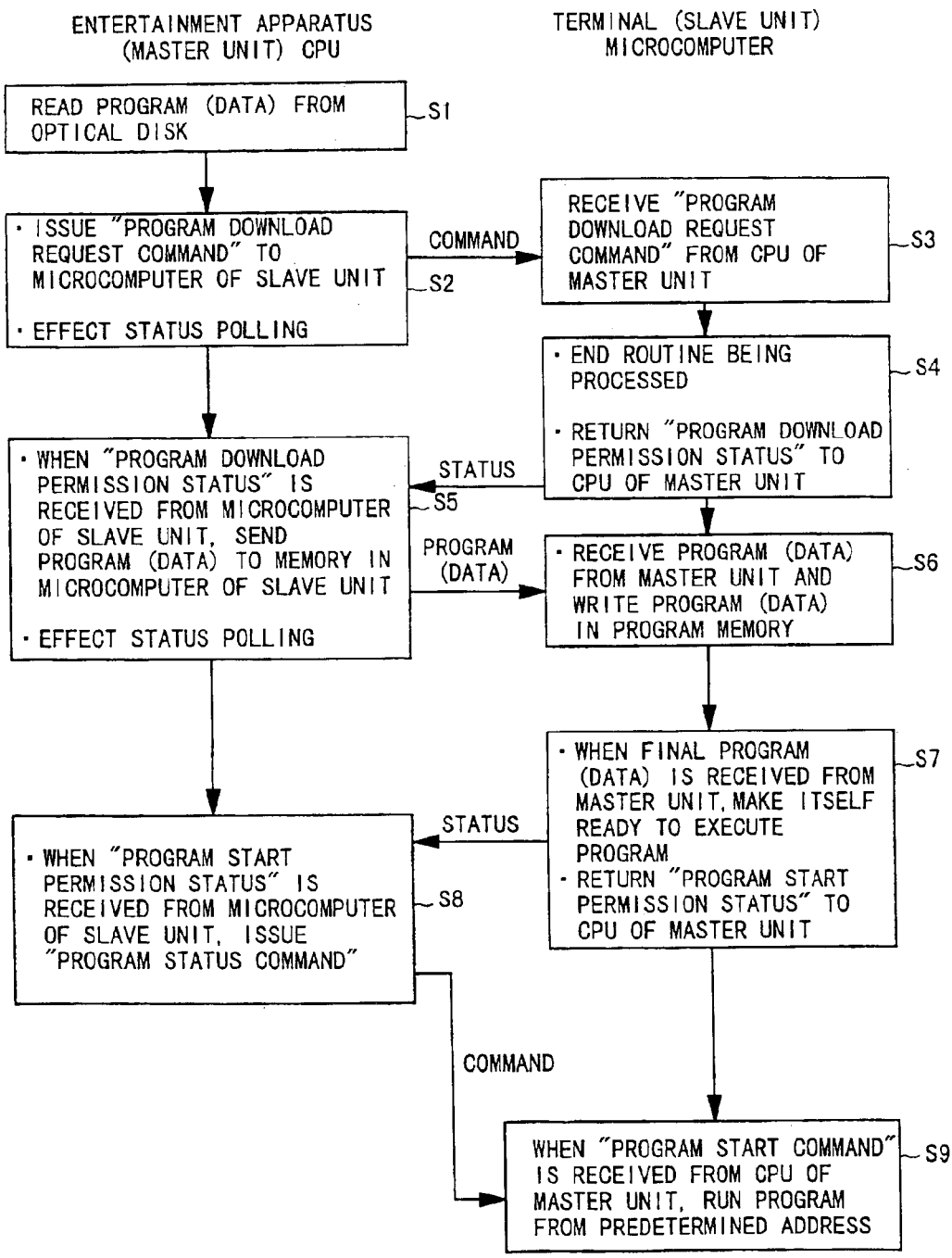
FIG. 14 is a flowchart of a sequence of downloading the program data shown in FIG. 13.

FIG. 13 shows a flow of program data which occurs when an application program such as of a video game supplied from the optical disk (CD-ROM) loaded in the disk loading unit 3 of the entertainment apparatus 1 is directly transferred (downloaded) via the CPU 51 of the entertainment apparatus 1 to the program memory 41a in the microcomputer 41 of the terminal 100. FIG. 14 shows a sequence of downloading the program data shown in FIG. 13.

In step S1 shown in FIG. 14, an application program of a video game which is to be run by the microcomputer in the terminal 100 (hereinafter also referred to as "slave unit") is read as data from the CD-ROM loaded in the disk loading unit 3 of the entertainment apparatus 1 (hereinafter also referred to as "master unit"). Generally, the application program thus read is different from an application program that is run by the entertainment apparatus 1.

In step S2, the CPU 51 issues a "program download request command" to the microcomputer 41. The CPU 51 performs polling in order to receive a "program download permission status" from the microcomputer 41. The polling refers to a process of interrogation to determine whether there is a service request or not.

In step S3, the microcomputer 41 receives the "program download request command" from the CPU 51.

In step S4, when the microcomputer 41 finishes a routine which is being presently executed and is able to execute program downloading, the microcomputer 41 returns the "program download permission status" to the CPU 51.

In step S5, when the CPU 51 receives the "program download permission status" from the microcomputer 41, the CPU 51 transfers (downloads) the program read from the CD-ROM in step S1 to the program memory 41a of the terminal 100 and stores the program in the program memory 41a. The CPU!51 performs polling to receive a "program start permission status" from the microcomputer 41.

The addresses of the program memory 41a where the downloaded data are stored are managed by the microcomputer 41. While the program downloaded from the master unit has been described as being stored in the program memory 41a, the program may be stored in a memory such as a SRAM or the like capable of inputting and outputting data at high speed.

In step S6, the microcomputer 41 receives the program transferred from the master unit as data, and stores the received program in the program memory 41a. At this time, the CPU 51 sees the program data as being directly stored in the program memory 41a of the terminal 100. As described above, the addresses of the program memory 41a are managed by the microcomputer 41.

In step S7, when the microcomputer 41 receives final program data from the master unit and is ready to execute the program, the microcomputer 41 returns the "program start permission status" to the CPU 51.

In step S8, the CPU 51 receives the "program start permission status" from the microcomputer 41, and issues a "program start command".

In step S9, when the microcomputer 41 receives the "program start command" from the CPU 51, the microcomputer 41 starts to run the program from a predetermined address.

According to the above processing sequence, the application program is directly transferred (downloaded) from the entertainment apparatus 1 to the program memory 41a in the microcomputer 41 of the terminal 100 that is inserted in the entertainment apparatus 1.

As described above, the means for supplying the application program is not limited to the recording medium such as an optical disk or the like, but the application program may be supplied via a communication link. If the application program is supplied via a communication link, then only the processing in step S1 shown in FIG. 14 is changed.

The above downloading process downloads the application program directly from the entertainment apparatus 1 to the program memory 41a in the microcomputer 41 of the terminal 100 that is inserted in the entertainment apparatus 1.

However, the CPU 51 may first download data of an application program to the nonvolatile memory 46 in the terminal 100, and thereafter the application program data may be copied to the program memory 41a in the microcomputer 41, after which the application program may be executed.

Figure 15:
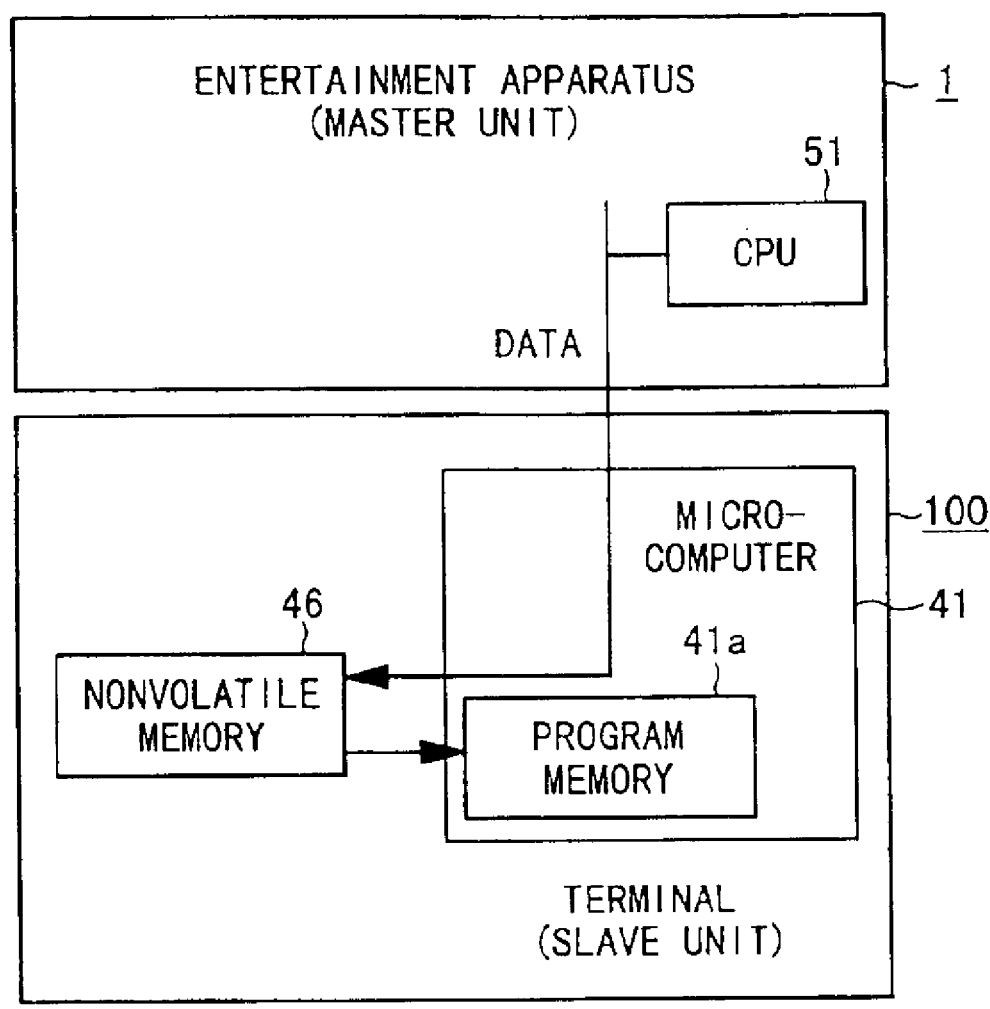
FIG. 15 is a block diagram showing another flow of program data downloaded from the entertainment apparatus (master unit) to the terminal (slave unit)
Figure 16:
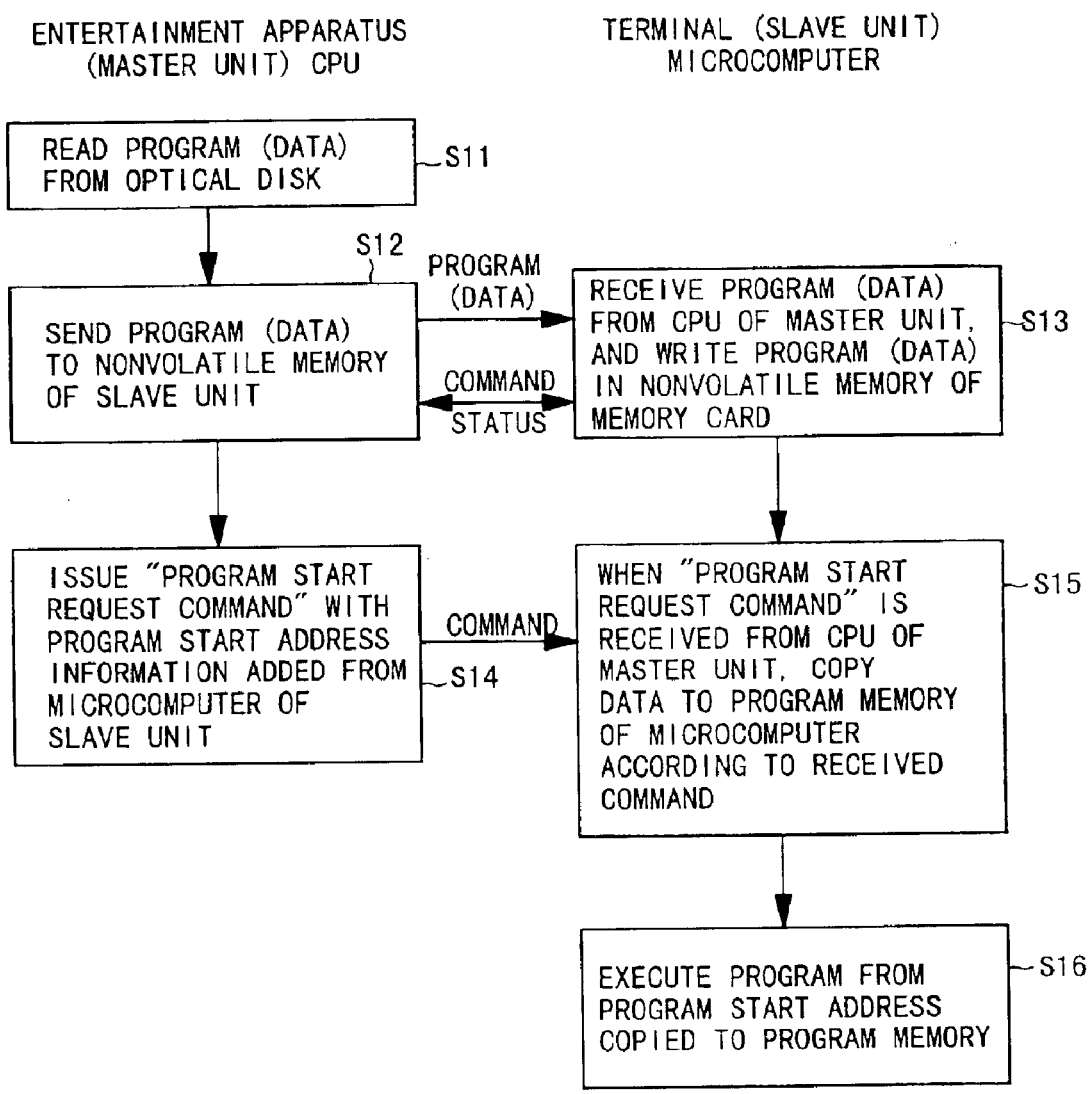
FIG. 16 is a flowchart of a sequence of downloading the program data shown in FIG. 15.

FIG. 15 shows such a flow of program data, and FIG. 16 shows a sequence of downloading the program data shown in FIG. 15.

As shown in FIG. 15, an application program of a video game which is supplied from the CD-ROM loaded in the disk loading unit 3 of the entertainment apparatus 1 is transferred (downloaded) via the CPU 51 of the entertainment apparatus 1 to the nonvolatile memory 46 in the terminal 100, thereafter copied to the program memory 41a in the microcomputer 41, and then executed.

In step S11 shown in FIG. 16, an application program of a video game which is to be run by the microcomputer in the terminal 100 is read as data from the CD-ROM loaded in the disk loading unit 3 of the entertainment apparatus 1.

In step S12, the CPU 51 transfers (downloads) the program data read from the CD-ROM to the nonvolatile memory 46 in the terminal 100. This process is the same as when data are backed up in a conventional entertainment apparatus.

In step S13, the microcomputer 41 receives the program transferred from the CPU 51 as data, and stores the received program data in the nonvolatile memory 46, in the same manner as with the conventional data backup process.

In step S14, the entertainment apparatus 1 issues a program start request command with an address added where the downloaded program is to start.

In step S15, when the microcomputer 41 receives the "program start request command" from the CPU 51, the microcomputer 41 copies data of an indicated size to the program memory 41a from the address indicated by the above command in the nonvolatile memory 46.

In step S16, the microcomputer 41 executes the program copied to the program memory 41a from its starting address.

According to the above process, the program of the application software is transferred (downloaded) from the entertainment apparatus 1 via the nonvolatile memory 46 to the program memory 41a in the microcomputer 41 of the terminal. 100.

Generally, the application program downloaded from the entertainment apparatus 1 to the terminal 100 is different from an application program that is run by the entertainment apparatus 1. However, the downloaded application program may be run on both the entertainment apparatus 1 and the terminal 100. In such a case, the CPU of the entertainment apparatus 1 and the microcomputer of the terminal 100 need to comprise identical processors.

Figure 5:
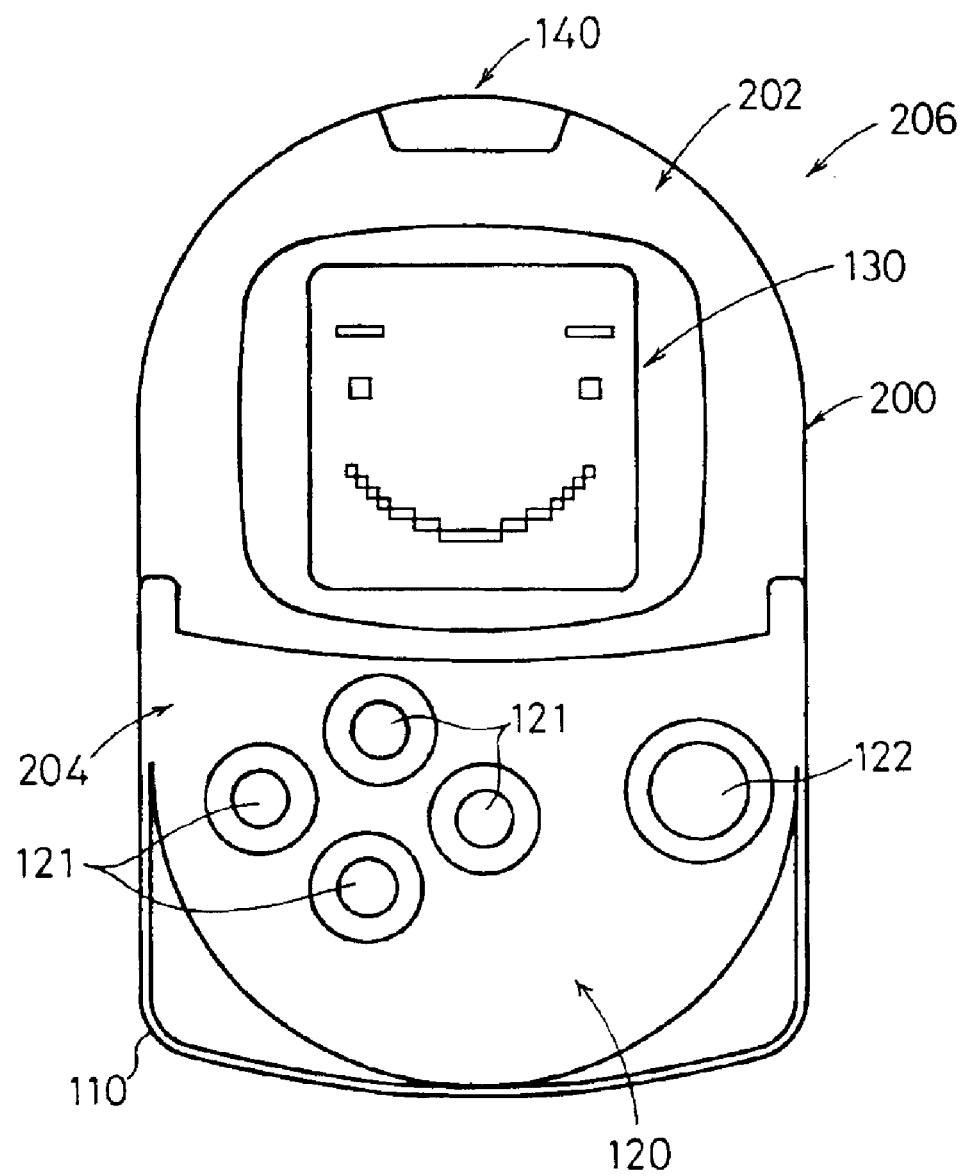
FIG. 5 is a plan view of a terminal according to the present invention.
Figure 6:
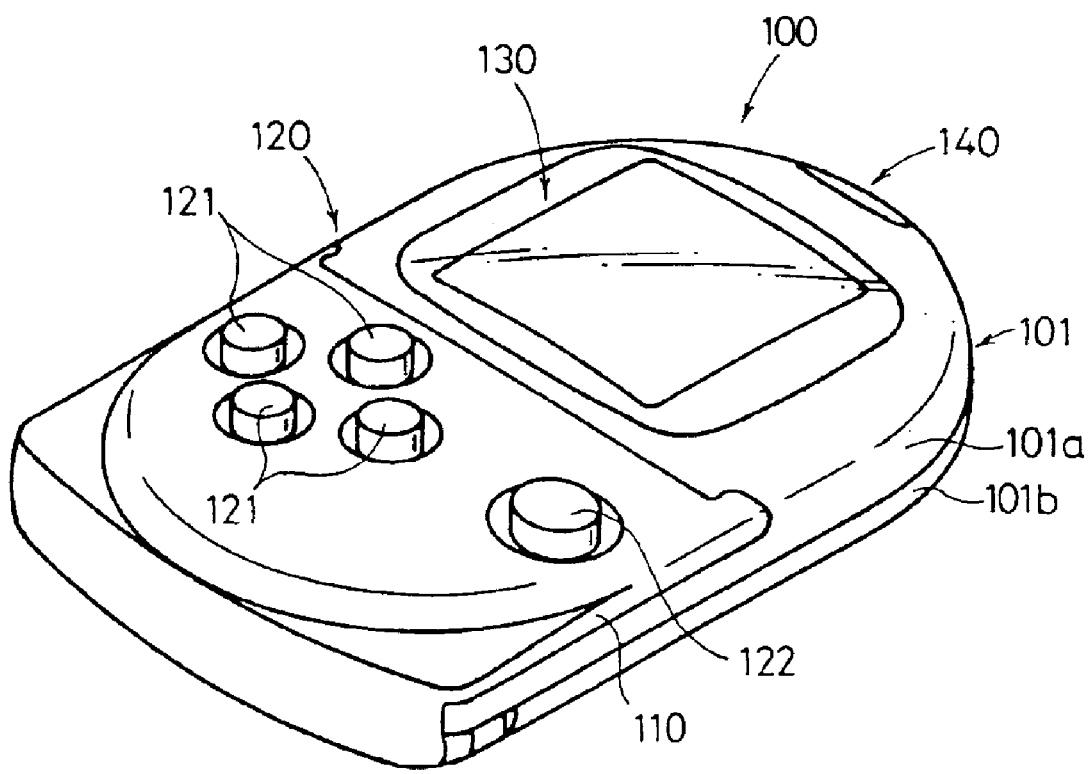
FIG. 6 is a perspective view of the terminal.

As shown in FIG. 5, the terminal 100 has a body casing 200 surrounding the display unit 130, with the casing 200 and the display unit 130 representing a form 206 comprising a head 202 and a body 204. The display unit 130 functions as at least a means for presenting facial expressions of the form 206. The display unit 130 comprises a display screen for displaying images based on generated image data. The image data are generated by an image processing means which is incorporated as software (program) in the terminal 100 and controlled by the control means 41 (see FIG. 9).

The image processing means may be stored in the program memory in advance, or may be downloaded from the entertainment apparatus 1 and stored in the program memory 41a.

Figure 17:
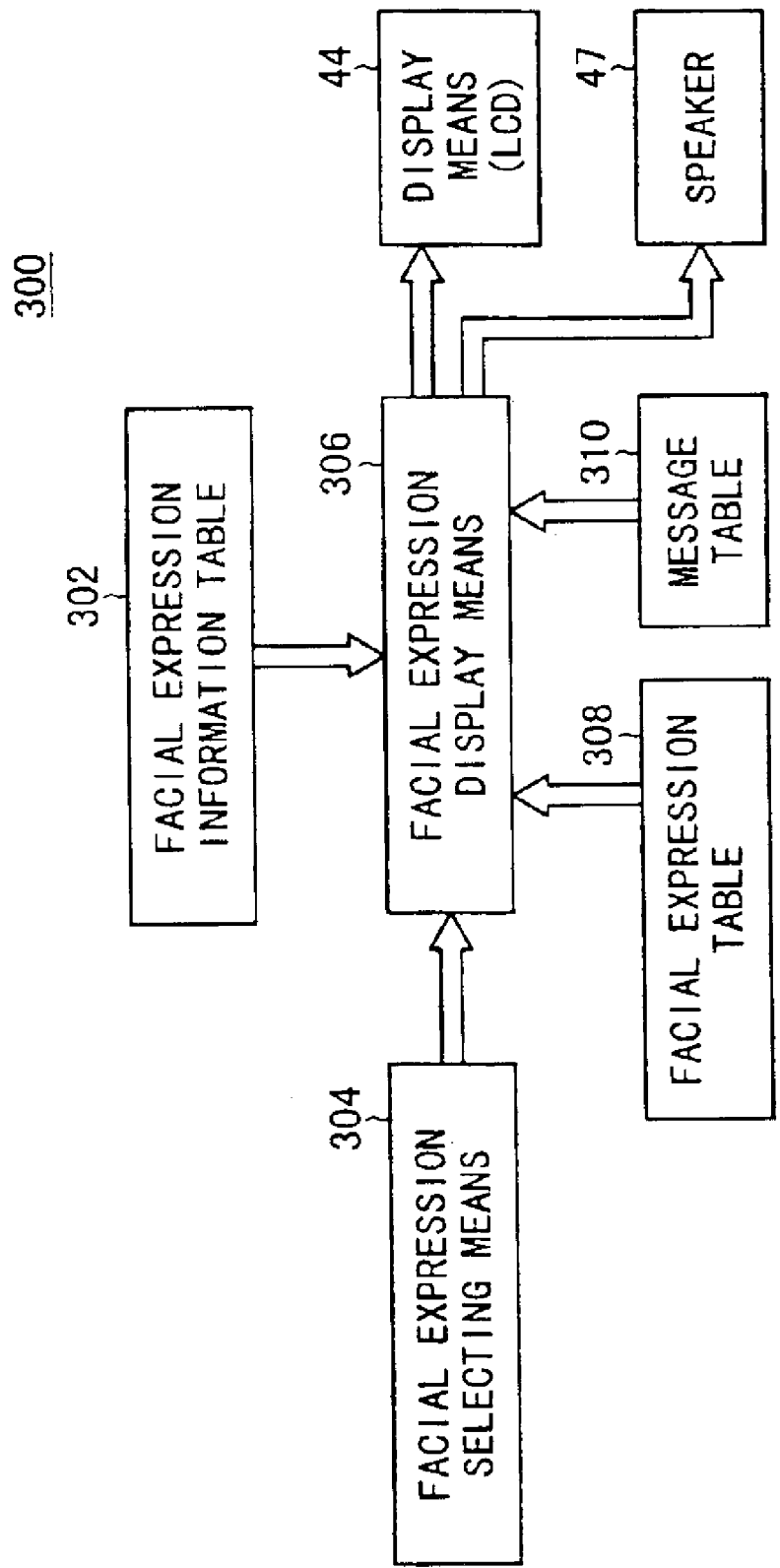
FIG. 17 is a block diagram of an image processing means according to the present invention.

As shown in FIG. 17, the image processing means, generally denoted by 300, has a facial expression information table 302 stored in the nonvolatile memory 46 for storing a plurality of items of registered facial expression information, a facial expression selecting means 304 for selecting one of the items of registered facial expression information from the facial expression information table 302, and a facial expression display means 306 for reading the facial expression information selected by the facial expression selecting means 304 and displaying a moving image which represents a transformation from the current facial expression to the facial expression based on the read facial expression information according to a morphing technique.

If information indicating the outputting of a message is added to the selected facial expression information, then the facial expression display means 306 outputs a message based on the added information to the speaker 47.

Facial expression image data (point data for morphing, etc.) in respective records are recorded in a facial expression table 308 stored in the nonvolatile memory 46, for example, as shown in FIG. 20. Specifically, the facial expression table 308 stores image data of a facial expression (final facial expression) in each record. Final facial expression data (actually displayed facial expressions) stored in the facial expression table 308 are shown by way of example in FIGS. 52 through 55.

Figure 18:
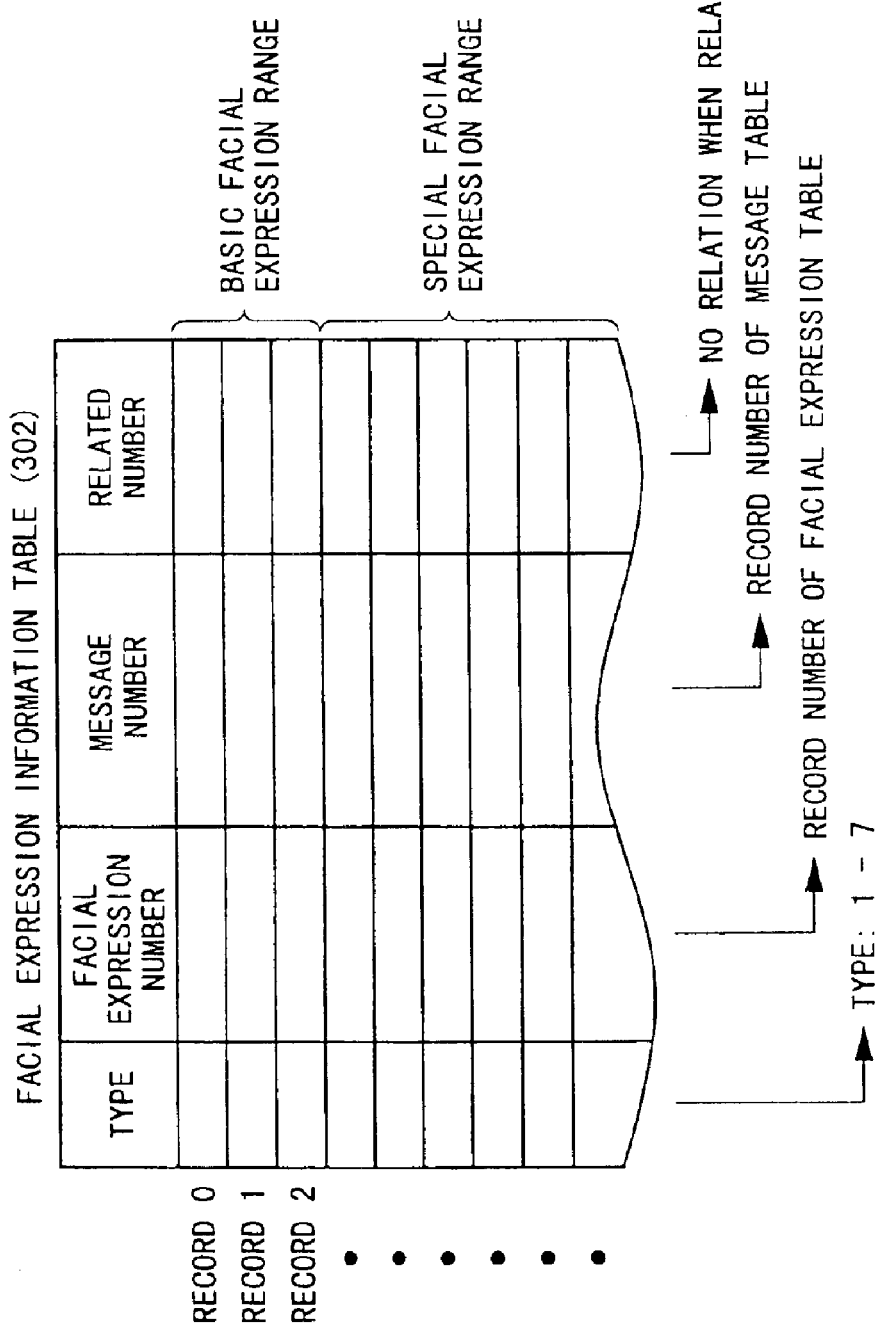
FIG. 18 is a diagram showing details of a facial expression information table used by a facial expression display means in the image processing means.

As shown in FIG. 18, one item of facial expression information stored in the facial expression information table 302 has a type indicative of the sound output of a message and a displayed facial expression, a record number in the facial expression table 308, a record number in a message table 310 (described later on), and an indicator value corresponding to a record number where facial expression information related to the facial expression information is stored.

In the illustrated embodiment, the facial expression information table 302 stores basic facial expression information in first through jth records, and facial expression information (special facial expression information) representing adaptive or related facial expressions in (j+1)th and subsequent records.

As shown in FIG. 19, the message table 310 stores message data in respective records, which represent a number of facial expressions stored in the facial expression information table 302.

In this embodiment, the facial expression selecting means 304 is available in two types. One type of the facial expression selecting means 304 is a fixed-time selecting means for randomly selecting one of the basic facial expression information stored in the facial expression information table 302 at preset time intervals, e.g., 10 seconds. The other type of the facial expression selecting means 304 is a manual selecting means for selecting one of the facial expression information stored in the facial expression information table 302, depending on the timing of a manual control input entered while the current facial expression is being displayed. The manual selecting means may be available in a number of modifications depending on the specifications, and one such modification will be described later on.

The facial expression display means 306 will be described below in specific detail with reference to FIGS. 21 through 30. The facial expression display means 306 starts operating when it is activated after various programs in operation stores a present indicator value in a transfer register 320 (see FIG. 21).

As shown in FIG. 21, the facial expression display means 306 comprises a facial expression information reading means 322 for reading facial expression information from a record corresponding to a present indicator value in the facial expression information table 302, a type determining means 324 for determining a type added to the read facial expression information and transferring control to a process depending on the determined type, e.g., one of first through third sound and facial expression output processes, first through third facial expression output processes, and a message display output process, a final facial expression reading means 326 for reading final facial expression data from a record corresponding to a facial expression number added to the read facial expression information in the facial expression table 308, a morphing means 328 for deforming a facial expression depending on the type into another facial expression (including the same facial expression) and displaying the facial expression being morphed, a message reading means 330 for reading message data from a record corresponding to a message number added to the read facial expression information in the message table 310, a message sound output means 332 for outputting the read message data to the speaker 47, a message display output means 334 for outputting the read message data to the display means (LCD) 44, and a related processing means 336 for storing a related number (indicator value) in the transfer register 320 if related information added to the read facial expression information represents related facial expression information.

Figure 22A:
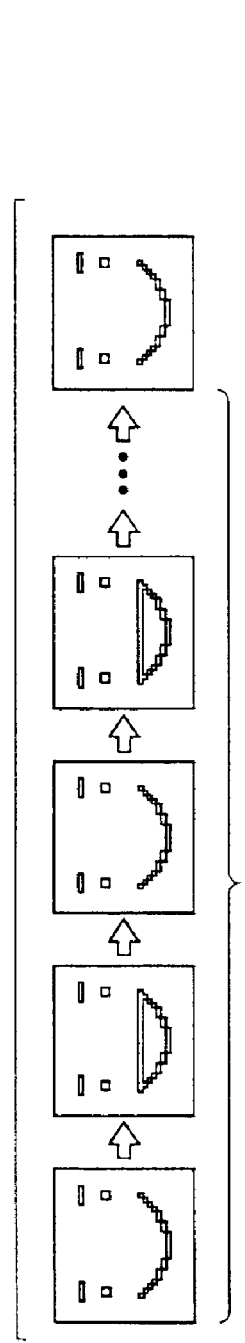
FIG. 22A is a diagram showing changing facial expressions in a first sound and facial expression output process.
Figure 22B:
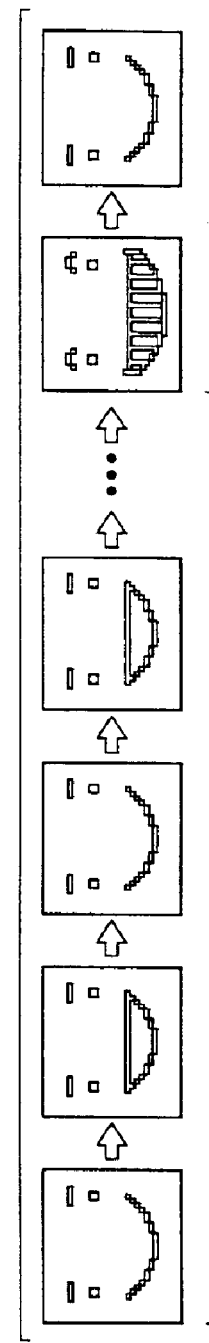
FIG. 22B is a diagram showing changing facial expressions in a second sound and facial expression output process.
Figure 22C:
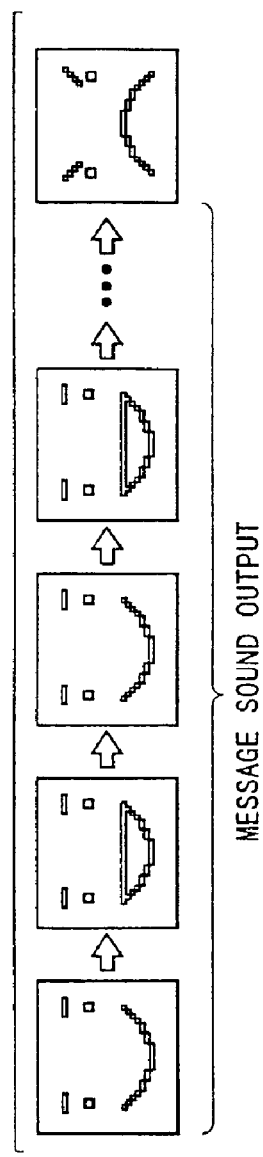
FIG. 22C is a diagram showing changing facial expressions in a third sound and facial expression output process.

The processes depending on the determined types will be described below. As shown in FIG. 22A, the first sound and facial expression output process is a process of alternately opening and closing the mouth on a first basic facial expression while outputting the sound of a present message, and then returning to the first basic facial expressions shown in FIG. 22B, the second sound and facial expression output process is a process of alternately opening and closing the mouth on a first basic facial expression while outputting the sound of a present message, deforming the facial expression toward a present final facial expression, and then returning to the first basic facial expression. As shown in FIG. 22C, the third sound and facial expression output process is a process of alternately opening and closing the mouth on a first basic facial expression while outputting the sound of a present message, and deforming the facial expression toward a present final facial expression.

The first facial expression output process is a process of changing a current facial expression to the current facial expression, i.e., a process of doing nothing on the facial al expression. The second facial expression output process is a process of deforming a current facial expression to a present final facial expression, and then returning to a first basic facial expression. The third facial expression output process is a process of deforming a current facial expression to a present final facial expression.

The message display output process is a process of outputting present message data to the LCD 44 and displaying the message on the terminal 100.

Processing sequences of the facial expression display means 306 will be described below with reference to FIGS. 23 through 30.

In step S101, the facial expression information reading means 322 reads a current indicator value from the transfer register 320.

In step S102, the facial expression information reading means 322 reads facial expression information from a record corresponding to a current indicator value in the facial expression information table 302.

In step S103, the type determining means 324 determines a type added to the read facial expression information, and transfers control to a process depending on the determined type. For example, if the type is "1", then control goes to the first sound and facial expression output process in step S104. If the type is "2", then control goes to the second sound and facial expression output process in step S105. If the type is "3", then control goes to the third sound and facial expression output process in step S106. If the type is "4", then control goes to the first facial expression output process in step S107. If the type is "5", then control goes to the second facial expression output process in step S108. If the type is "6", then control goes to the third facial expression output process in step S109. If the type is "7", then control goes to the message display output process in step S110.

After the processes depending on the determined types are finished, control goes to next step S111 in which the related processing means 336 determines whether there is a related sound or facial expression to be outputted, by determining whether a related number added to the read facial expression is "0" or not. If the related number is not "0", then control goes to step S112 in which the related processing means 336 stores the related number in the transfer register 320, after which control returns to step S101. In step S101, the facial expression information reading means 322 reads facial expression information from a record corresponding to the related number in the facial expression table 302, after which a process depending on the read facial expression information is carried out.

For example, it is possible to transform a facial expression with a running nose to a facial expression with a sneeze accompanied by a sound "atchoo" and then to a facial expression with sniffling.

If a long message "After all, you are not good at human relations" is to be outputted, then message data are registered as a plurality of phases "after all", "you", "are", and "not good at human relations", and their related numbers are registered in the facial expression information table 302. When this long message is outputted in sounds, since the piezoelectric buzzer of the speaker 47 does not have a sufficient capacity, fundamental portions of the message, i.e., the message data "you" and "not good at human relations" are displayed on the display unit 130 of the terminal 100.

The first message data "after all" corresponds to the first sound and facial expression output process, for example, as a type in the facial expression information table 302, and its related number is selected to be the record number at which the facial expression information relative to the next message data "you" is registered.

The message data "you" corresponds to the message display output process as a type in the facial expression information table 302, and its related number is selected to be the record number at which the facial expression information relative to the next message data "not good at human relations" is registered.

The message data "are" corresponds to the message display output process as a type in the facial expression information table 302, and its related number is selected to be the record number at which the facial expression information relative to the next message data "not good at human relations" is registered.

The message data "not good at human relations" corresponds to the first sound and facial expression output process as a type in the facial expression information table 302, and its related number is selected to be "0" indicative of no relationship.

Consequently, when long message "After all, you are not good at human relations" is to be outputted, a facial expression with the mouth being alternately opened and closed is displayed while the voice sound "After all" is outputted, and the messages "you", "are" are successively displayed on the display unit 130, and finally a facial expression with the mouth being alternately opened and closed is displayed while the voice sound "not good at human relations" is outputted.

The processes according to the types will be described below with reference to FIGS. 24 through 30.

Figure 23:
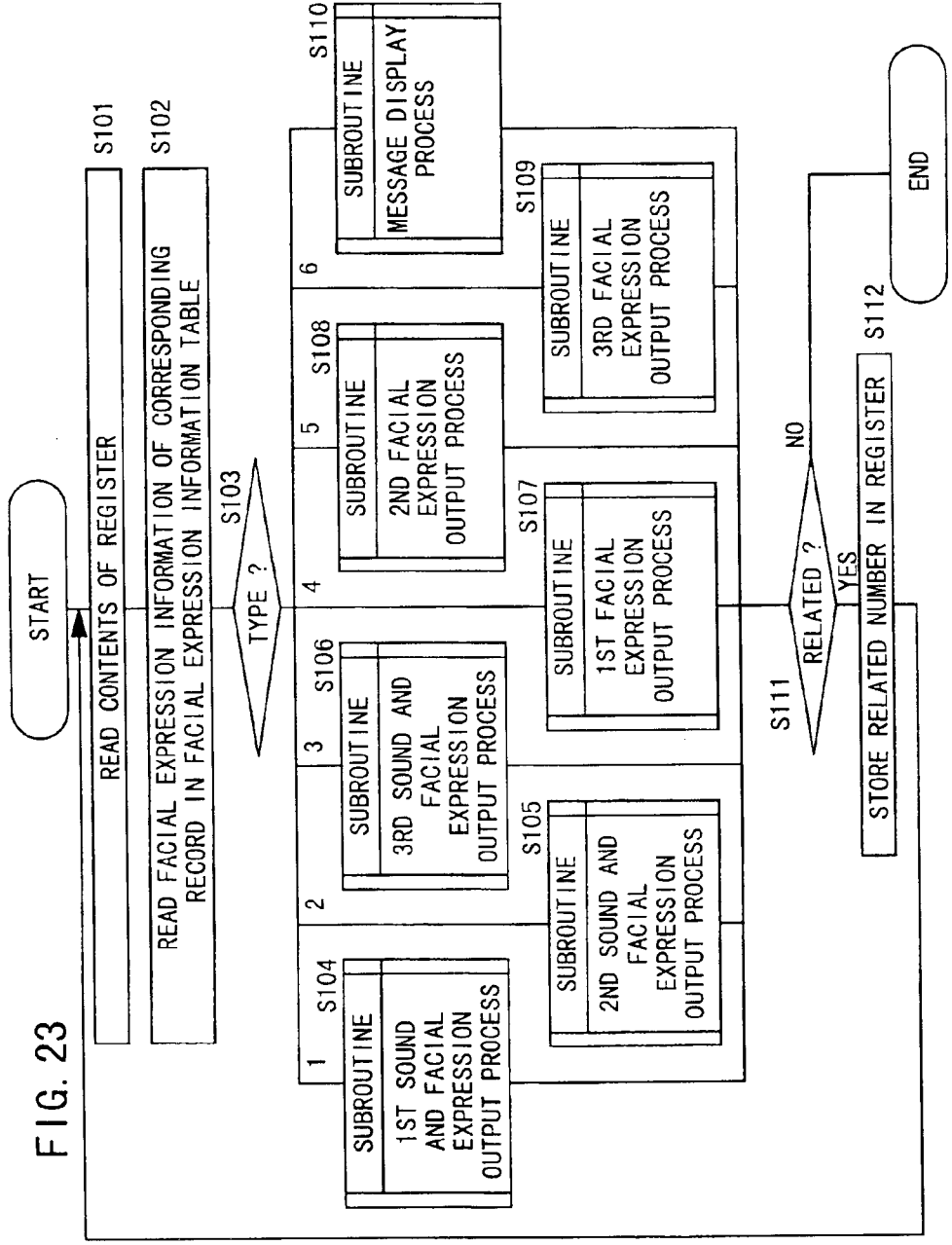
FIG. 23 is a flowchart of a processing sequence of the facial expression display means.
Figure 24:
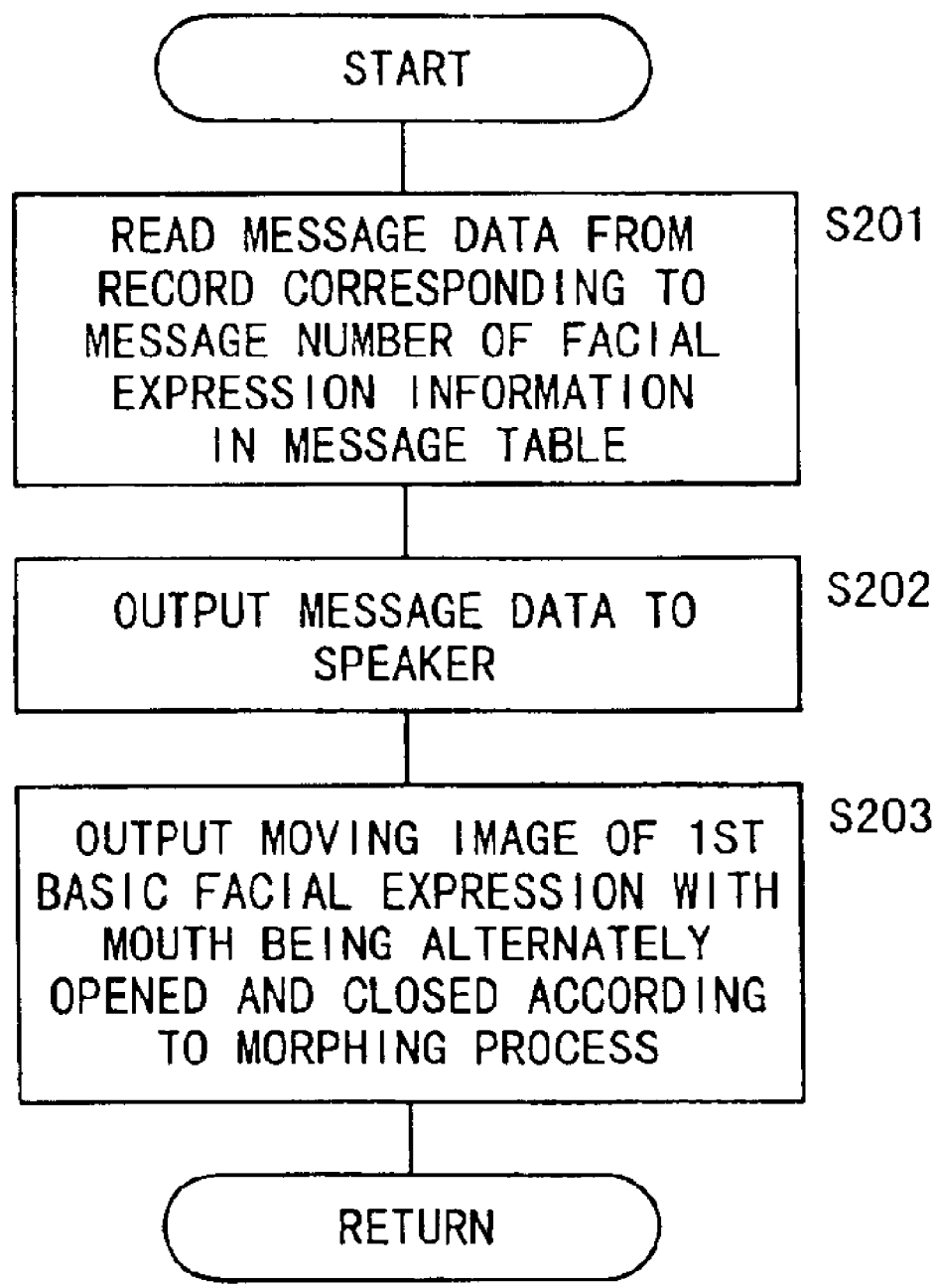
FIG. 24 is a flowchart of a processing sequence of the first sound and facial expression output process.

In the first sound and facial expression output process in step S104 shown in FIG. 23, as shown in FIG. 24, the message reading means 330 reads message data from a record corresponding to a message number added to the read facial expression information in the message table 310 in step S201.

In step S202, the message sound output means 332 outputs the read message data to the speaker 47.

In step S203, the morphing means 328 determines a moving image representing a combination of a first basic facial expression and a repetition of alternately opened and closed mouths according to morphing processing, and outputs the moving image to the LCD 44.

The display unit 130 of the terminal 100 now displays a moving image comprising the first basic facial expression with the mouth being alternately opened and closed, and the speaker 47 outputs the voice sound of the current message.

When the processing in step S203 is finished, the first sound and facial expression output process comes to an end. At this time, the display unit 130 displays the first basic facial expression as a moving image.

Figure 25:
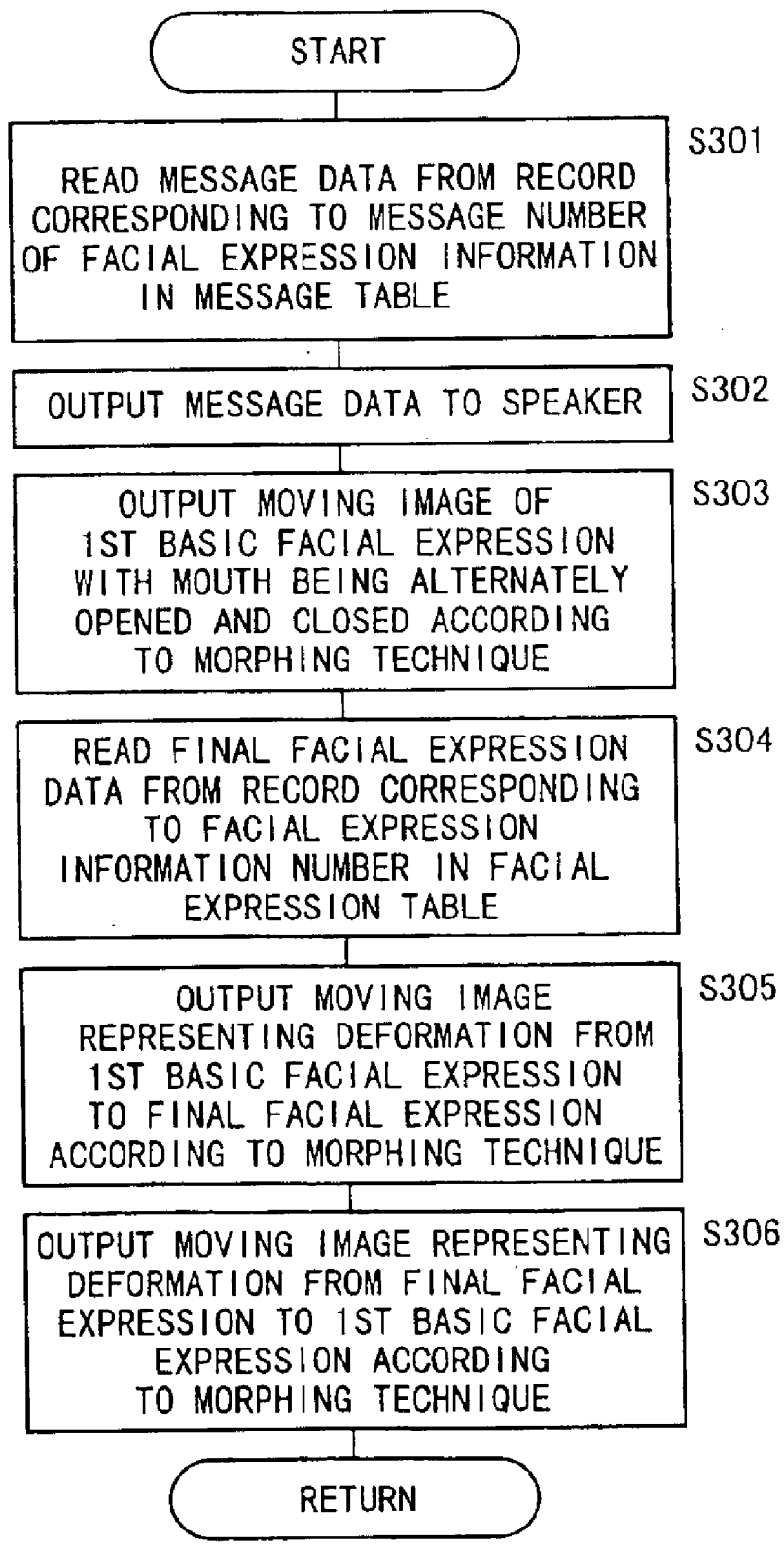
FIG. 25 is a flowchart of a processing sequence of the second sound and facial expression output process.

In the second sound and facial expression output process in step S105 shown in FIG. 23, as shown in FIG. 25, the message reading means 330 reads message data from a record corresponding to a message number added to the read facial expression information in the message table 310 in step S301.

In step S302, the message sound output means 332 outputs the read message data to the speaker 47.

In step S303, the morphing means 328 determines a moving image representing a combination of a first basic facial expression and a repetition of alternately opened and closed mouths according to morphing processing, and outputs the moving image to the LCD 44.

In step S304, the final facial expression reading means 326 reads final facial expression data from a record corresponding to a facial expression number added to the read facial expression information in the facial expression table 308.

In step S305, the morphing means 328 determines a moving image representing a deformation from a first basic facial expression to a current final facial expression according to morphing processing, and outputs the moving image to the LCD 44.

In step S306, the morphing means 328 determines a moving image representing a deformation from the current final facial expression to the first basic facial expression according to morphing processing, and outputs the moving image to the LCD 44.

Accordingly, the display unit 130 displays a moving image which comprises the first basic facial expression with the mouth being alternately opened and closed, and at the same time the speaker 47 outputs the voice sound of the current message. Then, the display unit 130 displays a moving image representing a facial expression deformed to the current final facial expression and then back to the first basic facial expression.

When the processing in step S306 is finished, the second sound and facial expression output process is ended.

Figure 26:
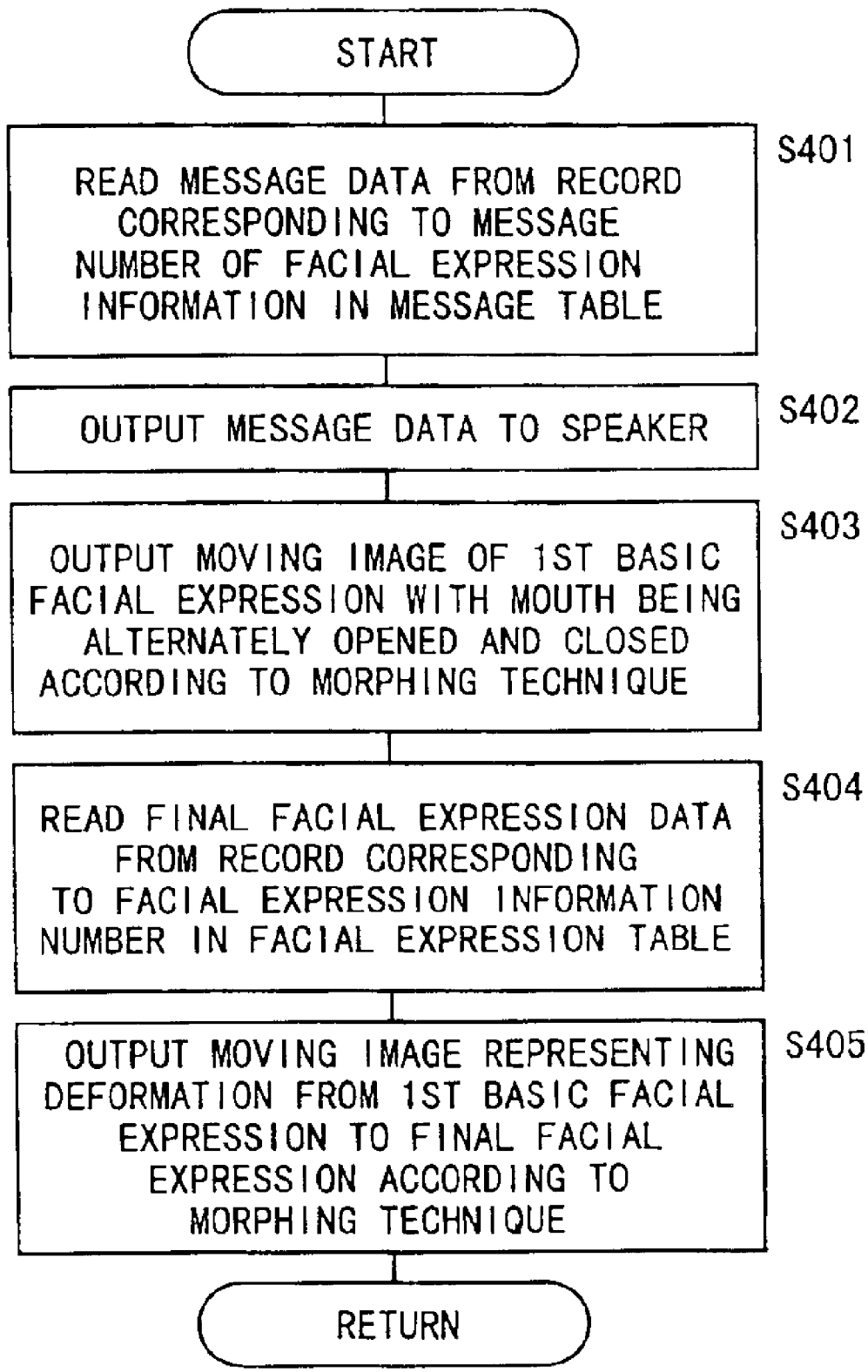
FIG. 26 is a flowchart of a processing sequence of the third sound and facial expression output process.

In the third sound and facial expression output process in step S106 shown in FIG. 23, as shown in FIG. 26, the message reading means 330 reads message data from a record corresponding to a message number added to the read facial expression information in the message table 310 in step S401.

In step S402, the message sound output means 332 outputs the read message data to the speaker 47.

In step S403, the morphing means 328 determines a moving image representing a combination of a first basic facial expression and a repetition of alternately opened and closed mouths according to morphing processing, and outputs the moving image to the LCD 44.

In step S404, the final facial expression reading means 326 reads final facial expression data from a record corresponding to a facial expression number added to the read facial expression information in the facial expression table 308.

In step S405, the morphing means 328 determines a moving image representing a deformation from a first basic facial expression to a current final facial expression according to morphing processing, and outputs the moving image to the LCD 44.

Accordingly, the display unit 130 displays a moving image which comprises the first basic facial expression with the mouth being alternately opened and closed, and at the same time the speaker 47 outputs the voice sound of the current message. Then, the display unit 130 displays a moving image representing a facial expression deformed to the current final facial expression.

When the processing in step S405 is finished, the third sound and facial expression output process is ended.

Figure 27:
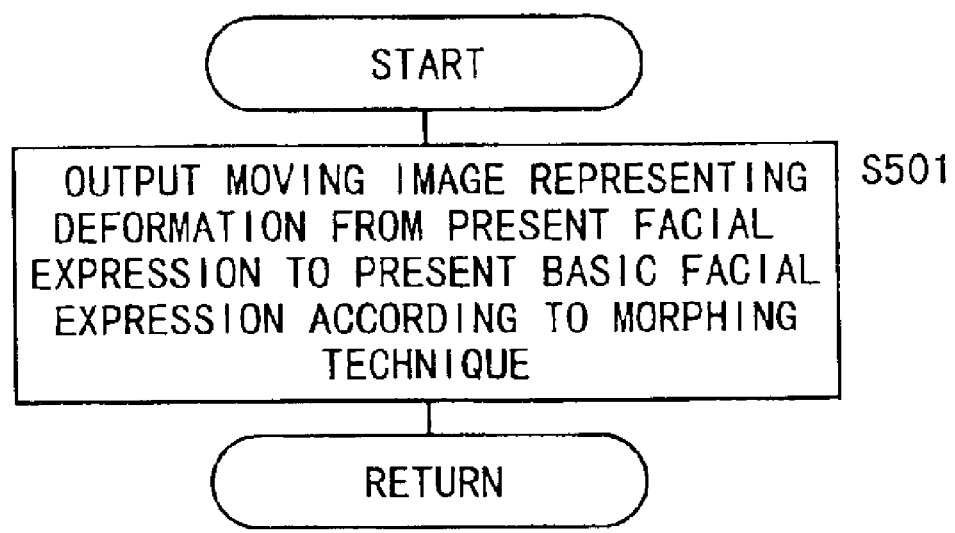
FIG. 27 is a flowchart of a processing sequence of a first facial expression output process.

In the first facial expression output process in step S107 shown in FIG. 23, as shown in FIG. 27, the morphing means 328 determines a moving image representing a deformation from a present facial expression to the present facial expression according to morphing processing, and outputs the moving image to the LCD 44 in step S501. Thus, the displayed facial expression remains unchanged.

When the processing in step S501 is finished, the first facial expression output process is ended.

Figure 28:
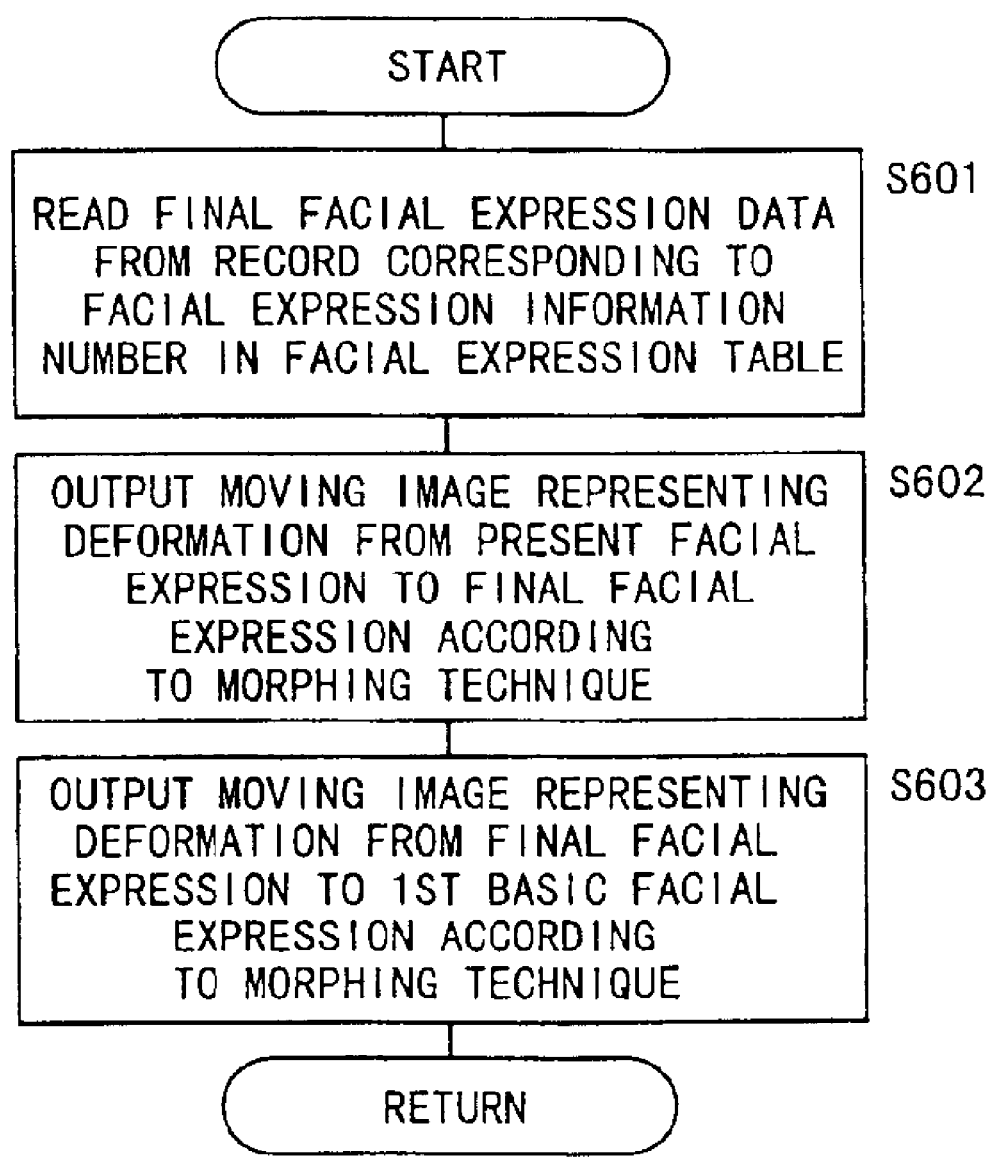
FIG. 28 is a flowchart of a processing sequence of a second facial expression output process.

In the second facial expression output process in step S108 shown in FIG. 23, as shown in FIG. 28, the final facial expression reading means 326 reads final facial expression data from a record corresponding to a facial expression number added to the read facial expression information in the facial expression table 308 in step S601.

In step S602, the morphing means 328 determines a moving image representing a deformation from a present facial expression to a current final facial expression according to morphing processing, and outputs the moving image to the LCD 44.

In step S603, the morphing means 328 determines a moving image representing a deformation from the current final facial expression to the first basic facial expression according to morphing processing, and outputs the moving image to the LCD 44.

Accordingly, the display unit 130 displays a moving image which represents a deformation from the present facial expression to the current final facial expression and then back to the first basic facial expression.

When the processing in step S603 is finished, the second facial expression output process is ended.

Figure 29:
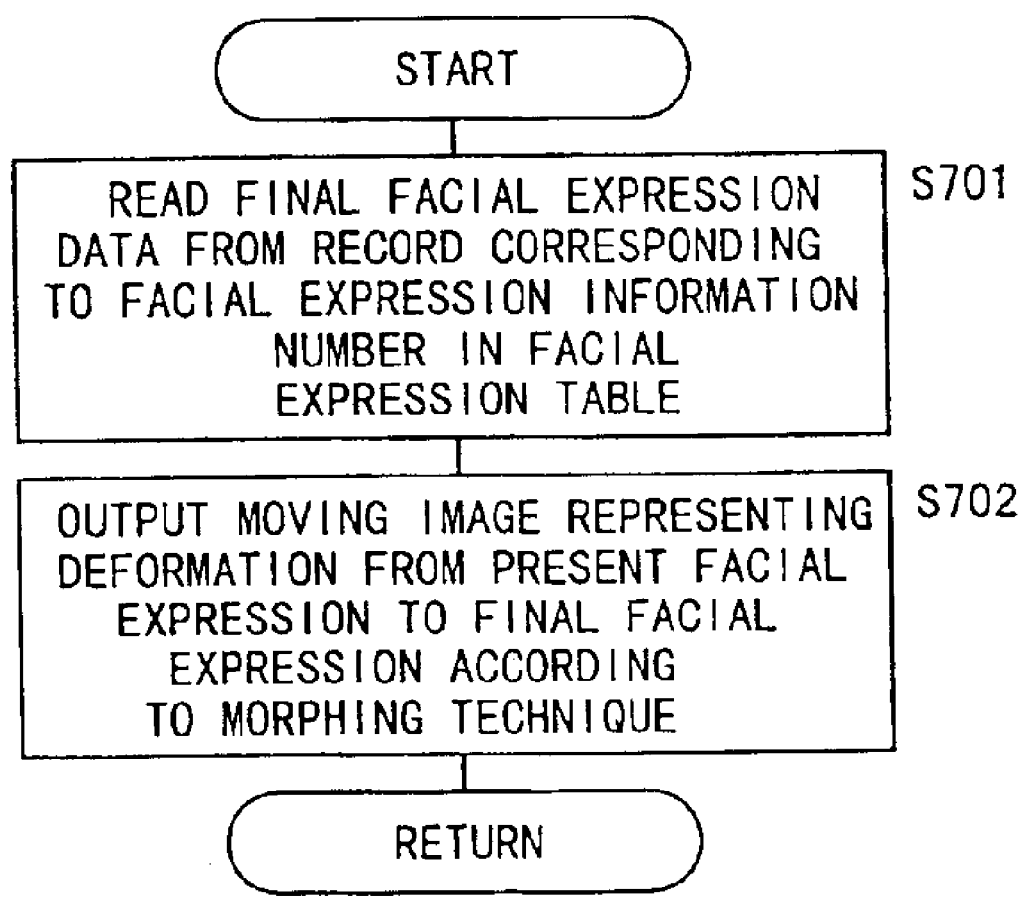
FIG. 29 is a flowchart of a processing sequence of a third facial expression output process.

In the third facial expression output process in step S109 shown in FIG. 23, as shown in FIG. 29, the final facial expression reading means 326 reads final facial expression data from a record corresponding to a facial expression number added to the read facial expression information in the facial expression table 308 in step S701.

In step S702, the morphing means 328 determines a moving image representing a deformation from a present facial expression to a current final facial expression according to morphing processing, and outputs the moving image to the LCD 44.

Accordingly, the display unit 130 displays a moving image which represents a deformation from the present facial expression to the current final facial expression.

When the processing in step S702 is finished, the third facial expression output process is ended.

Figure 30:
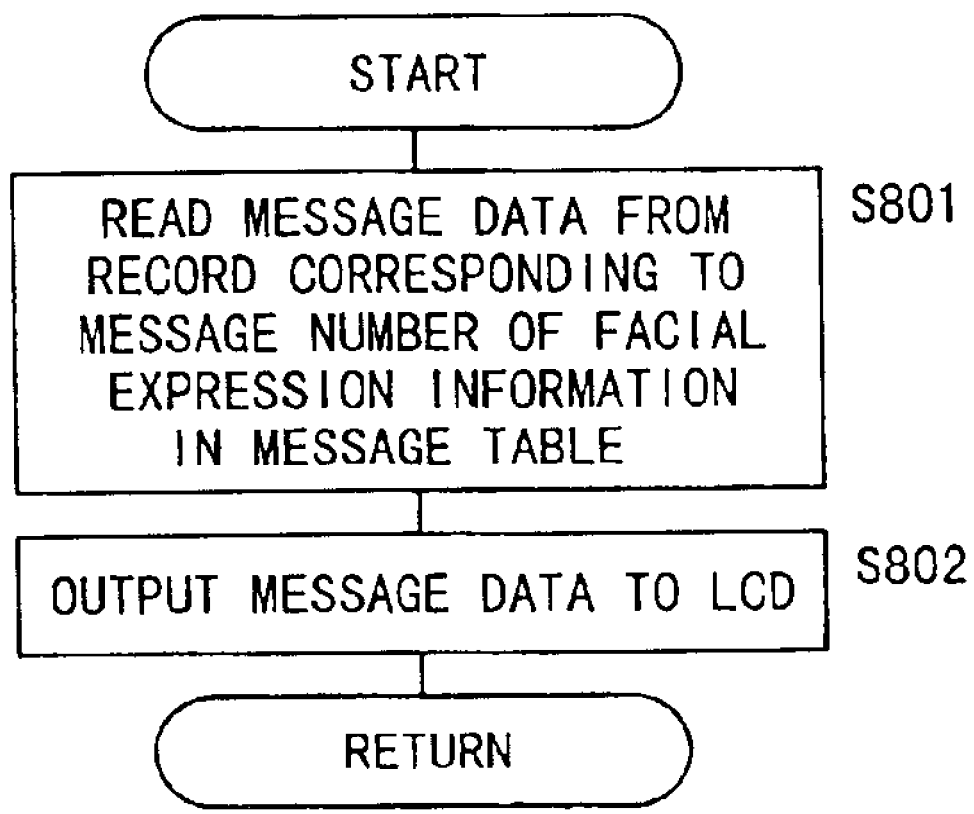
FIG. 30 is a flowchart of a processing sequence of a message display output process.

In the message display output process in step S110 shown in FIG. 23, as shown in FIG. 30, the message reading means 330 reads message data from a record corresponding to a message number added to the read facial expression information in the message table 310 in step S801.

In step S802, the message display output means 334 outputs the read message data to the LCD 44. The display unit 130 now displays the current message.

When the processing in step S802 is finished, the message display output process is ended.

Figure 31:
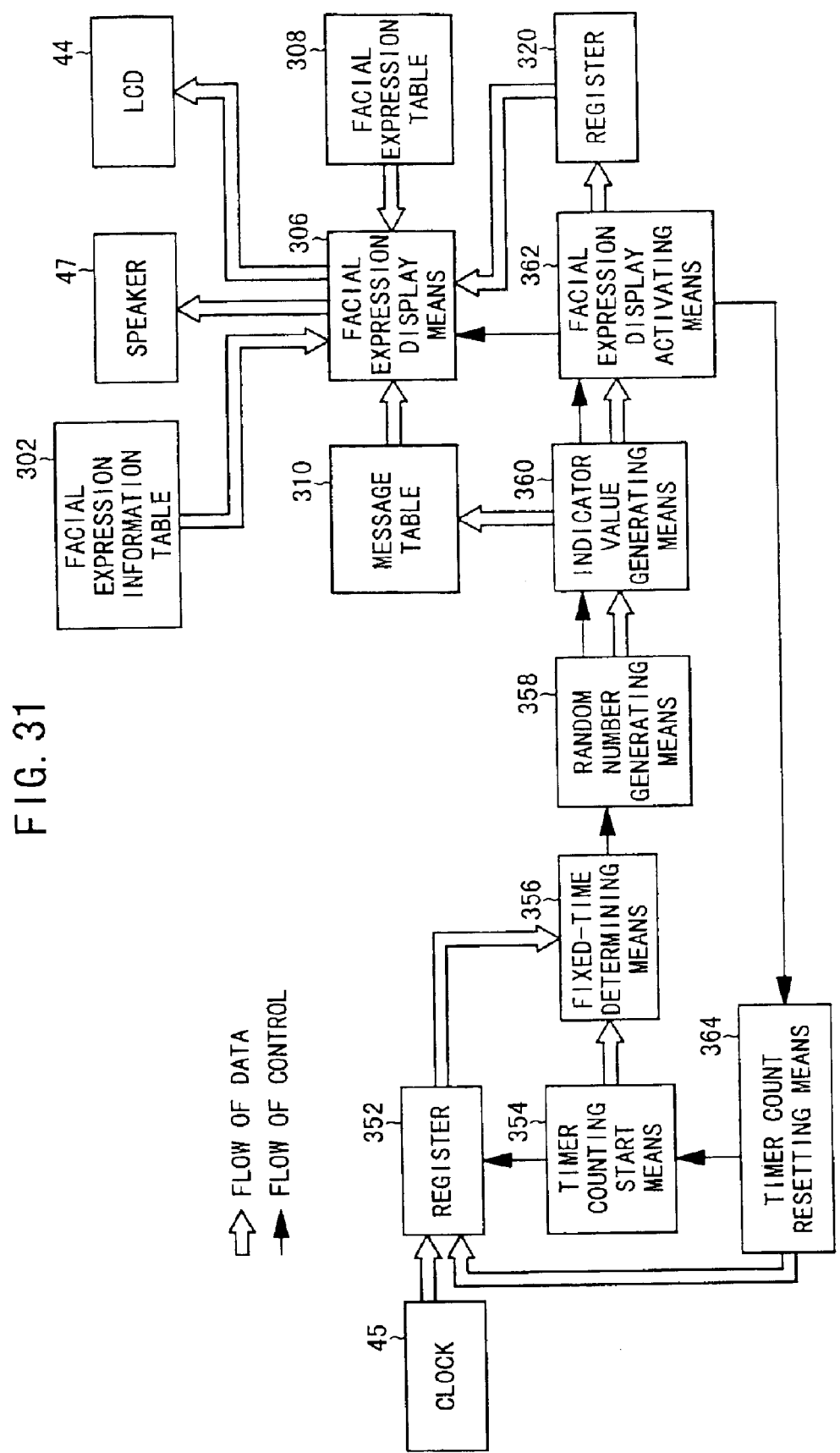
FIG. 31 is a functional block diagram of a fixed-time selecting means.
Figure 32:
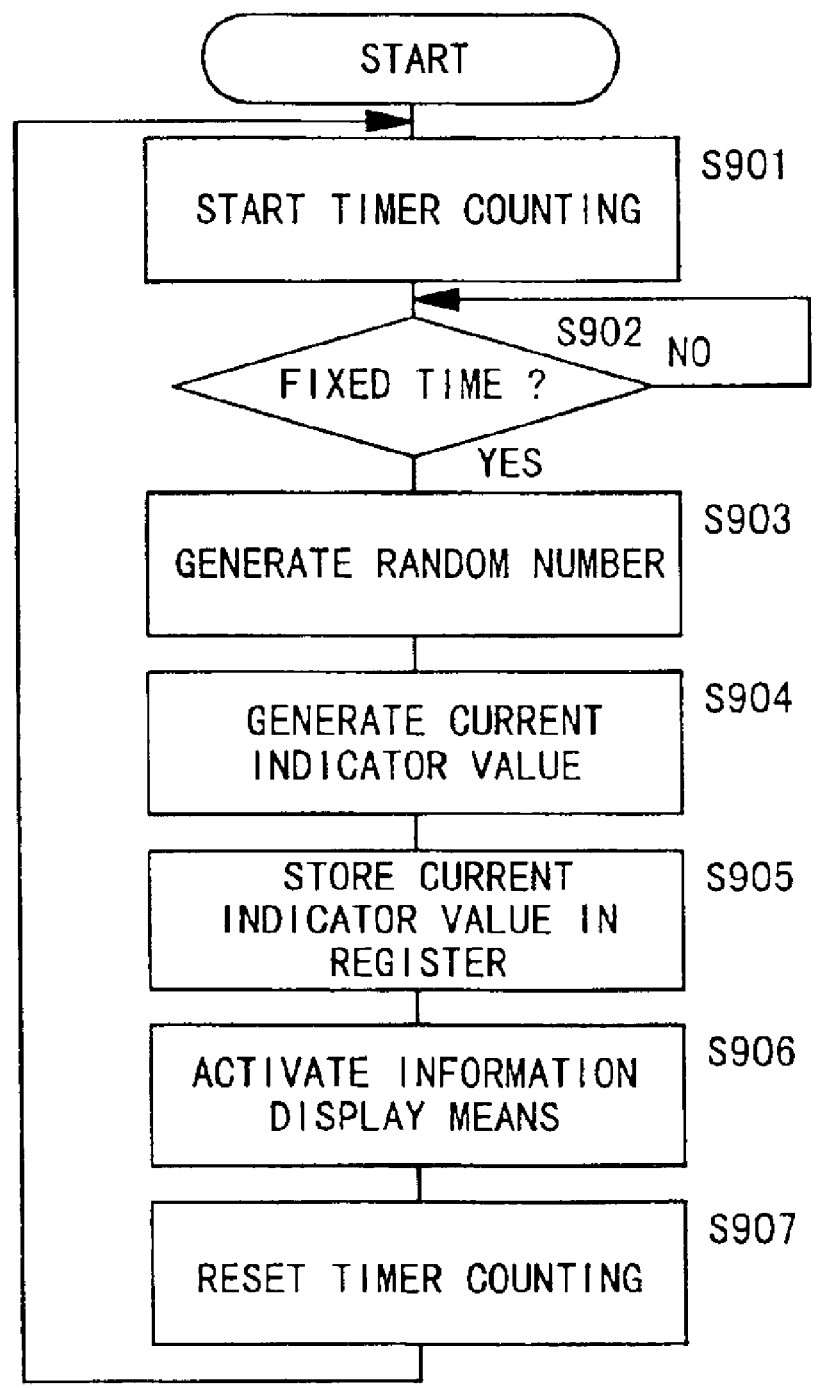
FIG. 32 is a flowchart of a processing sequence of the fixed-time selecting means.

The fixed-time selecting means, generally denoted by 350, which is one type of the facial expression selecting means 304, will be described below with reference to FIGS. 31 and 32.

The fixed-time selecting means 350 is arranged to operate in time-sharing relation to the facial expression display means 306. As shown in FIG. 31, the fixed-time selecting means 350 comprises a timer counting start means 354 for starting to count clock pulses sent from the clock 45 with a counting register 352, a fixed-time determining means 356 for determining whether the count of the counting register 352 indicates a predetermined time duration, e.g., of 10 seconds, a random number generating means 358 for generating a random number if the count is determined as a fixed time, an indicator value generating means 360 for generating a current indicator value (a readout address and a record number for the facial expression information table 302) based on the generated random number and a predetermined variable, a facial expression display activating means 362 for storing the generated indicator value in the transfer register 320 and activating the facial expression display means 306, anti a timer count resetting means 364 for resetting the count of the counting register 352.

A processing sequence of the fixed-time selecting means 350 will be described below with reference to FIG. 32.

In step S901, the timer counting start means 354 starts to count clock pulses sent from the clock 45, using the counting register 352, for example.

In step S902, the fixed-time determining means 356 determines whether a predetermined time duration has been reached, i.e., whether the count of the counting register 352 indicates a predetermined time duration, e.g., of 10 seconds.

If the count of the counting register 352 indicates the predetermined time duration, then control proceeds to step S903 in which the random number generating means 358 generates a random number represented by a certain number of bits.

Thereafter, in step S904, the indicator value generating means 360 generates a current indicator value, which will be used to indicate a corresponding record in the facial expression information table 302.

The indicator value may be generated by combining the random number generated in step S903 with ID data of the terminal 100 and the present absolute time. In this case, since the number of figures becomes very large, the indicator value may be used as a readout address (absolute ad-dress) for the facial expression information table 302. The generated random number may be used directly as an indicator value, which may be used as a record number for the facial expression information table 302.

In step S905, the facial expression display activating means 362 stores the generated indicator value in the transfer register 320.

In step S906, the facial expression display activating means 362 activates the facial expression display means 306, which reads facial expression information from a record corresponding to the indicator value stored in the transfer register 320, among the records in the facial expression information table 302, displays on the display unit 130 a moving image representing a deformed facial expression based on the type, facial expression number, message number, and a related facial expression that are added to the read facial expression information, and outputs the message to the speaker 47.

In step S907, the timer count resetting means 364 resets the count of the counting register 352 to "0". Then, control returns to step S901, in which the timer counting start means 354 starts to count clock pulses to wait for a next fixed time.

Several functions which the terminal 100 has will be described below.

When the decision button 122 of the terminal 100 is continuously pressed for 3 seconds, for example, the display unit 130 displays a function menu image (see FIG. 33) of a plurality of items. When the user selects one of the items with the direction buttons 121 and the decision button 122, a function corresponding to the selected item is performed.

A first function is referred to as an "adviser function", which calculates the biorhythm of the user and the congeniality of the user to a certain person based on the personal information of the user, and indicates the calculated biorhythm and congeniality to the user. The personal information of the user includes the name, address, telephone number, sex, date of birth, blood type, height, weight, to occupation, etc. of the user.

A program for performing the adviser function (adviser function program) is downloaded from a CD-ROM played back by the entertainment apparatus 1 to the terminal 100 according to a certain process, and run by the terminal 100.

For example, the personal information may be entered and the adviser function program may be downloaded by the following process: A program for performing the adviser function is read from the CD-ROM, and run by the entertainment apparatus 1. At this time, the display screen of a television set, for example, connected to a video output terminal øv of the entertainment apparatus 1 displays an initial menu image for the adviser function. The displayed initial menu image includes various items for prompting the entry of personal information and the downloading of the adviser function program.

If the user selects the item for prompting the entry of personal information among the displayed items in the displayed initial menu image, then the initial menu image changes to a personal information entry image. The user enters personal information while viewing the personal information entry image.

After having entered the personal information, the user presses a button "return", for example, to return to the initial menu image, and then selects the item for prompting the downloading of the adviser function program. When this item is selected, the adviser function program and the personal information are transferred to the terminal 100.

The adviser function program displays an image of the biorhythm of the user based on the personal information of the user, outputs calculated physical and mental conditions of the user for the day via voice sounds, calculates the fortune of the user for a certain day and the congeniality of the user to a certain person, and indicates the calculated fortune and the degree of congeniality as voice sounds to the user.

For example, as shown in FIG. 34, the adviser function program displays a plurality of advice items on the display unit 130, and calculates the fortune of the user for a certain day and the congeniality of the user to a certain person based on the personal information according to the selected item.

A second function is referred to as a "time-killing function", which allows the user to play a simple game, e.g., a simple puzzle or card game (poker or the like) with the terminal 100 as a hypothetical opponent.

A program for performing the time-killing function (time-killing function program) is also downloaded from a CD-ROM played back by the entertainment apparatus 1 to the terminal 100 according to a certain process, and run by the terminal 100.

For example, a program for performing the time-killing function is read from the CD-ROM, and run by the entertainment apparatus 1. At this time, the display screen of a television set, for example, connected to a video output terminal øv of the entertainment apparatus 1 displays an initial menu image for the time-killing function. The displayed initial menu image includes various games as items that the user can play using the terminal 100. The user may select a plurality of games.

When the user selects one or more items representing games, the time-killing function program and the program or programs of the selected game or games are transferred to the terminal 100.

The time-killing function program displays the item corresponding to the selected game on the display unit 13C, and activates the game program corresponding to the selected item with the direction buttons 121 and the decision button 122 operated by the user.

A third function is referred to as a "formatter function", which manages the memories of the terminal 100. For example, the formatter function is capable of changing data registered by the user, moving the registered data to another array variable area, and copying the registered data.

A program for performing the formatter function (formatter function program) is also downloaded from a CD-ROM played back by the entertainment apparatus 1 to the terminal 100 according to a certain process, and run by the terminal 100.

A fourth function is referred to as a "random news function", which reads latest news via the wireless communication means 48 of the terminal 100, and outputs the read latest news with voice sounds.

A program for performing the random news function (random news function program) is also downloaded from a CD-ROM played back by the entertainment apparatus 1 to the terminal 100 according to a certain process, and run by the terminal 100.

Figure 33:
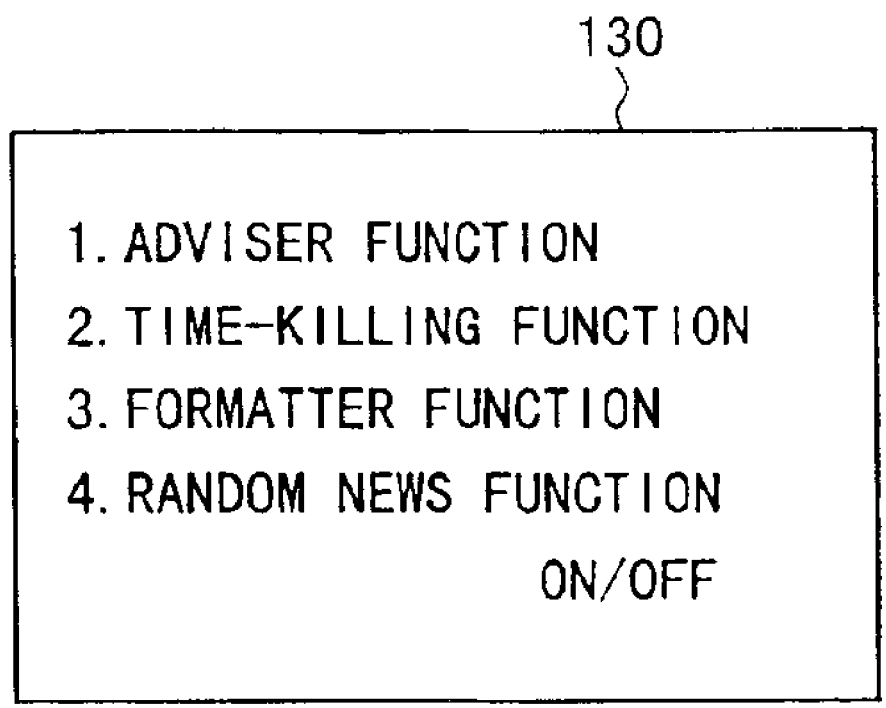
FIG. 33 is a view showing, by way of example, a functional menu displayed by a display unit.

These functions programs are activated by a function menu display program which displays a function menu image (see FIG. 33).

Figure 35:
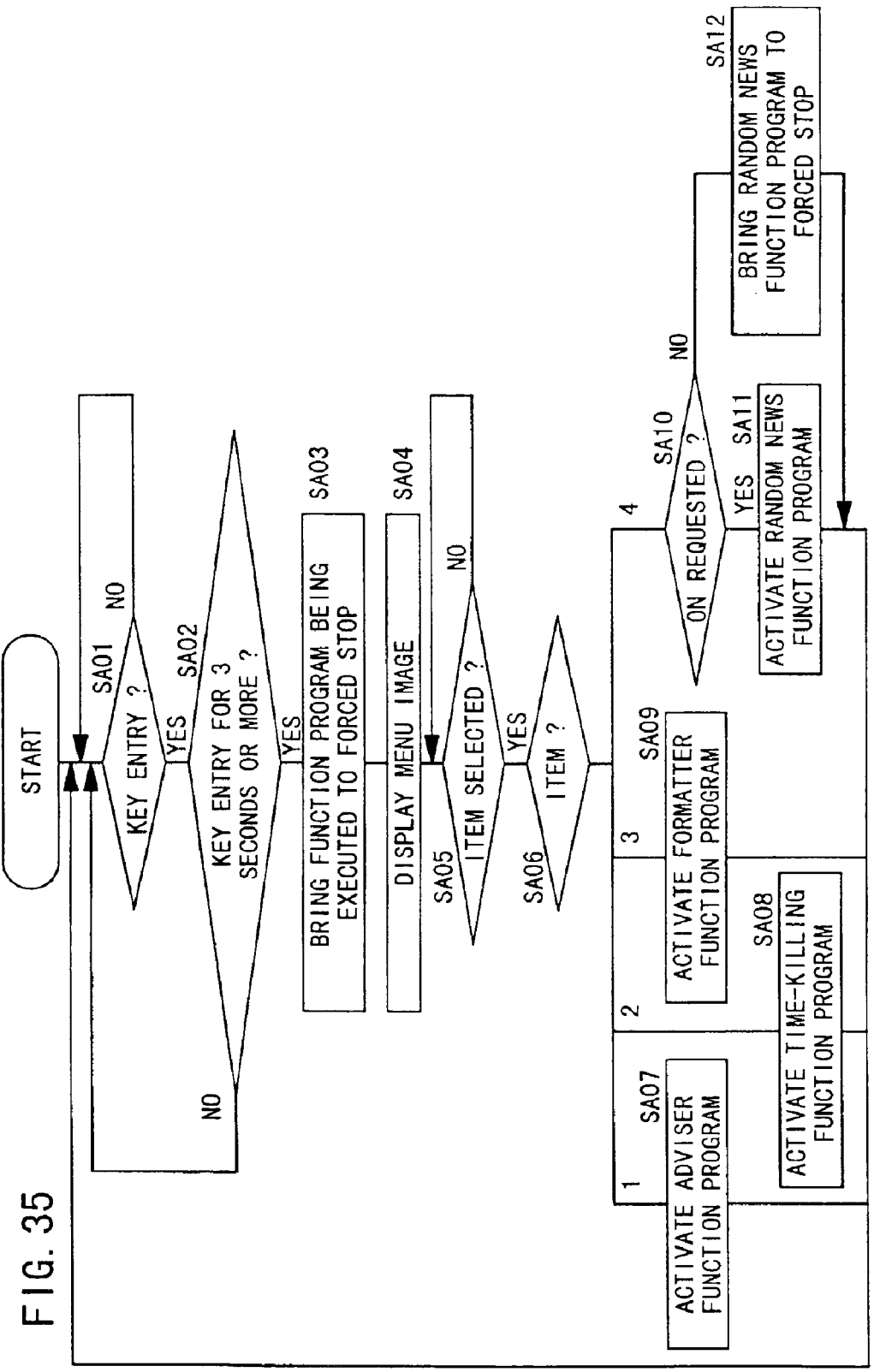
FIG. 35 is a flowchart of a processing sequence of a functional menu display program.

A processing sequence of the function menu display program will be described below with reference to FIG. 35.

In step SA01, control waits for an input from the decision button 122. If the decision button 122 is pressed, then control goes to step SA02, which determines whether the decision button 122 has been pressed for at least 3 seconds or not. If the decision button 122 has been pressed for a period of time shorter than 3 seconds, then control returns to step SA01, waiting for an input from the decision button 122.

If the decision button 122 has been pressed for at least 3 seconds, then control proceeds to step SA03, in which a presently executed function program (the adviser function program, the time-killing function program, or the formatter function program) except the random news function program is brought to a forced end.

In step SA04, the display unit 130 of the terminal 100 displays a function menu image (see FIG. 33). Thereafter, the selection of an item is awaited in step SA04. Of the items 1 through 4 included in the function menu image, the random news function program provides two alternative choices, i.e., allows the user to select ON/OFF after the random news function program at the item 4 is selected.

If an item is selected, then control proceeds to step SA06 which determines the selected item and activates the function program of the selected item. For example, if the item 1 is selected, then control goes to step SA07 in which the adviser function program is activated. If the item 2 is selected, then control goes to step SA08 in which the time-killing function program is activated. If the item 3 is selected, then control goes to step SA09 in which the formatter function program is activated.

If the item 4 is selected, then control goes to step SA10 which determines whether an ON request or an OFF request for the random news function is entered. If the ON request for the random news function is entered, then control goes to step SA11 in which the random news function is activated. If the OFF request for the random news function is entered, then control goes to step SA12 in which the random news function is brought to a forced end.

When the processing of either one of steps SA07 through SA09 and steps SA11, SA12 is finished, control goes back to step SA01 to wait for the pressing of the decision button 122 for at least 3 seconds.

The processing sequences of the various above function programs will be described below with reference to FIGS. 36 through 41.

Figure 36:
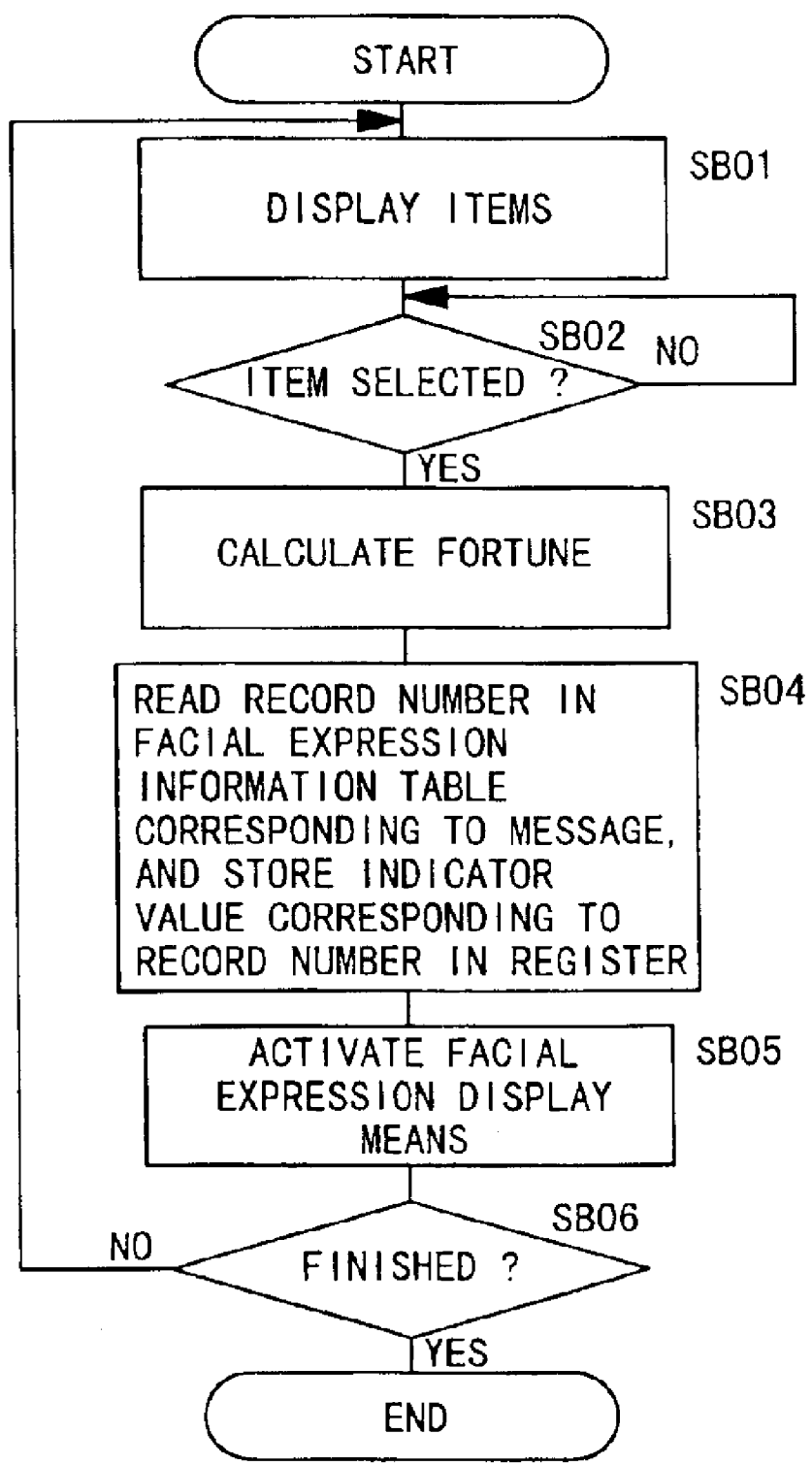
FIG. 36 is a flowchart of a processing sequence of an adviser function program.

As shown in FIG. 36, the adviser function program first displays several advice items (see FIG. 34) on the display unit 130 in step SB01. Then, the entry of one of the displayed items is awaited in step SB02. If one of the displayed items is selected by the user with the direction buttons 121 and the decision button 122, then control proceeds to step SB03. In step SB03, the adviser function program calculates the fortune of the user for a certain day and the congeniality of the user to a certain person based on the personal information of the user, and determines the fortune and the congeniality as numerical values.

The determined numerical values correspond to record numbers in a fortune message table (see FIG. 37) that is stored in the nonvolatile memory 46, for example. For example, if the fortune result represents "best condition", then the adviser function program determines a numerical value "0". If the fortune result represents "moderate condition", then the adviser function program determines a numerical value "1". If the fortune result represents "worst condition", then the adviser function program determines a numerical value "2".

The fortune message table also stores indicator values corresponding to the messages, of the many items of facial expression information that are stored in the facial expression information table 302.

In step SB04, the adviser function program reads a record number from the facial expression information table 302 based on the record corresponding to the numerical value determined in step SB03, of the records stored in the fortune message table, and stores an indicator value corresponding to the read record number in the transfer register 320.

Thereafter, in step SB-5, the facial expression display means 306 is activated to read facial expression information stored in the record corresponding to the indicator value stored in the transfer register 320, of the records stored in the facial expression information table 302, display a moving image of the morphed facial expression on the display unit 130 based on the type, facial expression number, message number, and related facial expression which are added to the read facial expression information, and output the voice sound data of the message to the speaker 47.

If the numerical value indicative of the "best condition" is determined in the fortune calculations by the adviser function program, then the facial expression display means 306 outputs the voice sound data of the message "best condition!!" and displays a facial expression with the mouth being alternately opened and closed on the display unit 130.

In step SB06, it is determined whether there is an entry (command) for finishing the adviser function program or not. If there is no such entry, then control goes back to step SB01 in which the several advice items are displayed con the display unit 130 to wait for the next selection of an item, as shown in FIG. 34.

If there is an entry for finishing the adviser function program in step SB06, then the adviser function program is ended. As shown in FIG. 33, the function menu image containing the various functions as the items is displayed on the display unit 130 to wait for the next selection of an item.

Figure 38:
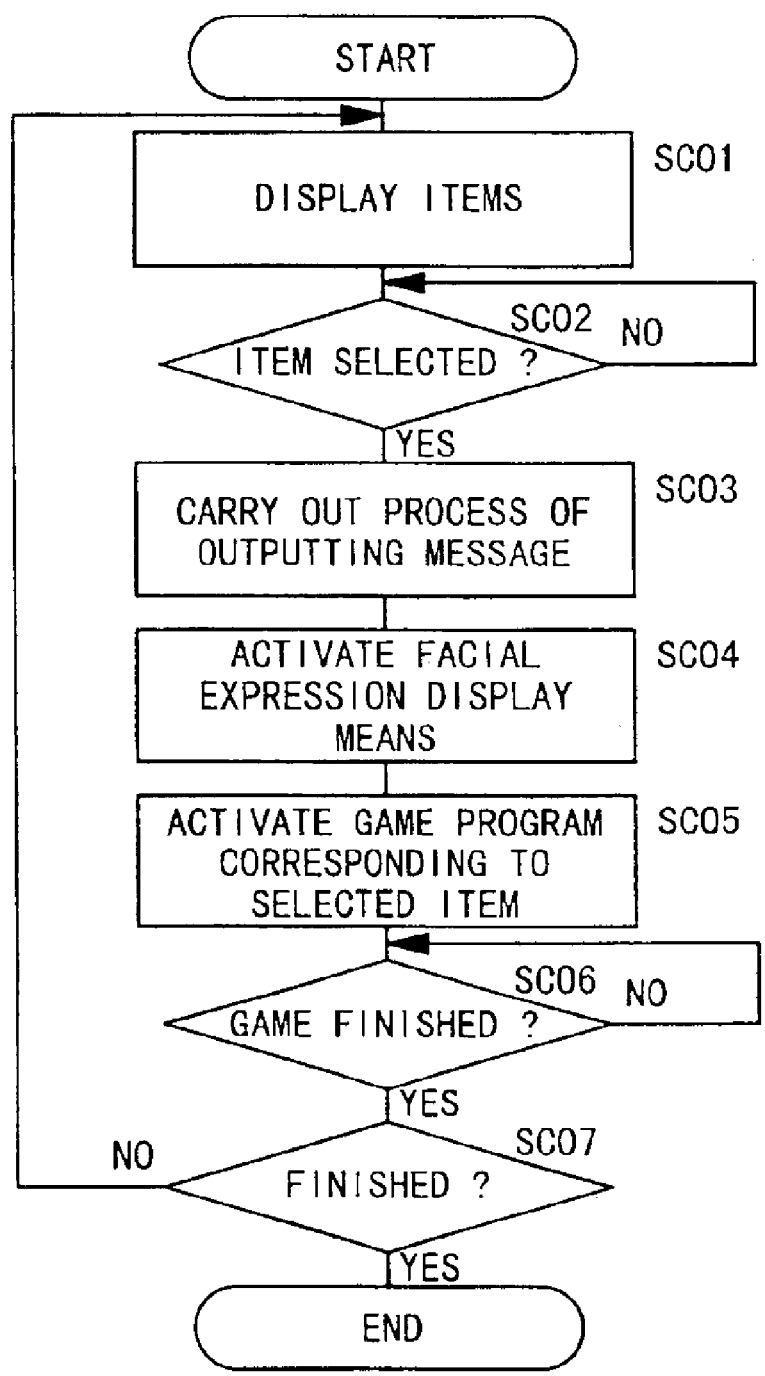
FIG. 38 is a flowchart of a processing sequence of a time-killing function program.

As shown in FIG. 38, the time-killing function program displays several game items on the display unit 130 in step SC01. Then, the entry of one of the displayed game items is awaited in step SC02. If one of the displayed items is selected by the user with the direction buttons 121 and the decision button 122, then control proceeds to step SC03 to carry out a process of outputting a message.

For example, a process of outputting a message indicative of the start of a game is carried out. Specifically, an indicator value corresponding to the record number where a message indicative of the start of a game is stored, of the records in the facial expression information table 302, is stored in the transfer register 320. In step SC04, the facial expression display means 306 is activated to output the voice sound data of the message indicative of the start of a game to the speaker 47 and display a moving image of a facial expression with the mouth being alternately opened and closed on the display unit 130.

Thereafter, in step SC05, a game program corresponding to the item selected in step SC02 is activated. From now on, the user can enjoy the game with the terminal 100 as a hypothetical opponent.

In the game, the facial expression display means 306 outputs the voice sounds of some message in every 10 seconds, for example, and also outputs the voice sounds of a message suggestive of "calm down", for example, depending on the number of times that the direction buttons 121 or the decision button 122 is pressed per unit time. During the game, no moving image of facial expressions is displayed.

The time-killing function program monitors the game for an end in step SC06. If the time-killing function program detects an end of the game, then control proceeds to step SC07, which determines whether there is an entry for finishing the time-killing function program or not. If there is no such entry, then control goes back to step SC01 in which the several game items are displayed on the display unit 130 to wait for the next selection of an item.

If there is an entry for finishing the time-killing function program in step SC07, then the time-killing function program is ended. As shown in FIG. 33, the function menu image containing the various functions as the items is displayed on the display unit 130 to wait for the next selection of an item.

Figure 39:
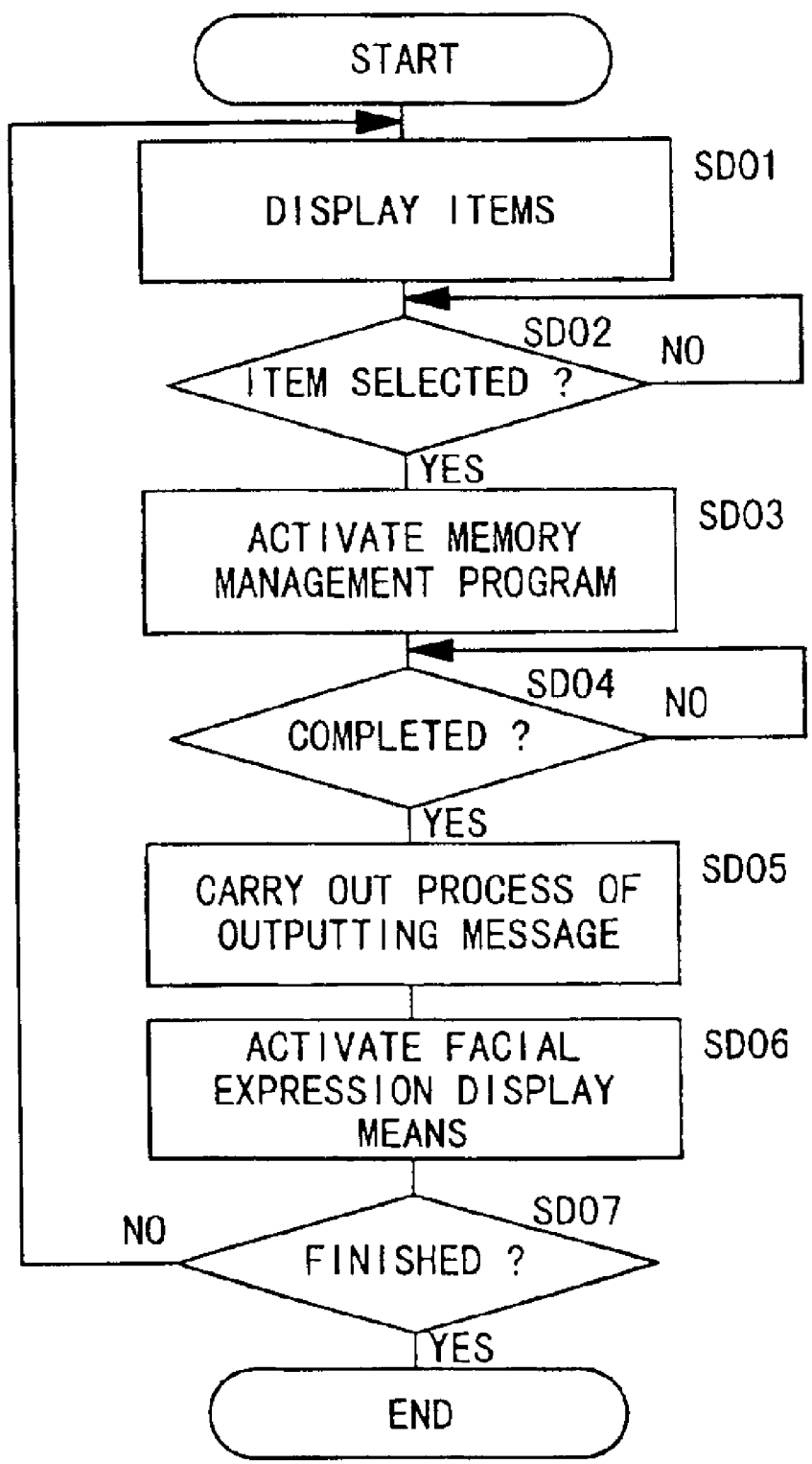
FIG. 39 is a flowchart of a processing sequence of a formatter function program.

As shown in FIG. 39, the formatter function program displays memory management items on the display unit 130 in step SD01. Then, the entry of one of the displayed memory management items is awaited in step SD02. If one of the displayed items is selected by the user with the direction buttons 121 and the decision button 122, then control proceeds to step SD03 to activate a resident memory management program in the terminal 100. The memory management program performs a memory management process corresponding to the selected item, e.g., for changing data registered by the user, moving the registered data to another array variable area, and copying the registered data.

While the memory management program is being executed, the facial expression display means 306 outputs the voice sounds of some message in every 10 seconds, for example, and also outputs the voice sounds of a message prompting the user to "calm down", for example, depending on the number of times that the direction buttons 121 or the decision button 122 is pressed per unit time.

The formatter function program monitors the memory management process for a completion in step SD04. If the formatter function program detects a completion of the memory management process, then control goes to step SD05 to carry out a process of outputting a message indicative of a completion of the memory management process. For example, an indicator value corresponding to the record number where a message indicative of a completion of the memory management process is stored, of the records in the facial expression information table 302, is stored in the transfer register 320.

In step SD06, the facial expression display means 306 is activated to output the voice sounds of the message indicative of a completion of the memory management process to the speaker 47 and display a moving image of a facial expression with the mouth being alternately opened and closed on the display unit 130.

Control proceeds to step SD07, which determines whether there is an entry for finishing the formatter function program or not. If there is no such entry, then control goes back to step SD01 in which the several memory management items are displayed on the display unit 130 to wait for the next selection of an item.

If there is an entry for finishing the time-killing function program in step SD07, then the formatter function program is ended. As shown in FIG. 33, the function menu image containing the various functions as the items is displayed on the display unit 130 to wait for the next selection of an item.

Figure 40:
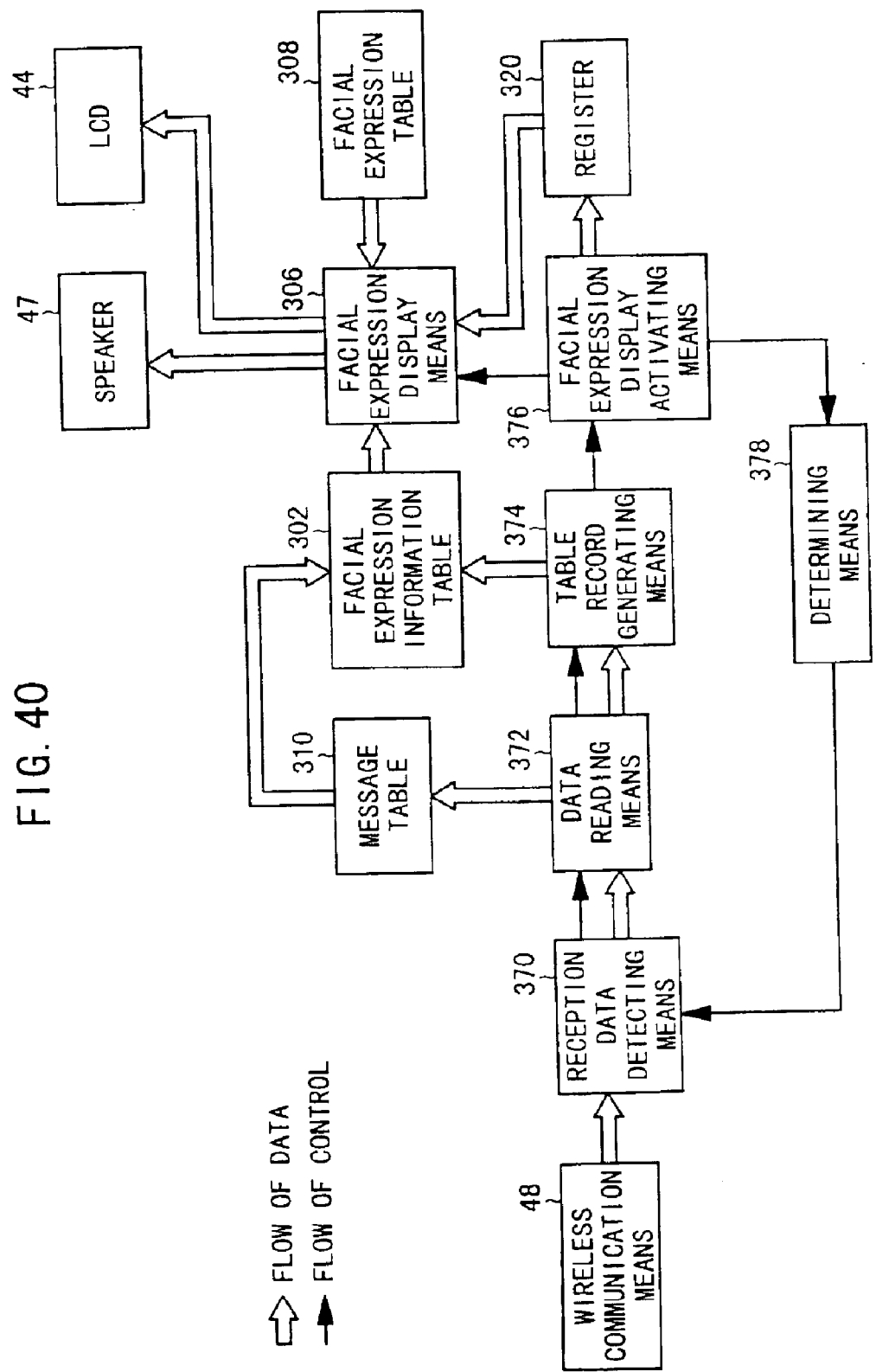
FIG. 40 is a functional block diagram of a random news function program.

As shown in FIG. 40, the random news function program comprises a reception data detecting means 370 for determining whether data has been received via the wireless communication means 48 or not, a data reading means 372 for reading received data, if any, and storing the data in an auxiliary record in the message table 310, a table record generating means 374 for generating contents of a record in the facial expression information table 302 and storing the generated contents in an auxiliary record in the facial expression information table 302, a facial expression display activating means 376 for storing an indicator value indicative of the auxiliary record in the transfer register 320 and activating the facial expression display means 306, and a determining means 378 for determining an end of the random news function program.

Figure 41:
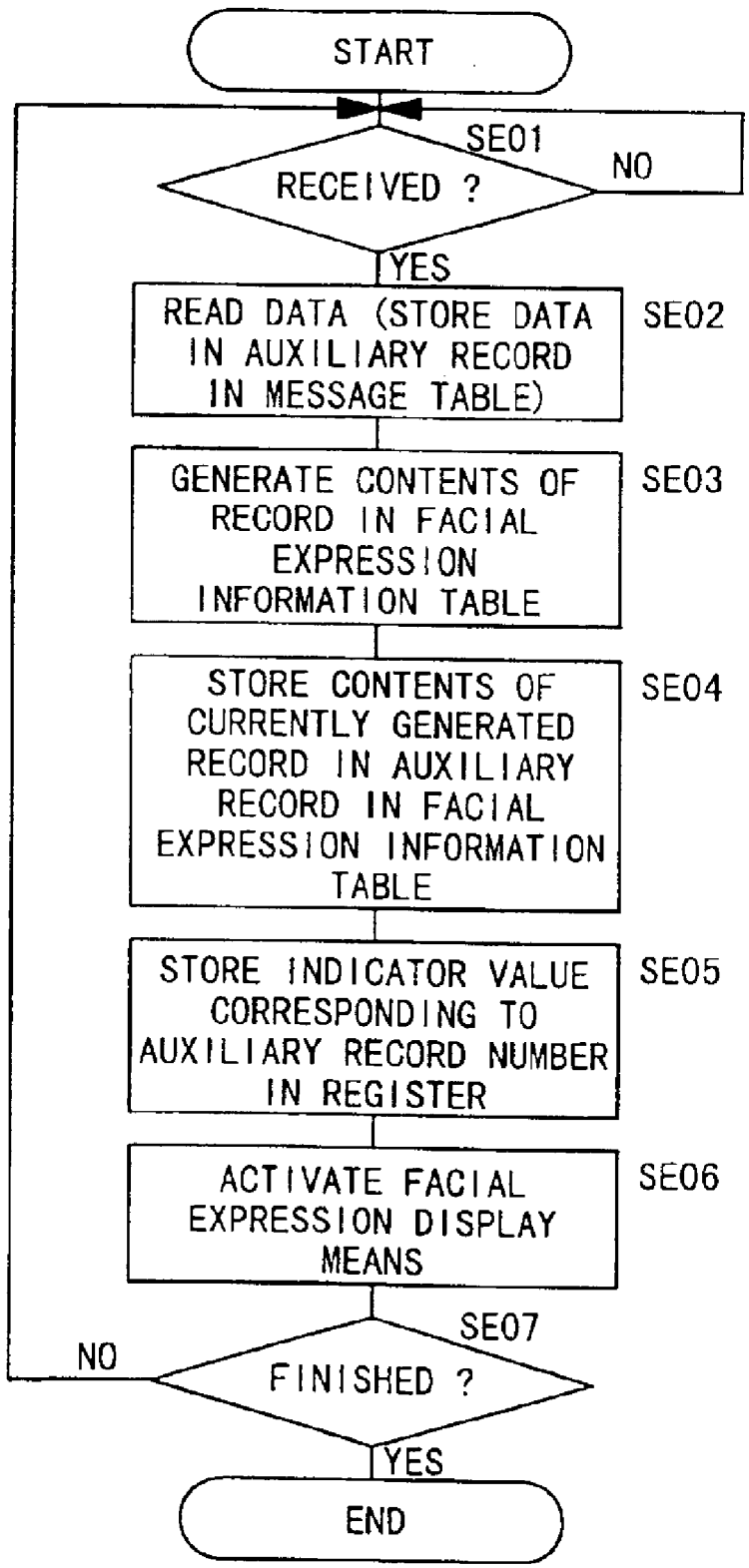
FIG. 41 is a flowchart of a processing sequence of the random news function program.

A processing sequence of the random news function program will be described below with reference to FIG. 41.

In step SE01, the reception data detecting means 370 determines whether data has been received via the wireless communication means 48 or not, i.e., waits for data.

If data has been received, then control proceeds to step SE02, in which the data reading means 372 reads the received data and stores the data in an auxiliary record in the message table 310. If message data of the received data is long, then the message data is divided into predetermined data lengths, and the divided message data are stored in a plurality of auxiliary records depending on the number of the data divisions.

In step SE03, the table record generating means 374 generates contents of a record in the facial expression information table 302. A type "1", for example, is stored, and the auxiliary record number in the message table 310 is stored as a message number.

If the message data of the received data is long, then since the message data has been divided and stored in a plurality of auxiliary records in the message table 310, the table record generating means 374 generates a plurality of records accordingly, and indicator values indicative of the respective auxiliary records are stored successively in related number storage areas of the respective records.

The contents of the record thus generated are stored in an auxiliary record in the facial expression information table 302 in step SE04.

In step SE05, the facial expression display activating means 376 stores an indicator value indicative of the auxiliary record number in the in the facial expression information table 302 in the transfer register 320.

In step SE06, the facial expression display activating means 376 activates the facial expression display means 306. The facial expression display means 306 reads facial expression information stored in the auxiliary record corresponding to the indicator value stored in the transfer register 320, of the records stored in the facial expression information table 302, displays a moving image of the morphed facial expression on the display unit 130 based on the type, facial expression number, message number, and related facial expression which are added to the read facial expression information, and output the voice sound data of the message to the speaker 47.

The display unit 130 displays a moving image of the fist basic facial expression with the mouth being alternately opened and closed on the display unit 130, and the speaker 47 outputs the voice sounds of a currently received message (news).

Control proceeds to step SE07, which determines whether there is an entry for finishing the random news function program or not. If there is no such entry, then control goes back to step SE01 in which next data reception is awaited.

If there is an entry for finishing the random news function program in step SE07, then the random news function program is ended.

An illegal copying prevention function that is incorporated as an indispensable function in the terminal 100 will be described below.

Inasmuch as the terminal 100 has the wireless communication means 48, the various function programs in the terminal 100 may illegally be copied to other terminals 100 via the wireless communication means 48. The illegal copying prevention function periodically determines whether certain data, e.g., an ID code assigned to each CD-ROM, has been downloaded from a CD-ROM, i.e., a CD-ROM which stores various programs that can be downloaded to the terminal 100, to the terminal 100 or not. If no such certain data has been downloaded, then the illegal copying prevention function displays a facial expression, e.g., a depressed facial expression, on the display unit 130, and does not accept, i.e., makes ineffective, any entries from the decision button 122 and the direction buttons 121.

However, since the user may possibly forget the time to download data, even if any entries from the decision button 122 and the direction buttons 121 have been made ineffective, it is preferable to make effective again entries from the decision button 122 and the direction buttons 121 when data has been downloaded from a legitimate CD-ROM, and subsequently operate the terminal 100 normally.

If a downloading date is simply stored in the nonvolatile memory 46 and whether data has been downloaded or not is determined on the basis of the stored date, such a decision may tend to be useless because it is easy to reset the nonvolatile memory 46 from outside.

Figure 42:
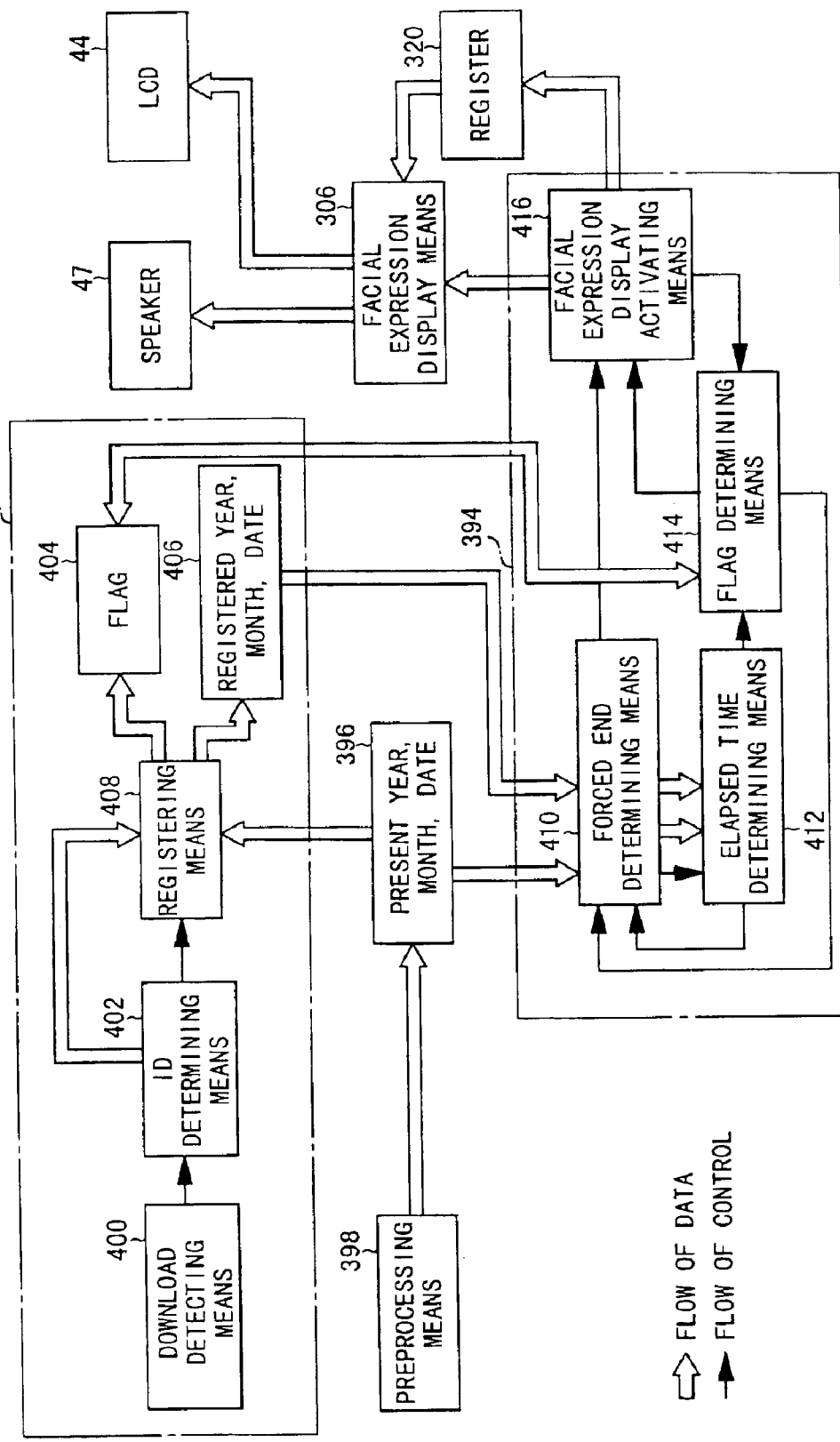
FIG. 42 is a functional block diagram of an illegal copying prevention means.

A means for performing the illegal copying prevention function in view of the above conditions and drawbacks, i.e., an illegal copying prevention means 390, will be described below with reference to FIGS. 42 through 44.

The illegal copying prevention means 390 comprises a download monitoring means 392 for registering the year, month, and date of an instance of downloading of data, and a periodic download determining means 394 for periodically determining whether data has been downloaded or not.

The download monitoring means 392 comprises a preprocessing means 398 for storing the present year, month, and date in a first memory area 396, a download detecting means 400 for detecting whether data has been downloaded or not, an ID determining means 402 for determining whether an ID which has been downloaded is a predetermined ID or not, and a registering means 408 for setting a flag 404 indicative of the download if the downloaded ID is the predetermined ID and registering the present year, month, and date in a second memory area 406.

The periodic download determining means 394 comprises a forced end determining means 410 for determining whether the present year, month, and date stored in the first and second memory areas 396, 406 are effective or ineffective, and bringing all programs except the facial expression display means 306 to a forced end if the stored present year, month, and date are ineffective, an elapsed time determining means; 412 for determining whether a predetermined period, e.g., one month, has elapsed or not on the basis of the present year, month, and date stored in the first and second memory areas 396, 406, a flag determining means 414 for determining whether the flag 404 has been set or not if the predetermined period has elapsed, bringing all programs except the facial expression display means 306 to a forced end if the flag 404 has not been set, and resetting the flag 404 if the flag 404 has been set, and a facial expression display activating means 416 for storing an indicator value indicative of an ineffective state in the transfer register 320 and activating the facial expression display means 306.

Processing sequences of the download monitoring means 392 and the periodic download determining means 394 will be described below with reference to FIGS. 43 and 44.

Figure 43:
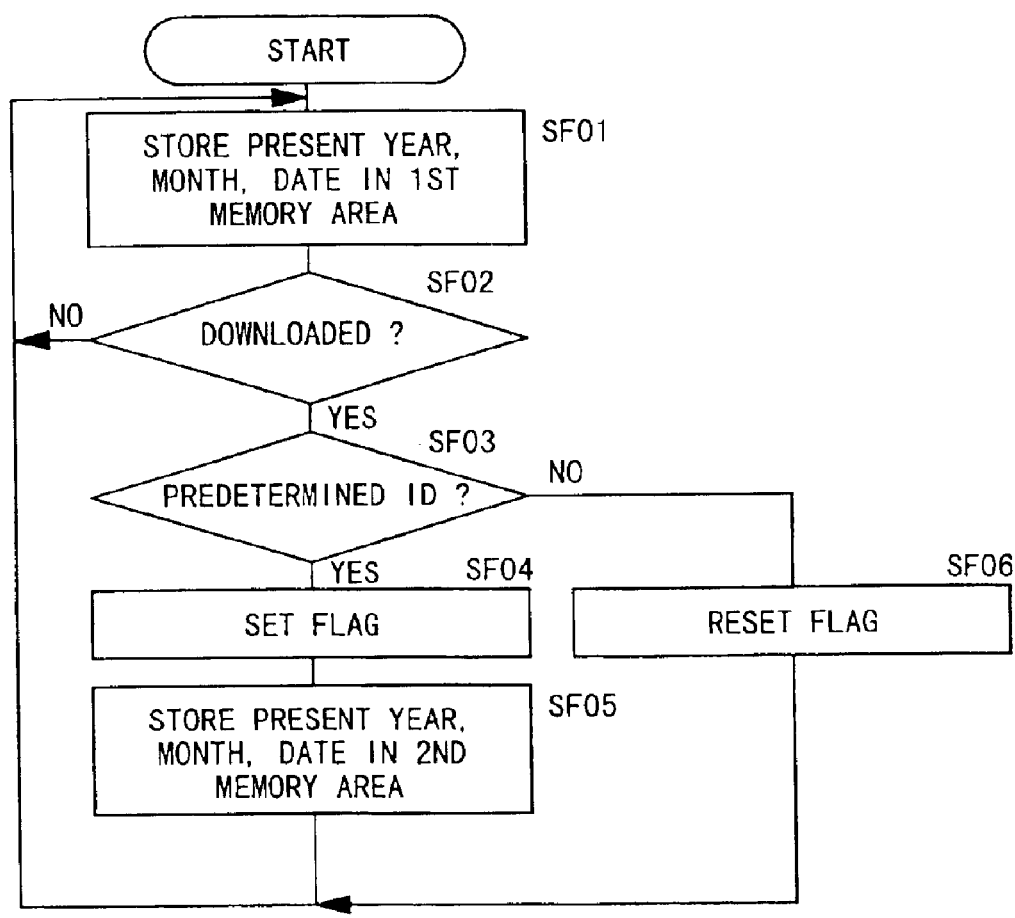
FIG. 43 is a flowchart of a processing sequence of a download monitoring means.

As shown in FIG. 43, the preprocessing means 398 of the download monitoring means 392 stores the present year, month, and date data in the first memory area 396 in the nonvolatile memory 46 in step SF01.

In step SF02, the download detecting means 400 detects; whether data has been downloaded or not. If data has not been downloaded, then the present year, month, and date data is stored in the first memory area 396 in step SF01. Thereafter, the download detecting means 400 detects whether data has been downloaded or not in step SF02.

If data has been downloaded in step SF02, then control proceeds to step SF03, in which the ID determining means 402 determines whether a downloaded ID of the downloaded data or program is a predetermined ID or not.

If the downloaded ID is the predetermined ID, then the registering means 408 sets the flag 404 and registers the present year, month, and date data in the second memory area 406 in the nonvolatile memory 46 in step SF05.

If the downloaded ID is not the predetermined ID in step SF03, then control goes to step SF06, in which the flag 404 is reset.

When the processing of step SF05 or step SF06 is finished, control returns to step SF01, in which the present year, month, and date data is stored in the first memory area 396, after which next data downloading is awaited.

Figure 44:
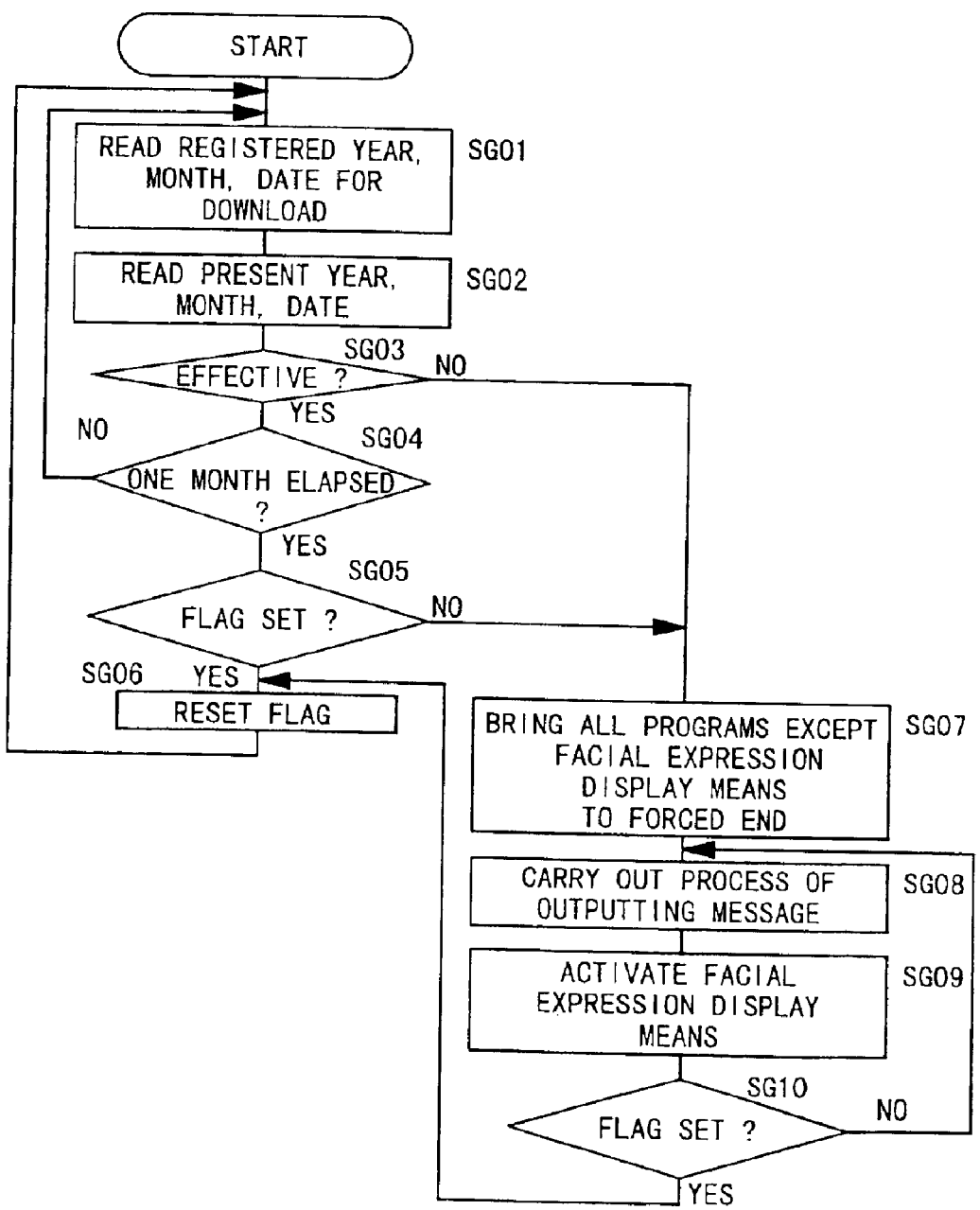
FIG. 44 is a flowchart of a processing sequence of a periodic download determining means.

As shown in FIG. 44, the forced end determining means 410 of the periodic download determining means 394 reads the downloaded year, month, and date data (registered year, month, and date) from the second memory area 406 in step SG01, and then reads the present year, month, and date data (present year, month, and date) from the first memory area 396 in step SG02.

In step SG03, the forced end determining means 410 determines whether the year, month, and date data is effective or ineffective by determining whether both the registered year, month, and date and the present year, month, and date are "0" or not. If both the registered year, month, and date and the present year, month, and date are not "0", then the year, month, and date data is judged as being effective, and control goes to step SG04. In step SG04, the elapsed time determining means 412 determines whether a predetermined period, e.g., one month, has elapsed or not from the registered year, month, and date as of the present year, month, and date.

If the predetermined period has elapsed, then control proceeds to step SG05, in which the flag determining means 414 determines whether the flag 404 is set or not, i.e., whether data has been downloaded within a predetermined period or not.

If the flag 404 is set, indicating that data has been downloaded within the predetermined period, then control proceeds to step SG06, in which the flag determining means 414 resets the flag 404. Thereafter, control goes back to step SG01, and repeats the processing in step SG01 and subsequent steps.

If the year, month, and date data is judged as being ineffective in step SG03, or if the flag 404 remains reset in step SG05, then control goes to step SG07, in which the forced end determining means 410 brings all programs except the facial expression display means 306 to a forced end.

In step SG08, the facial expression display activating means 416 stores an indicator value for outputting a message to prompt the user to download data in the transfer register 320. Then, the facial expression display activating means 416 activates the facial expression display means 306 in step SG09.

Thereafter, the flag determining means 414 determines whether the flag 404 has been set or not, i.e., whether data has been downloaded or not, in step SG10. The processing in steps SG08 through SG10 is repeated until the flag 404 is set. In this loop, only a download-based input interrupt is permitted, and the terminal 100 is in the ineffective state.

If the flag 404 has been set in step SG10, then control goes to step SG06 in which the flag 404 is reset. Thereafter, control returns to step SG01, and repeats the processing in step SG01 and subsequent steps. At this time, the terminal 100 returns to the normal state (effective state).

A special function that is incorporated as an option will be described below. This special function is referred to as an "insertion message output functions which, when the terminal 100 is inserted into one of the memory card insertion units 8A, 8B of the entertainment apparatus 1, outputs the voice sounds of some message, and displays a facial expression with the mouth being alternately opened and closed on the display unit 130.

A program for performing the insertion message output function, i.e., an insertion message output function program, is downloaded from a CD-ROM played back by the entertainment apparatus 1 to the terminal 100 according to a certain process, and run by the terminal 100.

Figure 45:
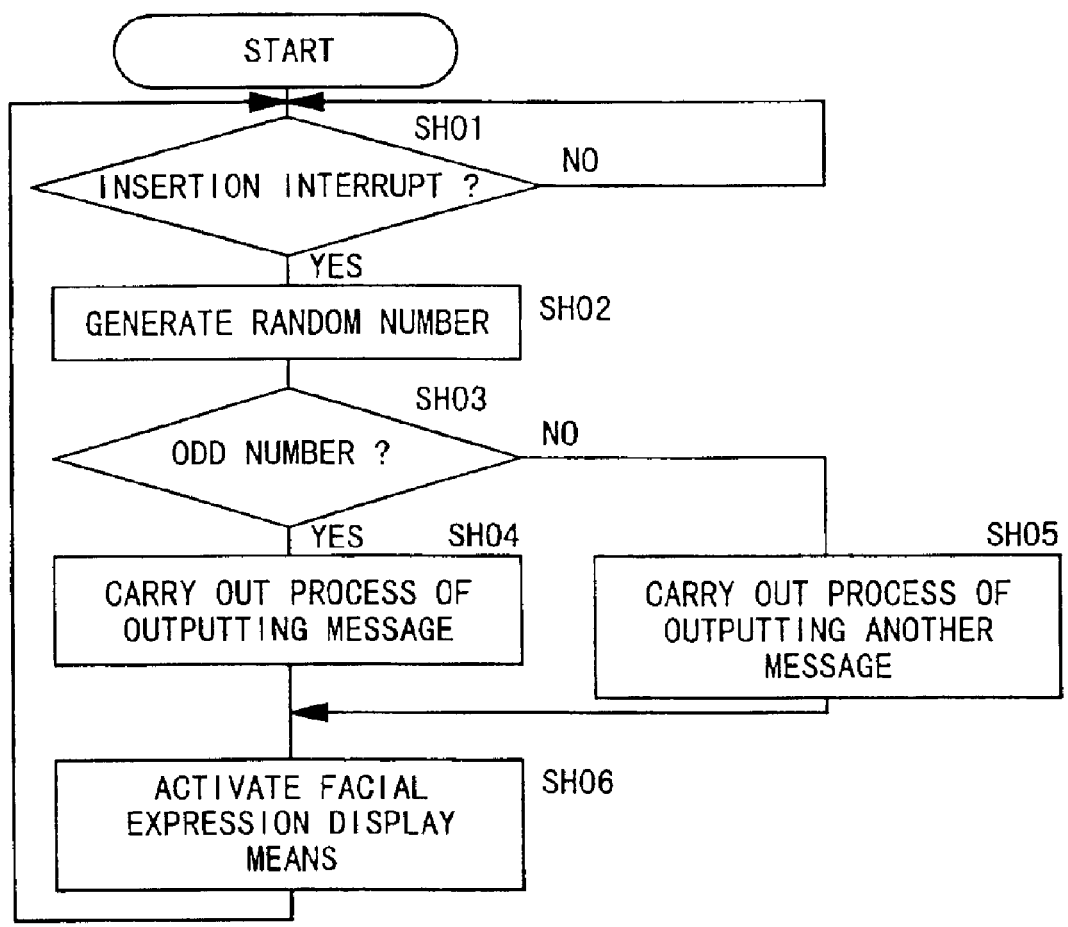
FIG. 45 is a flowchart of a processing sequence of a insertion message output function program.

A processing sequence of the insertion message output function program will be described below with reference to FIG. 45. In step SH01, it is determined whether an insertion interrupt has occurred or not, i.e., an insertion interrupt is awaited. An insertion interrupt occurs when the terminal 100 is inserted into one of the memory card insertion units 8A, 8B of the entertainment apparatus 1.

If an insertion interrupt has occurred, control proceeds to step SH02, in which a random number is generated. It is determined in step SH03 whether the generated random number is an odd number or an even number. If the random number is an odd number, then control proceeds to step SH04, in which an indicator value for outputting a message due to the insertion interrupt is stored in the transfer register 320. If the random number is an even number, then control proceeds to step SH05, in which an indicator value for outputting another message due to the insertion interrupt is stored in the transfer register 320.

In step SH06, the facial expression display means 306 is activated to read facial expression information stored in the record corresponding to the indicator value stored in the transfer register 320, of the records stored in the facial expression information table 302, display a moving image of the morphed facial expression on the display unit 130 based on the type, facial expression number, message number, and related facial expression which are added to the read facial expression information, and output the voice sound data of the message to the speaker 47.

When the processing in step SH06 is finished, control returns to step SH01, waiting for the next insertion of the terminal 100.

A processing sequence of the manual selecting means, which is the other type of the facial expression selecting means 304 (see FIG. 17), for selecting one of the facial expression information stored in the facial expression information table 302, depending on the timing of a manual control input entered while the current facial expression is being displayed, will be described below with reference to FIGS. 46 through 51.

Figure 46:
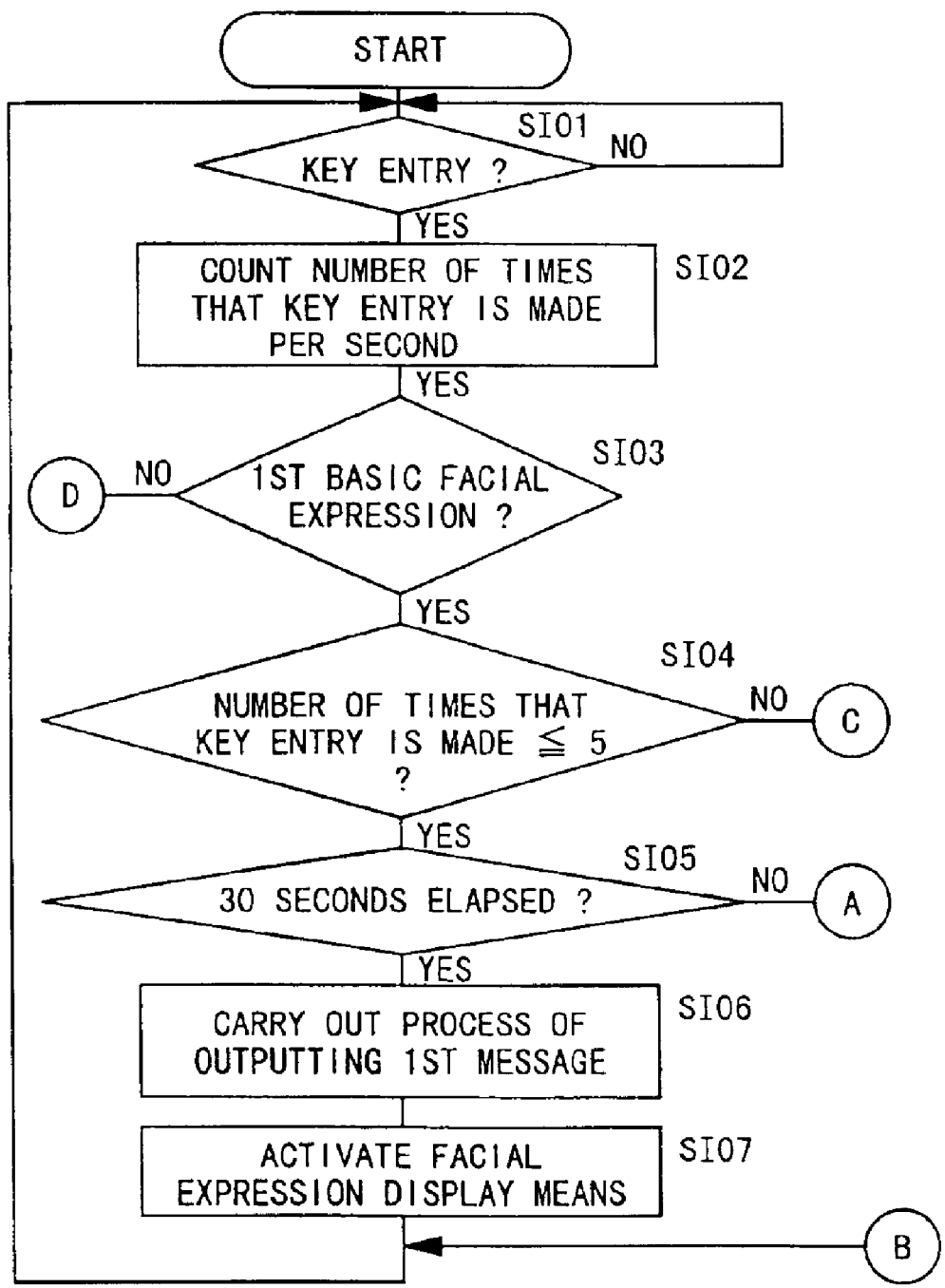
FIG. 46 is a flowchart of a processing sequence (part 1) of a manual selecting means.

In step SI01 shown in FIG. 46, the manual selecting means determines whether there is an entry from the decision button 122 or the direction buttons 121, i.e., waits for a key entry.

If there is an entry from the decision button 122 or the direction buttons 121, control goes to step SI02, in which the number of times that a key entry is made per second is counted. Thereafter, it is determined in step SI03 whether the presently displayed facial expression is the first basic facial expression or not based on the indicator value presently stored in the transfer register 320. If the presently displayed facial expression is the first basic facial expression, then control proceeds to step SI04, which determines whether a key entry is frequent or slow based on the number of times that a key entry is made per second. If the number of times that a key entry is made per second is 5 or less, then the key entry is judged as being slow, and if the number of times that a key entry is made per second is more than 5, then the key entry is judged as being frequent.

If the number of times that a key entry is made per second is 5 or less, with the key entry judged as being slow, then control proceeds to step SI05, which determines whether 30 seconds or longer has elapsed from the preceding key entry until the present key entry. If the present key entry is made after elapse of 30 seconds or longer from the preceding key entry, then control goes to step SI06, in which a process for outputting a first message "Hey, have you washed your hands?", for example, is carried out. Specifically, an indicator value for indicating a record which stores facial expression information relative to the first message is stored in the transfer register 320.

Thereafter, in step SI07, the facial expression display means 306 is activated to read facial expression information stored in the record corresponding to the indicator value stored in the transfer register 320, of the records stored in the facial expression information table 302, display a moving image of the morphed facial expression on the display unit 130 based on the type, facial expression number, message number, and related facial expression which are added to the read facial expression information, and output the voice sound data of the message to the speaker 47.

When the processing in step SI07 is finished, control returns to step SI01, waiting for a next key entry.

Figure 47:
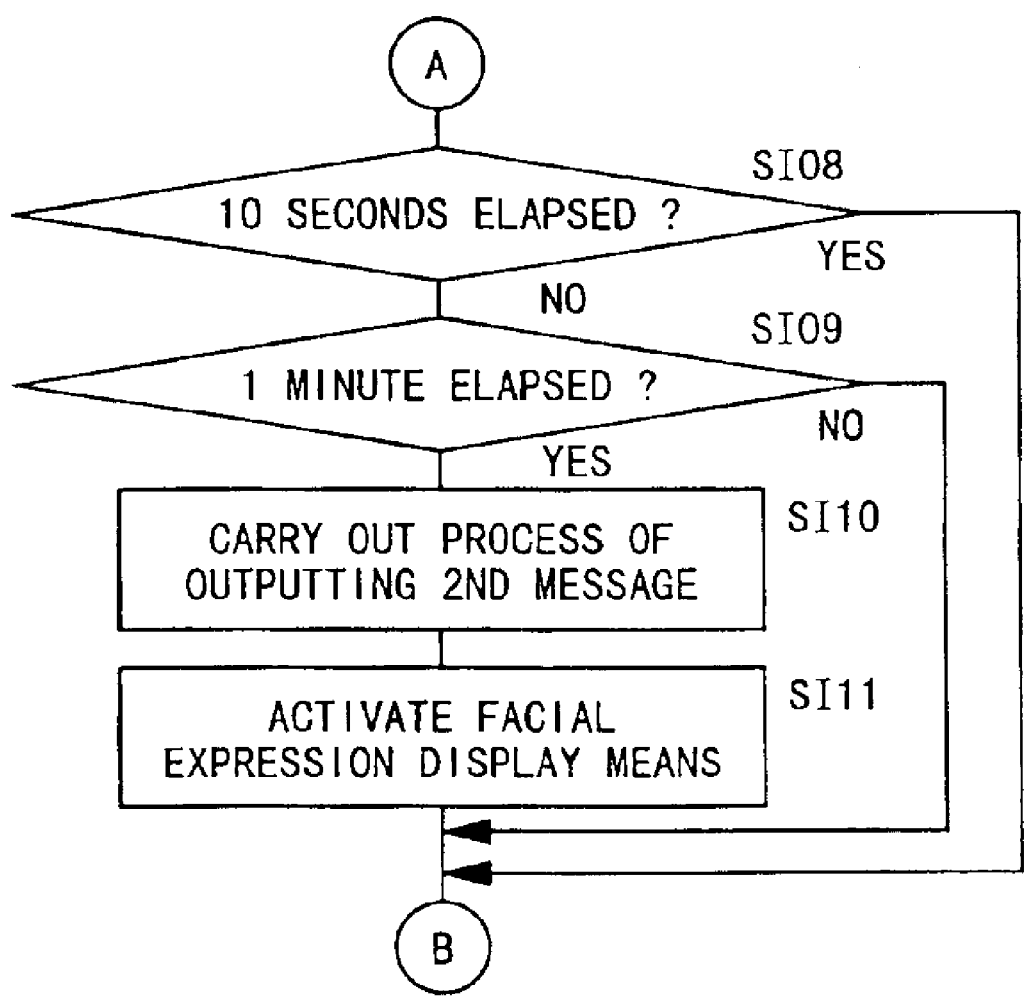
FIG. 47 is a flowchart of a processing sequence (part 2) of the manual selecting means.

If 30 seconds have not elapsed from the preceding key entry in step SI05, then control goes to step SI08 shown in FIG. 47, which determines whether 10 seconds has elapsed or not from the preceding key entry until the present key entry. If 10 seconds has not elapsed, then control goes to step SI09, which determines whether or not key entries have been made at time intervals of 10 seconds or less for 1 minute or longer.

If such key entries have been made for 1 minute or longer, then control goes to step SI10, in which a process for outputting a second message "Will you keep away from me because you make me feel hot and stuffy", for example, is carried out. Thereafter, in step SI11, the facial expression display means 306 is activated to read facial expression information related to the second message from the facial expression information table 302, display a moving image of the morphed facial expression on the display unit 130 based on the type, facial expression number, message number, and related facial expression which are added to the read facial expression information, and output the voice sound data of the message to the speaker 47.

When the processing in step SI11 is finished, control returns to step SI01 shown in FIG. 46, waiting for a next key entry.

Figure 48:
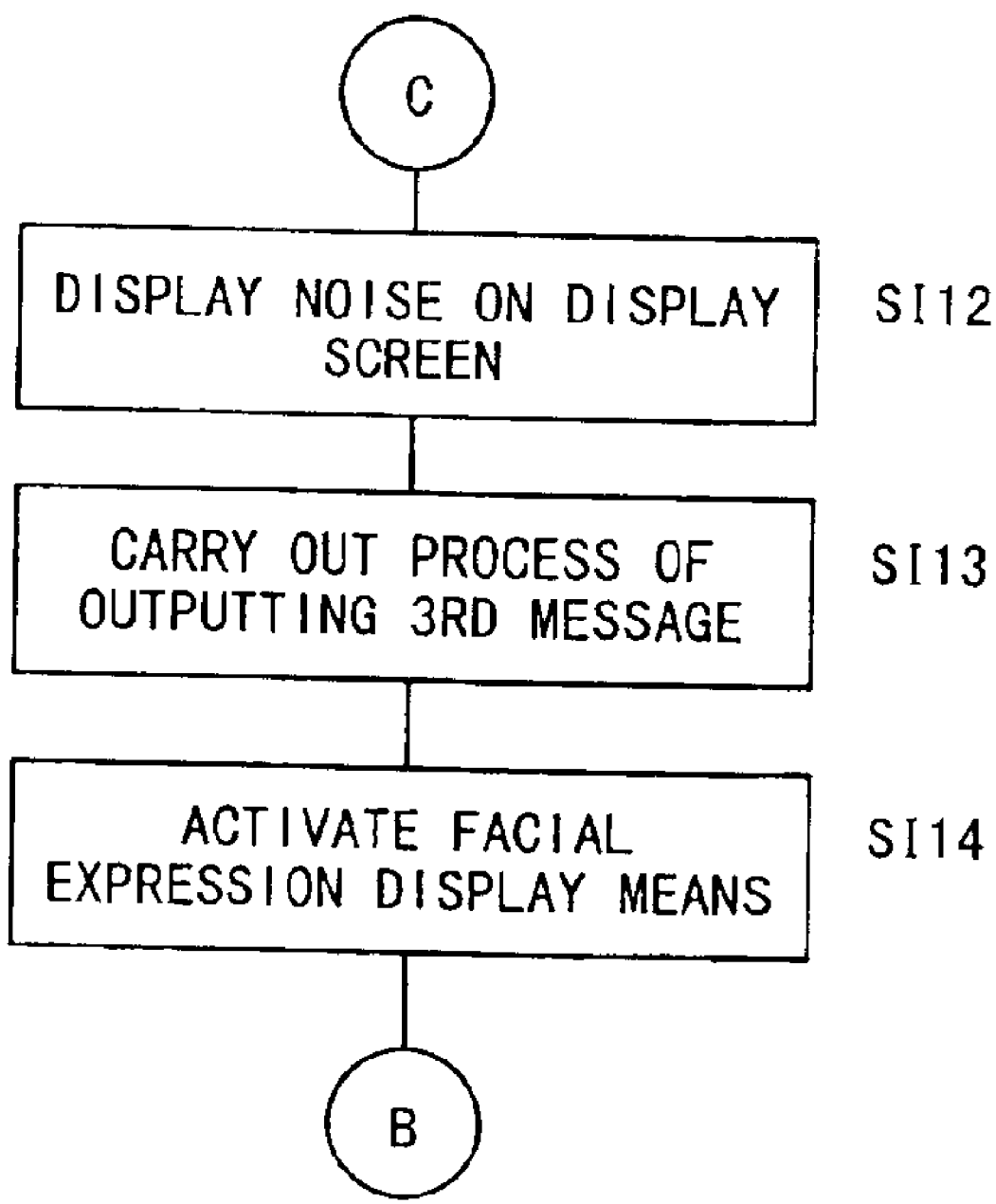
FIG. 48 is a flowchart of a processing sequence (part 3) of the manual selecting means.

If a key entry is determined as being frequent in step SI04 shown in FIG. 46, then control goes to step SI12 shown in FIG. 48, in which a noise signal is outputted to the LCD 44 to display the facial expression as disturbed by noise on the display unit 130.

In step SI13, a process for outputting a third message "Don't break it", for example, is carried out. In step SI14, the facial expression display means 306 is activated to read facial expression information related to the third message from the facial expression information table 302, display a moving image of the morphed facial expression on the display unit 130 based on the type, facial expression number, message number, and related facial expression which are added to the read facial expression information, and output the voice sound data of the message to the speaker 47.

When the processing in step SI14 is finished, control returns to step SI01 shown in FIG. 46, waiting for a next key entry.

Figure 49:
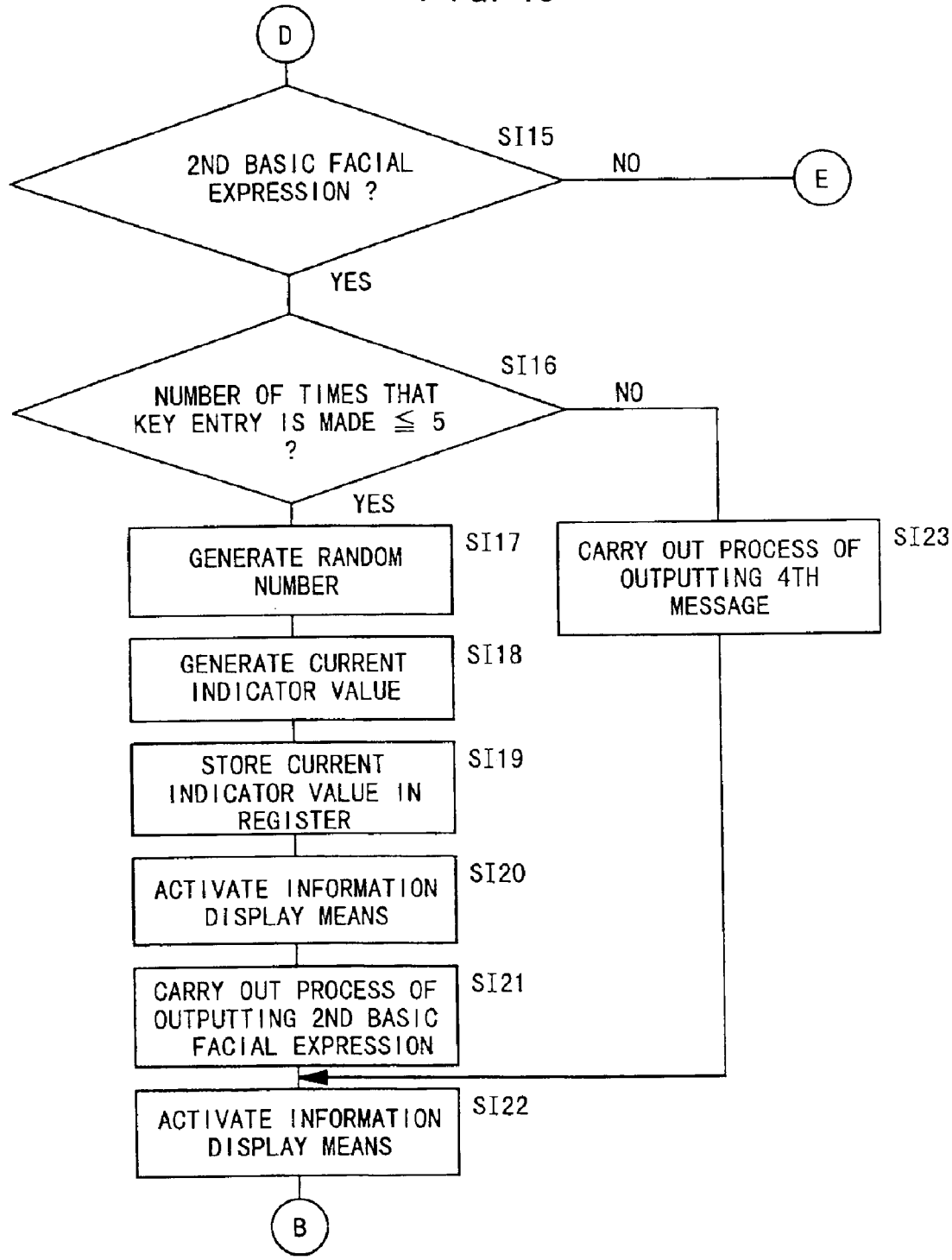
FIG. 49 is a flowchart of a processing sequence (part 4) of the manual selecting means.

If the presently displayed facial expression is not the first basic facial expression in step SI03 shown in FIG. 46, then control goes to step SSI15 shown in FIG. 49, which determines whether the presently displayed facial expression is a second basic facial expression, e.g., a facial expression looking around restlessly, or not.

If the presently displayed facial expression is the second basic facial expression, then control proceeds to step SI16, which determines whether key entries are relatively slow or frequent (quick successive hits). If key entries are relatively slow, then control proceeds to step SI17, in which a random number represented by a certain number of bits is generated. Thereafter, a current indicator value is generated on the basis of the random number in step SI18.

In step SI19, the current indicator value is stored in the transfer register 320. Then, in step SI20, the facial expression display means 306 is activated to read facial expression information stored in the record corresponding to the indicator value stored in the transfer register 320, of the records stored in the facial expression information table 302, display a moving image of the morphed facial expression on the display unit 130 based on the type, facial expression number, message number, and related facial expression which are added to the read facial expression information, and output the voice sound data of the message to the speaker 47.

Thereafter, in step SI21, a process for outputting the second basic facial expression is performed. In step SI22, the facial expression display means 306 is activated to read facial expression information relative to the second basic facial expression from the facial expression information table 302, and display a moving images of the morphed second basic facial expression on the display unit 130.

If key entries are judged as being quick successive hits in step SI16, then control goes to step SI23, in which a process for outputting a fourth message "Well, you seem to be frustrated", for example, is carried out. Then, in step SI22, the facial expression display means 306 is activated to read facial expression information relative to the fourth message from the facial expression information table 302, display a moving image of the morphed facial expression on the display unit 130 based on the type, facial expression number, message number, and related facial expression which are added to the read facial expression information, and output the voice sound data of the message to the speaker 47.

When the processing in step SI22 or SI23 is finished, control returns to step SI01 shown in FIG. 4, waiting for a next key entry.

Figure 50:
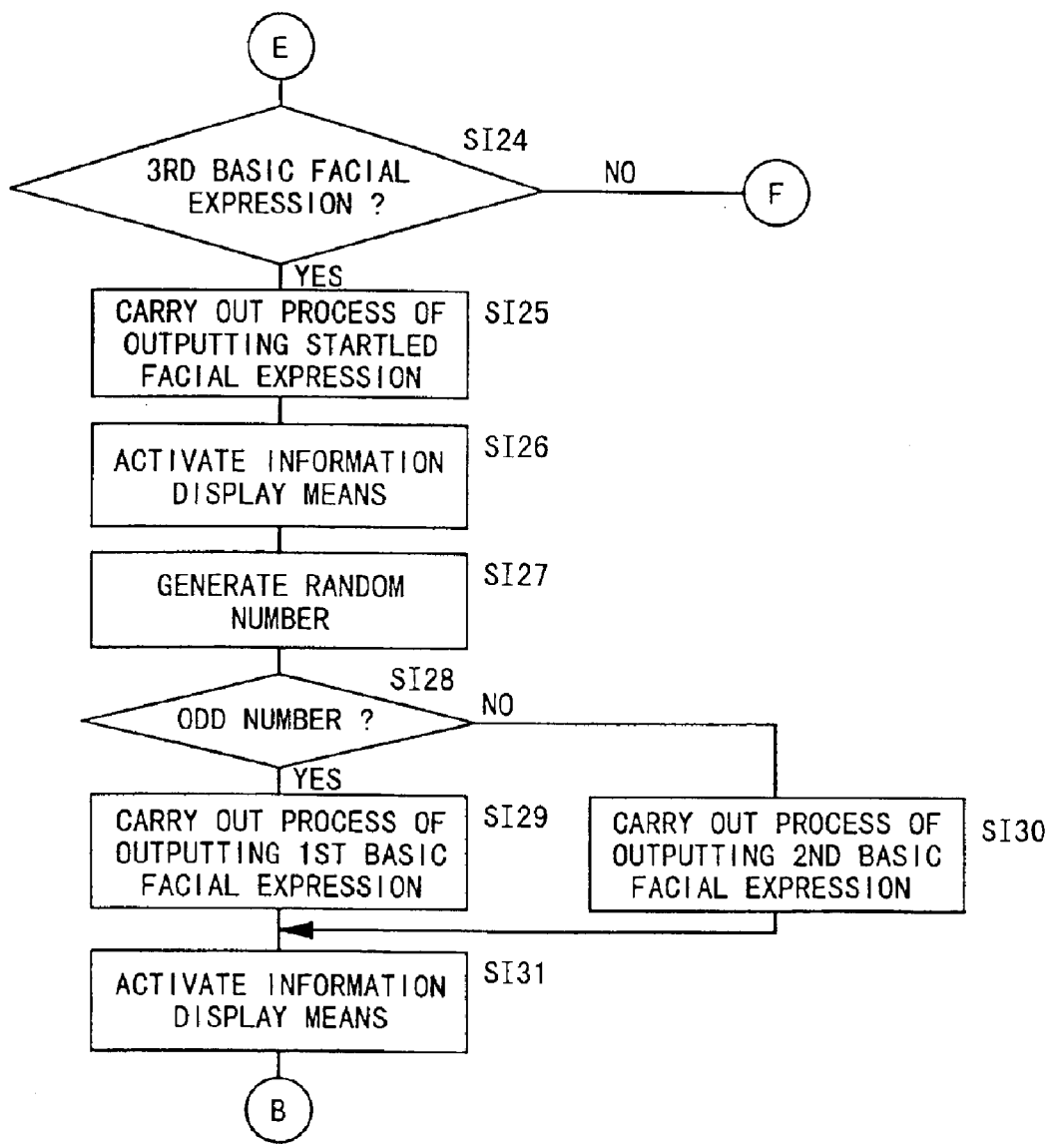
FIG. 50 is a flowchart of a processing sequence (part 5) of the manual selecting means.

If the presently displayed facial expression is not the second basic facial expression in step SI15 shown in FIG. 49, then control proceeds to step SI24 shown in FIG. 50, which determines whether the presently displayed facial expression is a third basic facial expression, e.g., a facial expression with yawning, or not.

If the presently displayed facial expression is the third basic facial expression, then control proceeds to step SI25, in which a process for outputting a surprising facial expression is carried out. Then, in step SI26, the facial expression display means 306 is activated to read facial expression information related to the surprising facial expression from the facial expression information table 302, and display a moving image of the morphed facial expression on the display unit 130 based on the type, facial expression number, message number, and related facial expression which are added to the read facial expression information.

In step SI27, a random number is generated. Thereafter, in step SI28, it is determined whether the generated random number is an odd number or an even number. If the random number is an odd number, then control goes to step SI29, in which a process for outputting the first basic facial expression is carried out. If the random number is an even number, then control goes to step SI30, in which a process for outputting the second basic facial expression is carried out.

Thereafter, in step SI31, the facial expression display means 306 is activated to read facial expression information relative to the first or second basic facial expression from the facial expression information table 302, and display a moving images of the morphed first or second basic facial expression on the display unit 130.

When the processing in step SI31 is finished, control returns to step SI01 shown in FIG. 46, waiting for a next key entry.

Figure 51:
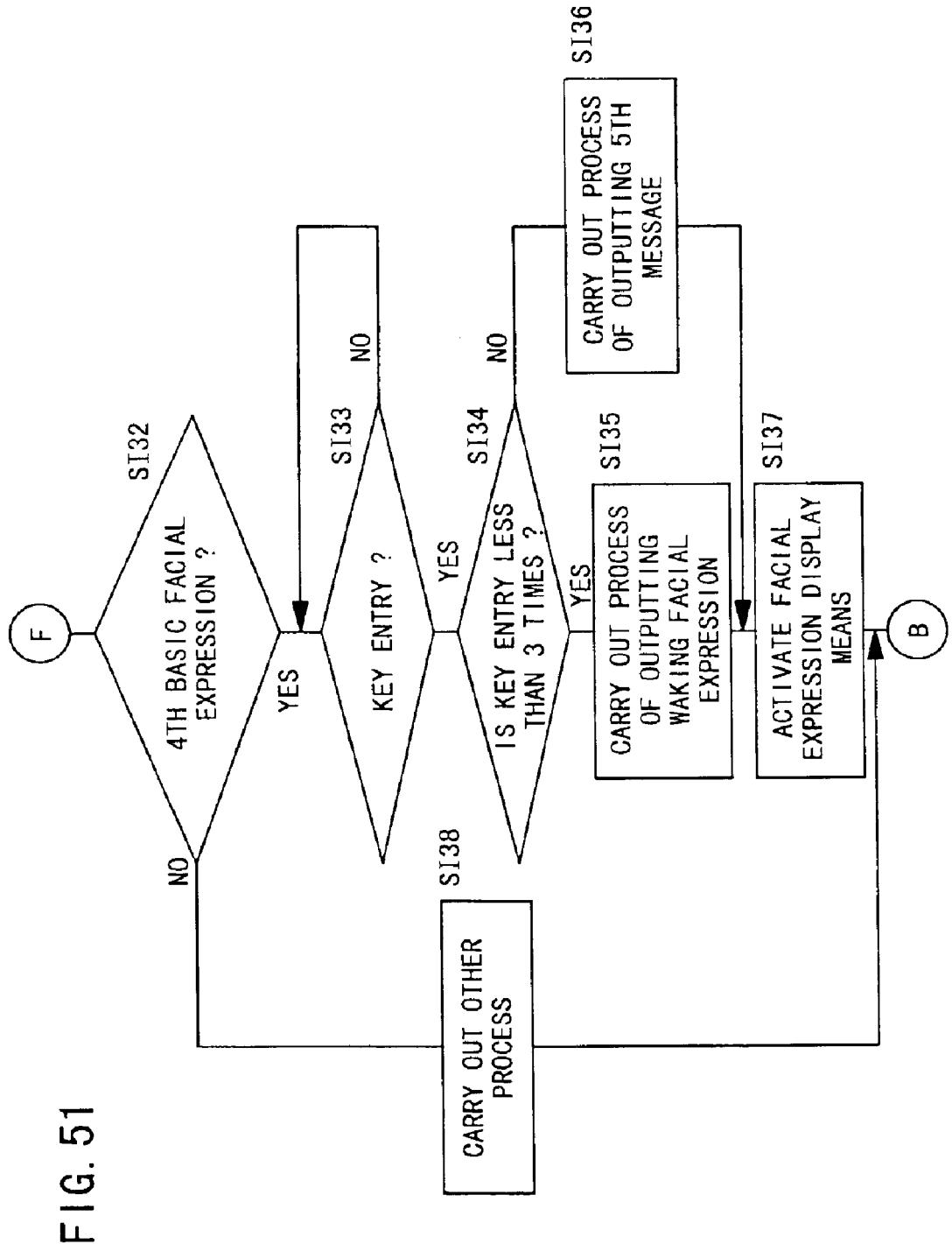
FIG. 51 is a flowchart of a processing sequence (part 6) of the manual selecting means.
Figure 56:
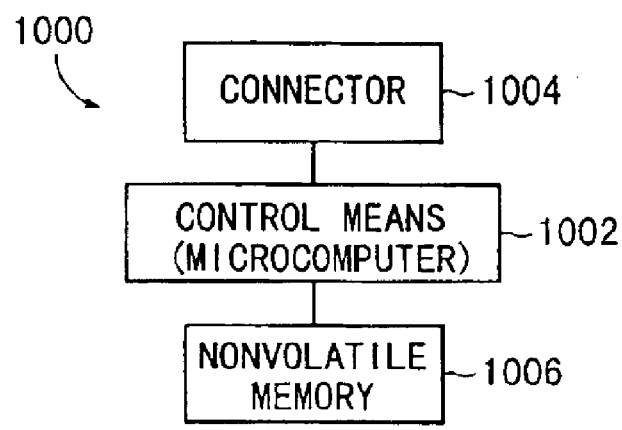
FIG. 56 is a block diagram of an arrangement of major components of an ordinary memory card device.
Figure 57:
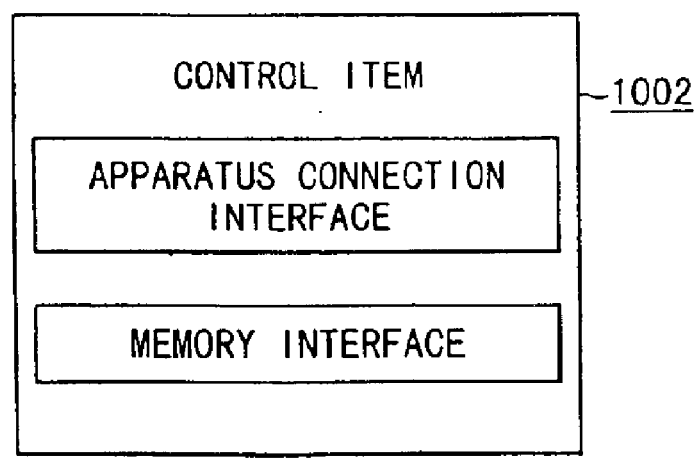
FIG. 57 is a diagram showing control items carried out by a control means of an ordinary memory card device.
Figure 58:
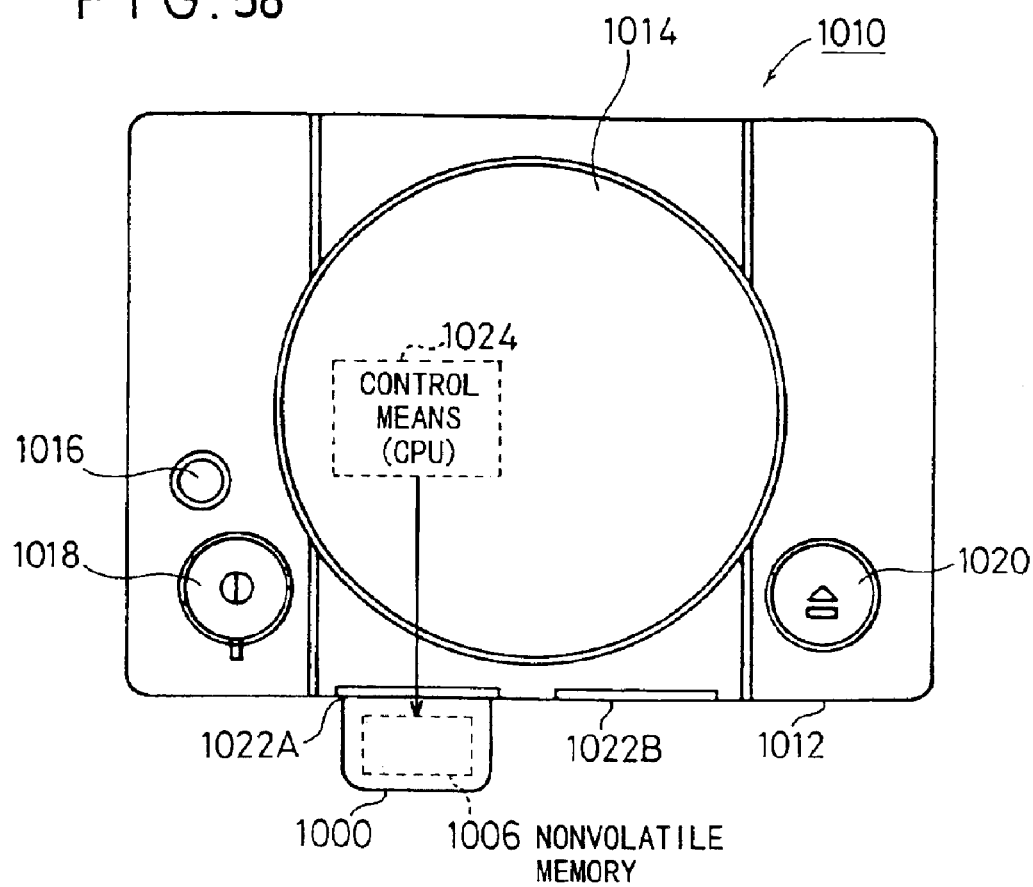
FIG. 58 is a plan view of an entertainment apparatus which employs a memory card as an auxiliary memory.

If the presently displayed facial expression is not the third basic facial expression in step SI24 shown in FIG. 50, then control proceeds to step SI32 shown in FIG. 51, which determines whether the presently displayed facial expression is a fourth basic facial expression, e.g., a napping facial expression, or not.

If the presently displayed facial expression is the fourth basic facial expression, then control proceeds to step SI33, waiting for a next key entry. If there is a key entry, then control proceeds to step SI34, which determines whether the key entry is repeated three times or not.

If the key entry is repeated less than three times, then control proceeds to step SI35, in which a process for outputting a waking facial expression is carried out. If the key entry is repeated three times or more, then control proceeds to step SI36, in which a process for outputting a fifth message is carried out.

In step SI37, the facial expression display means 306 is activated to read facial expression information related to the waking facial expression or the fifth message from the facial expression information table 302, and display a moving image of the morphed facial expression on the display unit 130 based on the type, facial expression number, message number, and related facial expression which are added to the read facial expression information, or display the moving image of the morphed facial expression on the display unit 130 and output the voice sound data of the message to the speaker 47.

When the processing in step SI37 is finished, control returns to step SI01 shown in FIG. 46, waiting for a next key entry.

If the presently displayed facial expression is not the fourth basic facial expression, then control proceeds to step SI38, in which another process according to specifications is carried out. Thereafter, control returns to step SI01 shown in FIG. 46, waiting for a next key entry.

As described above, the terminal 100 according to the embodiment of the present invention has the body casing 200 surrounding the display unit 130, with the casing 200 and the display unit 130 representing the form 206 comprising the head 202 and the body 204. Since the user can enjoy changing facial expressions on the form 206 at all times, the user can use the terminal 100 itself as a portable toy.

The terminal 100 displays moving images of facial expressions of the form 206 on the display unit 130, so that it acts as if it had a life therein and functions as company that the user can talk to.

The facial expression selecting means 304 selects one of the items of registered facial expression information, and the selected facial expression information is read. A moving image is then displayed which represents a transformation from the current facial expression to the facial expression based on the read facial expression information according to a morphing technique. Consequently, the displayed facial expression changes naturally without appreciable awkward transitions. The smooth facial expression changes allow the terminal 100 as viewed as a toy to attract customers highly effectively.

The facial expression selecting means 304 selects one of the items of registered facial expression information randomly at the timing of a predetermined time duration. Therefore, even if the terminal 100 is left, it operates humorously by speaking something and changing facial expressions by itself, thereby making the user feel intimate with the terminal 100.

The facial expression selecting means 304 selects one of the items of registered facial expression information 25 based on a manual control input while the present facial expression is being displayed, depending on the timing of the manual control input. Simply when the user makes key entries, various messages and facial expression changes are produced depending on the timing of the key entries, the time durations of the key entries, and the period of time in which the key entries continue. Accordingly, the user can experience a sensation as if playing with the terminal 100 with a life kept therein.

If facial expression information related to the read facial expression information is added, then the terminal 100 displays a moving image representing a deformation from a facial expression based on the read facial expression information to a facial expression based on the related facial expression information according to the morphing technique. Therefore, complex facial expression changes and a combination of plural facial expressions related to one facial expression can easily be achieved.

If message information is added to the read facial expression information, then a message corresponding to the message information is read, and outputted as voice sound data to the speaker 47 in substantial synchronism with the display of the facial expression on the display unit 130. Consequently, it is possible to develop an organic atmosphere in which the terminal 100 speaks naturally as if it had a life therein, rather than an inorganic atmosphere in which a computer outputs voice sounds based on data.

If message information is added to the read facial expression information and information representing the display of a message is also added thereto, then the message corresponding to the message information is read and displayed as an image. Therefore, if a long message is to be outputted, only basic message segments thereof may be displayed as an image, and insignificant message segments such as prefixes and suffixes may be outputted as voice sounds. Consequently, even when a piezoelectric buzzer is used as the speaker 47, the problem of an insufficient capacity thereof for outputting long messages can be solved.

Examples of various facial expression changes made by the terminal 100 with the facial expression selecting means 304 (manual selecting means) based on key entries will be described below.

1. Concept:

The terminal 100 usually displays a face so that it shakes unsteadily, and changes from an ordinary facial expression to various facial expressions such as a dozing facial expression, for example.

The user presses the buttons, e.g., the decision button 122 and the direction buttons 121, on the body 204 of the terminal 100 to communicate with the terminal 100 for changing the relationship to the terminal 100.

The terminal 100 has a "talking function (word display", a "clock function", and a "fortune function". The user can select these functions as desired.

2. How to Play with the Terminal 100:

The terminal 100 is usually in a "facial expression display" mode. In this mode, the user can randomly select predetermined facial expressions on the terminal 100 to enjoy facial expression changes that happen successively.

When the user presses one of the direction buttons 121 at this time, the terminal 121 stares at the pressed direction button 121. When the user then presses the decision button 122, the terminal 100 shows various actions in conformity with the facial expression at the time.

3. "Facial Expression Display" Mode:

The terminal 100 is usually in the "facial expression display" mode. In this mode, the face of the terminal 100 is displayed irrespective of the user's operation. The face of the terminal 100 usually faces forwards, but may sometimes shows other facial expressions. The facial expressions that can be shown by the terminal 100 are as follows:

"Facing Forwards Blankly"

The face looks forwards as if seeing the user, which is a default facial expression (first basic facial expression). The eyes blink occasionally.

"Looking Around Restlessly"

With eyes open widely, the eyes and the face move to the left and right and also up and down. The eyes blink sometime while in motion.

"Running at the Nose"

Facial expressions of the eyes and the mouth remain unchanged, and the face is running at what appears to be the nose. After a while with the nose dripping to the greatest degree, the face changes to "snuffling".

"Snuffling"

The face is lifted upwardly with the nostrils open widely, and snuffs with the mouth firmly set. At this time, the sound of snuffling is outputted.

"Yawning"

The mouth is open widely and the eyes are closed firmly, with a bit of tears flowing. At this time, the sound of yawn is outputted. Usually, "yawning" occurs independently, but may change to "dozing".

"Dozing"

The facial expression "facing forwards blankly" or yawning" changes to a facial expression "dozing". The facial expression "dozing" then changes to "waking up". It is better not to fix the time to change from "dozing" to "waking up".

"Waking up"

This is a facial expression which is not wide awake yet, but restless with the eyes not fully open. This facial expression changes to the facial expression "facing forwards blankly". While the face is shaking unsteadily, the facial expression itself does not change frequently. It is preferable that the facial expression itself change at intervals ranging from 3 to 5 seconds.

4. Reactions when a Button is Pressed:

When one of the direction buttons 121 is pressed in the "facial expression display" mode, the terminal 100 gazes at the pressed direction button 121, and then stares at the face of the person or user who holds the terminal 100. Gazing at the pressed direction button 121 means looking at the position of the pressed direction button 121, rather than the direction in which the direction button 121 is pressed. The terminal 121 should preferably have such a facial expression that the position of the face in its entirety and the position of the eyes will be changed. The period of time in which the terminal 100 gazes at the pressed direction button 121 and the period of time in which the terminal 121 stares at the face of the user are tentatively set to 1 second. At this time, reactions to the direction buttons 121 and the decision button 122 are ignored.

5. Reactions when the Decision Button 122 is Pressed:

When the decision button 122 is pressed in the "facial expression display" mode, the terminal 100 shows various actions in conformity with the facial expression at the time. A fixed reaction when the decision button 122 is pressed leads to a possibility that the terminal 100 will be considered to be an inorganic existence.

It is therefore important that reactions of the terminal 100 as a life be realistically expressed. Such realistically expressed reactions of the terminal 100 as a life are effective to reduce unnatural impressions when the terminal 100 shows patterned reactions or a succession of identical reactions, making it possible to get the terminal 10C closer to something more biological.

6. Examples of Reactions to Facial Expressions:

"Facing Forwards Restlessly"

Since this facial expression is a default facial expression (first basic facial expression), it is necessary to prepare a greatest number of reactions when the direction buttons 121 and the decision button 122 are pressed. By setting conditions for producing those reactions, it is possible to prevent the reactions from being patterned, and produce something animate.

(1) "Hey, have you Washed your Hands?"

This reaction occurs when the user touches the terminal 100 for the first time. The condition that the user touches the terminal 100 for the first time is satisfied when the decision button 122 is pressed after the direction buttons 121 or the decision button 122 have not been pressed for 30 seconds or more, for example. The action of the terminal 100 is that it speaks with an annoyed facial expression with the bent eyebrows, and moves the mouth in synchronism with the voice sounds. When the action is over, the terminal 100 goes back to the facial expression "facing forward restlessly."

(2) "Will you Keep Away from me Because you Make me Feel Hot and Stuffy."

This reaction occurs when the user has held the terminal 100 for a long period of time. The condition that the user has held the terminal 100 for a long period of time is satisfied when a succession of button depressions each for 10 seconds or less has occurred for one minute. The action of the terminal 100 is that it sweats, sticking out the tongue like a dog, and speaks as if it feels hot. If the face of the terminal sweats a lot the instant the user presses a button, then it produces a further interesting facial expression that is preferable. While the terminal 100 is speaking, the mouth is alternately opened and closed in synchronism with the voice sound. When the action is over, the terminal 100 goes back to the facial expression "facing forward restlessly".

(3) "Well, . . . No, it's Nothing." "Well, . . . What is it?"

No particular condition is given to create this reaction. This reaction, and another reaction "(4) Startled" described later on, are default settings, and the reaction "(3) Well, . . . and the reaction" "(4) Startled" are randomly produced when the decision button is pressed. In this embodiment, the probability that the reaction "(4) Startled" is produced is higher, i.e., the probability that the reaction "(3) Well, . . . " is 30%, and the probability that the reaction "(4) Startled" is produced 70%.

If the decision button 122 is pressed again while the voice sound "Well, . . . " is being outputted after the depression of the decision button 122, then the face of the terminal 100 is necessarily "(4) Startled". The reaction "(4) Startled" is always effective while the decision button 122 is being pressed, and is produced as many times as the user wants. If the button has not been pressed for a while, then the voice sound " . . . what is it?" is produced.

This is because the terminal 100 wanted to speak something but forgot it as the user interrupted the action of the terminal 100 to speak something.

The action of the terminal 100 is that it changes from a facial expression trying to remember something to a facial expression "(4) Startled" and then to a facial expression forgetting something that it wanted to speak.

The facial expression when the voice sound " . . . what is it?" is outputted is a blank facial expression facing forwards in order to give clear contrast to the abrupt action "(4) Startled".

If the decision button 122 is not pressed again while the voice sound "Well, . . . " is being outputted after the depression of the decision button 122, then the voice sound " . . . No, it's nothing" is produced.

The action of the terminal 100 is that a facial expression trying to remember something is followed by a facial expression mumbling something as if covering up the attempt. While the terminal 100 is speaking, the mouth is alternately opened and closed in synchronism with the voice sound being produced. When the action is over, the terminal 100 goes back to the facial expression "facing forward restlessly".

(4) "Startled"

No particular condition is given to create this reaction. This reaction, and the reaction "(3) Well, . . . ", are default settings, and the reaction "(3) Well, . . . " and the reaction "(4) Startled" are randomly produced when the decision button 122 is pressed. Their probability ratios have been described under the item "(3) Well, . . . ".

If the decision button 122 is pressed within a certain time (tentatively, 2 seconds) after the reaction "(4) Startled" has been caused by the depression of the decision button 122, then the reaction "(4) Startled" is necessarily produced. If the decision button 122 is pressed in order to satisfy this condition (the decision button 122 is pressed within the certain time), then the voice sound " . . . Stop it" is produced after the fourth occurrence of the reaction "(4) Startled". When the voice sound " . . . Stop it" is produced, any key entry is ignored.

If the decision button 122 is not pressed within the certain time after the reaction "(4) Startled" has been caused by the depression of the decision button 122, then the condition is reset. When the decision button 122 is pressed next time, one of the reaction "(3) Well, . . . " and the reaction "(4) Startled" is selected. The condition is also reset after the voice sound " . . . Stop it" is produced.

The action of the terminal 100 is a reaction that the terminal 100 produces as if it were tickled. The face is quickly moved vertically or horizontally in its entirety, and utters a startled voice "Wow".

When the voice sound " . . . Stop it" is produced, the terminal 100 should preferably show a grouchy facial expression. While the terminal 100 is speaking, the mouth is alternately opened and closed in synchronism with the voice sound being produced. When the action is over, the terminal 100 goes back to the facial expression "facing forward blankly".

(5) Pretending to be Broken

The condition to create this reaction is to hit a button successively. Specifically, a button is interpreted as being hit successively when the button is pressed five times per second. The depression of a direction button 121 is also counted.

The action of the terminal 100 is that the instant a button is pressed, an image of noise produced as if a television set is turned off is displayed, and "Beep" like a beep sound starts to be outputted, indicating as if the terminal were broken.

After a while (tentatively, 2 seconds), the face of the terminal is displayed again, and the terminal speaks a message "Don't break me". It is preferable that the face carry a warning impression with a bit of smile. While the terminal 100 is speaking, the mouth is alternately opened and closed in synchronism with the voice sound being produced. When the action is over, the terminal 100 goes back to the facial expression "facing forward restlessly.

"Looking Around Restlessly

When a button is pressed while the face of the terminal 100 is having this facial expression, there are available an action with a reaction and an action with no reaction. The action with no reaction is effective to lessen an inorganic atmosphere that "some reaction necessarily occurs when a button is pressed".

(1) "Have you Pressed now?"

No particular condition is given to create this reaction. This reaction, and the reaction "(3) No reaction" (see below), are default settings, and one of these reactions is randomly produced. With a bit of delay after the decision button 122 is pressed, the face of the terminal 100 looks forwards, talking to the person who is holding the terminal 100. It is preferable that the terminal 100 give an impression of being careless because it has stared about.

After a while (tentatively, 1 second) in which the terminal 100 has showed a facial expression facing forwards, it returns to the facial expression "staring about". While the terminal 100 is speaking, the mouth is alternately opened and closed in synchronism with the voice sound being produced.

(2) "You Seem to be Frustrated"

The condition to create this reaction is to hit a button successively. Specifically, a button is interpreted as being hit successively when the button is pressed five times per second. The depression of a direction button 121 is also counted.

The action of the terminal 100 is that the instant the condition is satisfied, it faces forwards, and speaks with a facial expression with a triumphant air as if saying "Well". After a while (tentatively, 1 second) in which the face of the terminal 100 faces forwards, it changes to the facial expression "facing forward restlessly". While the terminal 100 is speaking, the mouth is alternately opened and closed in synchronism with the voice sound being produced.

(3) No Reaction

Even when a button is pressed, the action of the terminal 100 does not change at all, and it continues the facial expression "staring about". Mixing in even one action with no reaction is preferable because it can produce something animate.

Running Nose"

When a button is pressed, the face of the terminal 100 has a facial expression with the nose tickling and being about to sneeze. In this example, the pressing of the button triggers such a facial expression. Upon elapse of a certain time (tentatively, 1 second) with this facial expression, the face of the terminal 100 sneezes with a sound "atchoo!" and a sneezing facial expression. When the action is over, the face of the terminal 100 returns to the facial expression with the running nose.

Snuffling"

This action follows the action "running noise". No reactions to button depressions are prepared. The depression of a button during this action is ignored.

"Yawning"

If a button is pressed while the face of the terminal 100 is yawning, then the terminal 100 shows a surprising facial expression, trying to stop the yawning. When the face of the terminal 100 stops the yawning, it shows a facial expression with the eyes being widely open due to the surprise and the mouth set firmly. When the action is over, the terminal 100 goes back to the facial expression "facing forward restlessly" or the facial expression "staring about".

"Dozing"

When a button is pressed, the terminal 100 can change to a "waked-up" state. When a button is pressed, the face of the terminal 100 moves slowly up and down, as if waking up by being shaken.

"Waking up"

When a button is pressed as in "dozing", the face of the terminal 100 moves slowly up and down, and produces a fretting sound "uh . . . " as if it still wanted to sleep. The terminal 100 outputs such a fretting sound for the first and second button depressions, but shows an annoyed facial expression with the bent eyebrows and outputs the voice sound "What is it . . . ?" for the third button depression. Upon elapse of a certain time (tentatively, 1 second) after the action up to the voice sound "What is it . . . ?", the terminal 100 goes back to the facial expression "facing forward restlessly", the facial expression "staring about", the facial expression "running nose", or the facial expression "yawning", or the facial expression "dozing".

7. List of Facial Expressions

(01) "Face staring at the pressed button"
(02) "Facial expression staring at the face of the person who holds the terminal"
(03) "Facing forwards restlessly"
(04) "Facing forwards blankly"
(05) "Sweating, sticking out the tongue like a dog, and speaking as if feeling hot"
(06) "Facial expression remembering something"
(07) "Facial expression forgetting something that it wanted to speak (blank facial expression facing forwards)"
(08) "Facial expression forgetting something that it wanted to speak"
(09) "Tickled facial expression"
(10) "Grouchy facial expression"
(11) "The display of an image of noise produced as if a television set is turned off"
(12) "Warning face (with a bit of EMI)"
(13) Facial expression "looking around restlessly"
(14) "Face talking to the person who holds the terminal"
(15) "Facial expression with a triumphant air as if saying "Well"
(16) "Facial expression "running nose"
(17) "Facial expression with the nose tickling and being about to sneeze"
(18) Facial expression "sneezing"
(19) Facial expression "snuffling"
(20) Facial expression "yawning"
(21) "Startled face"
(22) "Facial expression, trying to stop yawning (facial expression with the eyes being widely open and the mouth set firmly"
(23) Facial expression "dozing"
(24) Facial expression "waking up"

8. List of Voice Sounds

(01) "Snuffling sound"
(02) "Yawn"
(03) "Have you washed your hands?"
(04) "Will you keep away from me because you make me feel hot and stuffy"
(05) "Well, . . . ", "No, it's nothing", "what is it?", "Listen to me"
(06) Wow (voice uttered when startled)
(07) "Stop it"
(08) "Beep" (beep sound)
(09) "Don't break me"
(10) "Have you pressed now?"
(11) "You seem to be frustrated"
(12) "Atchoo!" (sneezing sound)
(13) "uh . . . " (fretting sound if still wanted to sleep)
(14) "What is it?" (ditto)

The portable toy, the portable information terminal, the entertainment system, and the recording medium according to the present invention are not limited to the illustrated embodiment, but may have any of various other arrangements.

Although a certain preferred embodiment of the present invention has been shown and described in detail, it should be understood that various changes and modifications may be made therein without departing from the scope of the appended claims.

What is claimed is:

1. A portable information terminal having an interface for connection to a master unit having a function to execute a program, comprising:

illegal copying prevention means for periodically determining whether legitimate information has been downloaded from the master unit or not, and if legitimate information has not been downloaded, making ineffective at least control inputs entered into the terminal, said illegal copying prevention means comprising:

identification determining means for determining whether a source medium identification code is a predetermined source medium identification code or not;

wherein said source medium identification code identifies a source medium containing at least one game program executable in the terminal, wherein said source medium identification code has been downloaded to the terminal from said source medium through the master unit, and wherein one or more game programs of said at least one game program stored on said source medium has been downloaded from said source medium through the master unit and stored in the terminal.

2. A portable information terminal according to claim 1, wherein said illegal copying prevention means comprises means for making effective again control inputs entered into the terminal if legitimate information has been downloaded from the master unit after control inputs entered into the terminal have been made ineffective.

3. A portable information terminal according to claim 1, wherein said illegal copying prevention means comprises:

download monitoring means for registering the year, month, and date of an instance of downloading of data; and periodic download determining means for periodically determining whether data has been down loaded or not.

4. A portable information terminal according to claim 3, wherein said download monitoring means comprises:

preprocessing means for storing the present year, month, and date in a first memory area;

download detecting means for detecting whether data has been downloaded or not; and registering means for setting a flag indicative of the download if the downloaded source medium identification code is the predetermined source medium identification code and registering the present year, month, and date in a second memory area.

5. A portable information terminal according to claim 4, wherein said periodic download determining means comprises:

effective/ineffective determining means for determining whether the present year, month, and date stored in the first and second memory areas are effective or ineffective, and making at least control inputs ineffective if the stored present year, month, and date of ineffective;

elapsed time determining means for determining whether a predetermined period has elapsed or not on the basis of the present year, month, and date stored in the first and second memory areas; and flag determining means for determining whether the flag has been set or not if the predetermined period has elapsed, making at least control inputs ineffective if the flag has not been set, and resetting the flag if the flag has been set.

6. A portable information terminal according to claim 1, wherein:

the portable information terminal includes a plurality of input buttons;

making control inputs ineffective includes making at least one of said input buttons ineffective such that information from pressing one of said input buttons while that input button is ineffective is ignored.

7. An entertainment system comprising:

an entertainment apparatus having a function to execute a program; and a portable information terminal detachably connected to said entertainment apparatus and having an interface for being electrically connected to said entertainment apparatus;

said portable information terminal comprising:

illegal copying prevention means for periodically determining whether legitimate information has been downloaded from said entertainment apparatus or not, and if legitimate information has not been downloaded, making ineffective at least control inputs entered into said portable information terminal, said illegal copying prevention means comprising:

identification determining means for determining whether a source medium identification code is a predetermined source medium identification code or not;

wherein said source medium identification code identifies a source medium containing at least one game program executable in said portable information terminal, wherein said source medium identification code has been downloaded to said portable information terminal from said source medium through said entertainment apparatus, and wherein one or more game programs of said at least one game program stored on said source medium has been downloaded from said source medium through said entertainment apparatus and stored in said portable information terminal.

8. An entertainment system according to claim 7, wherein said illegal copying prevention means comprises means for making effective again control inputs entered into said portable information terminal if legitimate information has been downloaded from said entertainment apparatus after control inputs entered into said portable information terminal have been made ineffective.

9. An entertainment system according to claim 7, wherein said illegal copying prevention means comprises:

download monitoring means for registering the year, month, and date of an instance of downloading of data; and periodic download determining means for periodically determining whether data has been down loaded or not.

10. An entertainment system according to claim 9, wherein said download monitoring means comprises:

preprocessing means for storing the present year, month, and date in a first memory area;

download detecting means for detecting whether data has been downloaded or not;

registering means for setting a flag indicative of the download if the downloaded source medium identification code is the predetermined source medium identification code and registering the present year, month, and date in a second memory area.

11. An entertainment system according to claim 10, wherein said periodic download determining means comprises:

effective/ineffective determining means for determining whether the present year, month, and date stored in the first and second memory areas are effective or ineffective, and making at least control inputs ineffective if the stored present year, month, and date are ineffective;

elapsed time determining means for determining whether a predetermined period has elapsed or not on the basis of the present year, month, and date stored in the first and second memory areas; and flag determining means for determining whether the flag has been set or not if the predetermined period has elapsed, making at least control inputs ineffective if the flag has not been set, and resetting the flag if the flag has been set.

12. An entertainment system according to claim 7, wherein:

said portable information terminal includes a plurality of input buttons;

making control inputs ineffective includes making at least one of said input buttons ineffective such that information from pressing one of said input buttons while that input button is ineffective is ignored.

13. A recording medium storing a program which can be executed by a portable information terminal having an interface for connection to a master unit which has a function to execute the program, said program comprising the steps of:

periodically determining whether legitimate information has been downloaded from the master unit or not;

if legitimate information has not been downloaded, making ineffective at least control inputs entered into the portable information terminal; and determining whether a source medium identification code is a predetermined source medium identification code or not;

wherein said source medium identification code identifies a source medium containing at least one game program executable in the portable information terminal, wherein said source medium identification code has been downloaded to the portable information terminal from said source medium through the master unit, and wherein one or more game programs of said at least one game program has been downloaded from the source medium through the master unit and stored in the portable information terminal.

14. A recording medium according to claim 13, wherein said program further comprises the step of:

making effective again control inputs entered into said portable information terminal if legitimate information has been downloaded from the master unit after control inputs entered into said portable information terminal have been made ineffective.

15. A recording medium according to claim 13, wherein said program further comprises the steps of:

registering the year, month, and date of an instance of downloading of data; and periodically determining whether data has been down loaded or not.

16. A recording medium according to claim 15, wherein said program further compromises the steps of:

storing the present year, month, and date in a first memory area;

detecting whether data has been downloaded or not; and setting a flag indicative of the download if the downloaded source medium identification code is the predetermined source medium identification code and registering the present year, month, and date in a second memory area.

17. A recording medium according to claim 16, wherein said program further comprises the steps of:

determining whether the present year, month, and date stored in the first and second memory areas are effective or ineffective, and making at least control input ineffective if the stored present year, month, and date are ineffective;

determining whether a predetermined period has elapsed or not on the basis of the present year, month, and date stored in the first and second memory areas; and determining whether the flag has been set or not if the predetermined period has elapsed, making at least control inputs ineffective if the flag has not been set, and resetting the flag if the flag has been set.

18. A recording medium according to claim 13, wherein:

making control inputs ineffective includes ignoring information from pressing an input button of the portable information terminal while that input button is ineffective.

* * * * *